US012030016B2

(12) United States Patent
Cohen-Cole et al.

(10) Patent No.: US 12,030,016 B2
(45) Date of Patent: Jul. 9, 2024

(54) SYSTEMS AND METHODS FOR DIRECT AIR CARBON DIOXIDE CAPTURE

(71) Applicant: Capture6 Corp., Berkeley, CA (US)

(72) Inventors: Ethan Cohen-Cole, Berkeley, CA (US); Rahul Surana, Fremont, CA (US); Luke Shors, Rotorua (NZ); Zeph Landau, Berkeley, CA (US)

(73) Assignee: Capture6 Corp, Berkeley, CA (US)

( * ) Notice: Subject to any disclaimer, the term of this patent is extended or adjusted under 35 U.S.C. 154(b) by 0 days.

(21) Appl. No.: 18/082,903

(22) Filed: Dec. 16, 2022

(65) Prior Publication Data

US 2023/0191322 A1 Jun. 22, 2023

Related U.S. Application Data

(60) Provisional application No. 63/290,467, filed on Dec. 16, 2021, provisional application No. 63/341,883,
(Continued)

(51) Int. Cl.
*C01B 32/60* (2017.01)
*B01D 53/62* (2006.01)
(Continued)

(52) U.S. Cl.
CPC .......... *B01D 53/62* (2013.01); *B01D 53/965* (2013.01); *C01B 32/60* (2017.08); *C22B 7/00* (2013.01)

(58) Field of Classification Search
CPC .. C01D 15/08; C01B 32/60; B01D 2257/504; B01D 2257/50; B01D 53/96; B01D 53/62; B01D 53/965; C22B 7/00
See application file for complete search history.

(56) References Cited

U.S. PATENT DOCUMENTS 7,637,093 B2 12/2009 Rao
8,470,275 B2 6/2013 Constantz et al.
(Continued)

FOREIGN PATENT DOCUMENTS

EP 2070583 A3 11/2009
EP 3074349 A4 7/2017
(Continued)

OTHER PUBLICATIONS

Holmes, G. J., "A carbon dioxide absorpiton performance evaluation for capture from ambient air", 2010, Publisher: University of Calgary, Published in: Calgary.
(Continued)

*Primary Examiner* — Smita S Patel
(74) *Attorney, Agent, or Firm* — DENTONS DAVIS BROWN; Matthew Warner-Blankenship

(57) ABSTRACT

A method for capturing and sequestering carbon dioxide ($CO_2$) includes receiving and performing an electrochemical process on the input liquid including water and a salt to produce at least one hydroxide-rich stream, and then capturing $CO_2$ from air using the hydroxide-rich stream and a passive air capture system, thereby producing a liquid carbonate solution containing air-captured $CO_2$. Optional steps include disposing of the liquid carbonate solution, precipitating air-captured $CO_2$ from the liquid carbonate solution as solid carbonate and/or a slurry of carbonate, and mixing the liquid carbonate solution with a hydrogen-rich stream produced by the electrochemical process to generate gaseous $CO_2$. Various integrations and synergies among $CO_2$ capture, renewable energy, water desalination, and metal and mineral extraction are provided.

7 Claims, 50 Drawing Sheets

Related U.S. Application Data filed on May 13, 2022, provisional application No. 63/355,368, filed on Jun. 24, 2022, provisional application No. 63/389,095, filed on Jul. 14, 2022, provisional application No. 63/413,021, filed on Oct. 4, 2022.

(51) Int. Cl.
*B01D 53/96* (2006.01)
*C22B 7/00* (2006.01)

(56) References Cited

U.S. PATENT DOCUMENTS

| | | | |
|---|---|---|---|
| 8,551,221 | B2 | 10/2013 | Wolfe |
| 9,422,176 | B2 | 8/2016 | Ng et al. |
| 9,689,309 | B2 | 6/2017 | Oelfke et al. |
| 9,784,140 | B2 | 10/2017 | Huntington et al. |
| 2006/0051274 | A1 | 3/2006 | Wright et al. |
| 2010/0150802 | A1 | 6/2010 | Gilliam et al. |
| 2011/0094230 | A1 | 4/2011 | Finkenrath et al. |
| 2011/0135551 | A1 | 6/2011 | House et al. |
| 2011/0203939 | A1 | 8/2011 | Jones |
| 2011/0226010 | A1 | 9/2011 | Baxter |
| 2014/0301922 | A1 | 10/2014 | Harrison |
| 2018/0036685 | A1 | 2/2018 | Kunteng et al. |
| 2020/0370001 | A1 | 11/2020 | Constantz et al. |
| 2021/0001270 | A1 | 1/2021 | Lu et al. |

FOREIGN PATENT DOCUMENTS

| | | | |
|---|---|---|---|
| EP | 3765174 | A1 | 1/2021 |
| JP | 3174102 | U | 3/2012 |
| JP | 5932771 | B2 | 6/2016 |
| JP | 2019194154 | A | 11/2019 |
| KR | 10-2014-0042394 | A | 4/2014 |
| KR | 20160034635 | A | 3/2016 |
| KR | 102032948 | B1 | 10/2019 |
| TW | I708740 | B | 10/2020 |
| WO | 0010691 | A1 | 8/1999 |
| WO | 0029326 | A1 | 5/2000 |
| WO | 2010104751 | A1 | 9/2010 |

OTHER PUBLICATIONS

Baciocchi et al., "Process design and energy requirements for the capture of carbon dioxide from air", 2006.
Caldeira et al., "Accelerating carbonate dissolution to sequester carbon dioxide in the ocean: Geochemical implications", 2000.
Dong et al., "Direct Air Capture via Natural Draft Dry Cooling Tower", 2021.
Du et al., "Treatment of Brackish Water RO Brine via Bipolar Membrane Electrodialysis", 2021.
Gmar et al., "Recent advances on electrodialysis for the recovery of lithium from primary and secondary resources", 2019.
Hanein et al., "Decarbonisation of calcium carbonate at atmospheric temperatures and pressures, with simultaneous CO2 capture, through production of sodium carbonate", Energy & Environmental Science, 2021, p. 65956604, vol. 14, No. 6595.
Herrero-Gonzalez et al., "Highly concentrated HCl and NaOH from brines using electrodialysis with bipolar membranes", 2020.
Holmes et al., "Outdoor prototype results for direct atmospheric capture of carbon dioxide", 2013.
House et al., "Economic and energetic analysis of capturing CO2 from ambient air", 2011.
Jiang et al., "Production of Lithium Hydroxide from Lake Brines through ElectroElectrodialysis with Bipolar Membranes (EEDBM)", 2014.
Keith et al., "A Process for Capturing CO2 from the Atmosphere", 2018, Publisher: Elsevier.
Kim, D.H., "A review of desalting process techniques and economic analysis of the recovery of salts from retentates", 2011.
Kuldeep et al., "Bipolar Membrane Electrodialysis for Sulfate Recycling in the Metallurgical Industries", 2021.
Maharloo et al., "Process intensification and environmental consideration of sodium bicarbonate production in an industrial soda ash bubble column reactor by CO2 recycling", 2017.
Mahmoudkhani et al., "Low-energy sodium hydroxide recovery for CO2 capture from atmospheric airThermodynamic analysis", 2009.
Newsom, Gavin, "Selective Recovery of Lithium from Geothermal Brines", 2020.
Pohorecki et al., "Kinetics of Reaction Between Carbon Dioxide and Hydroxyl Ions in Aqueous Electrolyte Solutions", 1988.
Renforth et al., "Assessing ocean alkalinity for carbon sequestration", 2017.
Digdaya et al., "A direct coupled electrochemical system for capture and conversion of CO2 from oceanwater", Nature Communications, 2020.
Du et al., "Supporting Information for Sodium Hydroxide Production from Seawater Desalination Brine: Process Design and Energy efficiency", Environmental Science & Technology, 2018, Published in: US.
Holmes et al., "An air-liquid contactor for large-scale capture of CO2 from air", Philosophical Transactions of The Royal Society, 2012, pp. 4380-4403, vol. 370.
Sanz-Perez et al., "Direct Capture of CO2 from Ambient Air", Chemical Reviews, 2016, pp. 11840-11876, vol. 116.
Smith, Stephen V., "Parsing the Oceanic Calcium Carbonate Cycle: A Net Atmospheric Carbon Dioxide Source, or a Sink?", 2013.
Renforth et al., "Engineering challenges of ocean liming", 2013.
Ruiz et al., "Sustainable and Negative Carbon Footprint Solid-Based NaOH Technology for CO2 Capture", 2020.
Saberi et al., "Precipitation kinetics of sodium bicarbonate in an industrial bubble column crystallizer", 2009.
Sen et al., "Hydroxide Based Integrated CO2 Capture from Air and Conversion to Methanol", 2020.
Shaikh et al., "Scale-up of Bubble Column Reactors: A Review of Current State-of-the-Art", 2013.
Shim et al., "Experimental study on capture of carbon dioxide and production of sodium bicarbonate from sodium hydroxide", 2016.
Socolow et al., "Direct Air Capture of CO2 with Chemicals", 2011.
Song et al., "Separation of sodium hydroxide from post-carbonation brines by bipolar membrane electrodialysis (BMED)", 2021.
Sujoto et al., "Lithium recovery from synthetic geothermal brine using electrodialysis method", 2021.
Telzhensky et al., "Selective separation of seawater Mg2+ ions for use in downstream water treatment processes", 2011.
Wang et al., "Packing characterization for post combustion CO2 capture: mass transfer model development", 2014.
Warren, I., "Techno-Economic Analysis of Lithium Extraction from Geothermal Brines", 2021.
Wylock et al., "Compartmental Modeling of an Industrial Column", 2009.
Xue et al., "Total alkalinity minus dissolved inorganic carbon as a proxy for deciphering ocean acidification mechanisms", 2020.
Zeman et al., "Production of carbon negative precipitated calcium carbonate from waste concreate", 2016.
Du et al., "Sodium hydroxide production from seawater desalination brine: process design and energy efficiency", 2018.
Amaral et al., "Modelling gas-liquid mass transfer in wastewater treatment: when current knowledge needs to encounter engineering practice and vice versa." Water Science & Technology | 80.4 | 2019.
Andersen, C. Brannon., "Understanding Carbonate Equilibria by Measuring Alkalinity in Experimental and Natural Systems." Journal of Geoscience Education, v. 50, n. 4, Sep. 2002, p. 389-403.
Ayirala, S.C. and Yousef, A.A., "A Critical Review of Alternative Desalination Technologies for Smart Waterflooding." Oil and Gas Facilities, Oct. 2016.
Ayoub, George M., Ramez M. Zayyat, and Mahmoud Al-Hindi., "Precipitation Softening: A Pretreatment Process for Seawater Desalination." Environmental Science and Pollution Research 21, No. 4 (Feb. 1, 2014): 2876-87. https://doi.org/10.1007/s11356-013-2237-1.
Dahmani et al., "Removal of Ca(II) and Mg(II) hardness by ion exchange resins and soda ash for seawater pretreatment to reduce

(56) References Cited

OTHER PUBLICATIONS scale formation in evaporators multi-stage flash desalination." Desalination and Water Treatment 221 (2021) 23-30.
Kiepe et al. "Experimental Determination and Prediction of Gas Solubility Data for CO2 + H2O Mixtures Containing NaCI or KCI at Temperatures between 313 and 393 K and Pressures up to 10 MPa." Ind. Eng. Chem. Res. 2002, 41, 4393-4398.
Kucka et al., "Kinetics of the Gas-Liquid Reaction between Carbon Dioxide and Hydroxide Ions." Ind. Eng. Chem. Res. 2002, 41, 5952-5957.
Macedonio, F., and E. Drioli. "4.09—Membrane Systems for Seawater and Brackish Water Desalination." In Comprehensive Membrane Science and Engineering, edited by Enrico Drioli and Lidietta Giorno, 241-57. Oxford: Elsevier, 2010. https://doi.org/10.1016/B978-0-08-093250-7.00056-6.
Mahmoudkhani et al., "Low energy packed tower and caustic recovery for direct capture of CO2 from air." Energy Procedia 1 (2009) 1535-1542.
"Mazzotti et al., "Direct air capture of CO2 with chemicals: optimization of a two-loop hydroxide carbonate system usinga countercurrent air-liquid contactor." Climatic Change (2013) 118:119-135".
Nelson et al., "Remineralization and Stabilization of Desalinated Water.", 2021, https://www.intechopen.com/chapters/78990.
Pinsent et al., "The Kinetics of Combination of Carbon Dioxide With Hydroxide Ions." Dept. of Colloid Science, University of Cambridge, 1956, 1512-1520.
Suhalim et al., "A. Rejection Mechanism of lonic Solute Removal by Nanofiltration Membranes: An Overview.", Nanomaterials Dec. 2022, 437. https://doi.org/10.3390/nano12030437.
Thuy et al., "Removal of Hydrogen Sulfide in Synthesized Air by Chemical Absorption in a Packed Column." Tap chí Khoa hc Công nghe và Thuc pham 18 (2) (2019) 3-11.
U.S. Environmental Protection Agency—Office of Water Program Operations, "Physical-Chemical Treatment Technology—Training Manual", 1977.
Voutchkov, Nikolay. "Re-mineralization of Desalinated Water." 2011.

SYSTEMS AND METHODS FOR DIRECT AIR CARBON DIOXIDE CAPTURE

CROSS-REFERENCE TO RELATED APPLICATIONS

This application claims priority under 35 U.S.C. § 119(e) to U.S. Provisional Application No. 63/290,467, filed Dec. 16, 2021, and entitled "APPARATUS, SYSTEMS AND METHODS FOR CARBON SEQUESTRATION;" to U.S. Provisional Application No. 63/341,883, filed May 13, 2022, and entitled "APPARATUS, SYSTEMS AND METHODS FOR CARBON SEQUESTRATION, RARE MINERALS MINING, PARTICULATE MATTER REDUCTION, AND DIRECT AIR CO2 CATURE;" to U.S. Provisional Application No. 63/355,368, filed Jun. 24, 2022, and entitled "APPARATUS, SYSTEMS AND METHODS FOR CARBON SEQUESTRATION, RARE MINERALS MINING, PARTICULATE MATTER REDUCTION, AND DIRECT AIR CO2 CATURE;" to U.S. Provisional Application No. 63/389,095, filed Jul. 14, 2022, and entitled "APPARATUS, SYSTEMS AND METHODS FOR CARBON SEQUESTRATION, RARE MINERALS MINING, PARTICULATE MATTER REDUCTION, AND DIRECT AIR CO2 CAPTURE;" and to U.S. Provisional Application No. 63/413,021, filed Oct. 4, 2022, and entitled "CARBON SEQUESTRATION, RARE MINERALS AND METALS EXTRACTION, PARTICULATE REDUCTION, HYDROGEN AND CHLORINE PRODUCTION, AND POST-PROCESSING IN DIRECT AIR CO2 CAPTURE," all of which are hereby incorporated by reference in their entirety.

TECHNICAL FIELD

The disclosed technology relates generally to the sequestration, storing, production, extraction, handling, and/or use of elements, compounds, and fluids in conjunction with direct air carbon dioxide ($CO_2$) capture.

BACKGROUND

Reducing the emissions of climate gases including carbon dioxide is essential to avoiding the worst scenarios for global warming. Curtailing emissions, while essential, is not sufficient by itself, because a stock of $CO_2$ emissions has been accumulating in the atmosphere since the dawn of the industrial revolution and countries around the world are not acting sufficiently quickly to reduce their emissions.

The natural processes that uptake this $CO_2$ released by fossil fuels take a long time to work. As just one example, ocean absorption of $CO_2$ from the atmosphere takes about a year to equilibrate. Eliminating the balance of $CO_2$ requires weathering and rock formation—processes that operates on geologic time scales of tens to hundreds of thousands of years.

Given the need to quickly reduce future emissions as well as the existing stock of $CO_2$, there is a need for approaches that pull existing climate gases (predominantly $CO_2$) out of the air or water. Removing $CO_2$ directly from air is sometimes referred to as Direct Air Carbon Capture and Storage or DACCS.

Current methods for direct air capture of $CO_2$ typically involve three steps: 1) blowing air over a solvent or sorbent to extract $CO_2$ from ambient air, 2) heating the solvent or sorbent to release the $CO_2$ in gaseous form and recover the solvent for recycling, and 3) capturing and sequestering the rereleased $CO_2$ gas. There is a considerable energy expenditure requirement in performing these steps resulting in additional greenhouse gas emissions, especially from the use of thermal energy required for heating the solvent or sorbent.

SUMMARY

In these Examples, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In Example 1, a method for capturing and sequestering carbon dioxide ($CO_2$), comprising receiving an input liquid comprising water and a salt, performing an electrochemical process on the input liquid to produce at least one hydroxide-rich stream; and capturing $CO_2$ from air using the hydroxide-rich stream and a passive air capture system, thereby producing a liquid carbonate solution containing air-captured $CO_2$.

In Example 2, the method of Example 1, further comprising precipitating air-captured $CO_2$ from the liquid carbonate solution as solid carbonate and/or a slurry of carbonate.

In Example 3, the method of Example 1, further comprising directly disposing of the liquid carbonate solution from the air capture system in a body of water or on land.

In Example 4, the method of Example 1, further comprising mixing the liquid carbonate solution with a hydrogen-rich stream produced by the electrochemical process to generate gaseous $CO_2$.

In Example 5, the method of Example 1, further comprising producing a hydrogen-rich stream at least in part with the electrochemical process, dissolving a metal and/or mineral into the hydrogen-rich stream to produce a metal and/or mineral solution, mixing carbonates from the liquid carbonate solution with the metal and/or mineral solution to produce a metal and/or mineral carbonate mixture, precipitating metal and/or mineral carbonates from the metal and/or mineral carbonate mixture; and recycling a salt solution from the metal and/or mineral carbonate mixture by mixing the salt solution with the input liquid upstream from the electrochemical process.

In Example 6, the method of Example 5, further comprising pretreating the input liquid with carbonates from the liquid carbonate solution.

In Example 7, the method of Example 1, further comprising mixing $CO_2$ from a desalination facility with the liquid carbonate solution, precipitating carbonates from the liquid carbonate solution, pretreating the input liquid with the precipitated carbonates, upstream from the electrochemical process, and processing the pretreated input liquid with a reverse osmosis system to recover water from the pretreated input liquid prior to the electrochemical process.

In Example 8, the method of Example 7, further comprising treating the input liquid and/or the recovered water with a hydrogen-rich stream produced at least in part by the electrochemical process.

In Example 9, the method of Example 1, further comprising processing the input liquid with a pretreatment stage before performing the electrochemical process, the pretreatment stage comprising one or more of a filtration system, a reverse osmosis concentration system, and an ion exchange system.

In Example 10, the method of Example 1, further comprising capturing $CO_2$ from an industrial $CO_2$ source with the liquid carbonate solution from the passive air capture system to produce a bicarbonate solution.

In Example 11, the method of Example 10, further comprising mixing the liquid carbonate solution and the bicarbonate solution with hydrochloric acid to neutralize the liquid carbonate solution and the bicarbonate solution, and to form carbon dioxide gas and a salt solution before recycling the salt solution back to the electrochemical process.

In Example 12, the method according to Example 1, further comprising producing hydrogen with the electrochemical process, neutralizing carbonates from the liquid carbonate solution with hydrochloric acid to generate $CO_2$, and combining the $CO_2$ with the hydrogen in presence of a catalyst, at high temperatures and pressures, to produce methanol.

In Example 13, a method for capturing and sequestering carbon dioxide ($CO_2$), comprising receiving an input liquid comprising salt water and at least one of a mineral and a metal, performing an electrochemical process on the input liquid to produce at least one hydroxide-rich stream, capturing $CO_2$ from air using the hydroxide-rich stream and a passive air capture system, thereby producing a liquid carbonate solution containing air-captured $CO_2$, precipitating the at least one of the mineral and metal from the at least one hydroxide-rich stream, precipitating air-captured $CO_2$ from the liquid carbonate solution.

In Example 14, the method of Example 13, wherein the at least one precipitated mineral or metal is lithium.

In Example 15, the method of Example 13, wherein the electrochemical process comprises bipolar electrodialysis.

In Example 16, the method of Example 13, further comprising absorbing lithium (Li) ions from the input liquid with an absorber, producing an hydrogen-rich stream with the electrochemical process, extracting Li from the absorber using the hydrogen-rich stream and precipitating Li as lithium carbonate.

In Example 17, a method for capturing and sequestering carbon dioxide ($CO_2$), comprising receiving an input liquid comprising water and a salt, performing an electrochemical process comprising electrolysis with an electrolysis unit to produce at least one hydroxide-rich stream, capturing $CO_2$ from air using the hydroxide-rich stream and a passive air capture system, thereby producing a liquid carbonate solution containing air-captured $CO_2$, and precipitating air-captured $CO_2$ from the liquid carbonate solution.

In Example 18, the method of Example 17, further comprising producing the at least one hydroxide-rich stream, hydrogen gas, and chlorine gas with the electrolysis unit.

In Example 19, the method of Example 18, further comprising combining the hydrogen and chlorine to produce hydrochloric acid.

In Example 20, the method of Example 17, wherein the electrolysis unit is powered by renewable energy.

Other embodiments of the above and below Examples include corresponding computer systems, apparatus, and computer programs recorded on one or more computer storage devices, each configured to perform the actions of the methods. Implementations of the described techniques may include hardware, a method or process, or computer software on a computer-accessible medium.

These Example apparatus, systems and methods are disclosed for the capture and sequestration of carbon dioxide from air through the use of saline water, electrochemistry, passive air capture and precipitation. In various cases carbon dioxide is ultimately converted to calcium carbonate and stored in that form in a body of water or other location or the carbon dioxide is captured in gaseous form and stored. Some implementations include the extraction and collection of minerals and metals from air and water through the use of saline water, electrochemistry, passive air capture and precipitation. In various cases green hydrogen gas and other byproduct gases are produced simultaneously with carbon capture and sequestration. The gases can be stored in pressurized vessels or can be combined to form other compounds such as hydrochloric acid, passive air capture, and precipitation. Further implementations provide for the simultaneous capture and sequestration of carbon dioxide and the extraction of lithium from air and water through the use of saline water, and electrochemistry, and precipitation. For example, lithium can be converted to lithium carbonate or other forms of lithium compound such as lithium hydroxide and stored for post processing and subsequent sale. Various implementations may include the post-processing and sequestration of carbon dioxide from a direct capture unit involving direct disposal of carbonate solution from the air-capture unit, recycling of the hydroxide-rich and hydrogen-rich solutions solution from the precipitator and the olivine rock mixer, and/or recycling of the solution from direct neutralization of sodium carbonate with an acid or indirectly by reacting it with a liquid solution of calcium chloride or calcium hydroxides. Some implementations provide for electrochemical water splitting to simultaneously produce green hydrogen gas, a concentrated sodium hydroxide solvent, and hydrochloric acid.

The disclosed apparatus, systems, and methods further relate to the simultaneous capture and sequestration of carbon dioxide, the desalination of saline water such as seawater and brackish groundwater to obtain low TDS water for residential and industrial use, and the extraction of metals and minerals that are dissolved in the saline water. The integrated carbon capture, desalination, and mineral extraction processes are synergistically combined such that the byproducts from one process are used in another resulting in an efficient process with low carbon emissions and reduced waste. Various implementations relate to the simultaneous capture and sequestration of carbon dioxide and the extraction of metals and minerals that are dissolved in the saline water. The integrated carbon capture and mineral extraction processes are synergistically combined such that the byproducts from one process are used in another resulting in an efficient process with low carbon emissions and reduced waste.

The disclosed apparatus, systems, and methods further relate to the simultaneous capture and sequestration of carbon dioxide and hydrogenation of captured carbon dioxide to form methanol which is stored as fuel and for further processing of derivative products. The integrated carbon capture and methanol synthesis processes is synergistic with the byproducts from the process are used up resulting in an efficient process with low carbon emissions and reduced waste. The use of renewable energy for the process results in production of green hydrogen gas and green methanol.

Implementations of the disclosed technology generally relate to devices, methods, and design principles involving the capture and sequestration of carbon dioxide through the use of liquid sources (e.g., seawater), electrochemical processes such as electrolysis or electrodialysis (e.g., bipolar electrodialysis), and passive air capture, in which the carbon dioxide is ultimately converted to one or more carbonates and stored in that form in an ocean or other location, or in which the carbon dioxide is captured as gas and stored in that form. According to some aspects of the technology, various implementations integrate direct air $CO_2$ capture and sequestration with one or more additional processes including, for example, the sequestration, storing, production, extraction, and/or handling of various elements and compounds, such as carbon, hydrogen, and chlorine, and other minerals and metals such as, for example, lithium. In addition, various implementations include the processing of solids and liquids after the capture of carbon dioxide through an air capture system, including the processing, use, and recycling of hydroxide-rich and hydrogen-rich liquid solutions. Further, various implementations integrate various additional processes that in some cases make use of certain process flows and fluids prior to direct air capture of carbon dioxide.

One aspect of the disclosed technology relates generally to the direct extraction and precipitation of minerals and metals from the environment such as the air and water. In various implementations, these extraction technologies can be used or otherwise performed in conjunction with a process for the sequestration of carbon dioxide. Examples of minerals and metals that may be extracted in various implementations include, but are not limited to, lithium, chromium, and others.

Implementations including the extraction of lithium can be especially useful. As is known, lithium is an essential element used in numerous applications and particularly in lithium-ion batteries. Current methods for extracting lithium are both energy intensive and cause undesirable ecosystem degradation. Current methods of lithium extraction involve resin bonding, evaporation ponds, or chemical leeching from rocks. All have various deleterious impacts on the environment. Relevant implementations of the disclosed technology address a need in the art for lithium extraction that is less energy intensive and without the environmental consequences associated with traditional approaches to lithium extraction.

In certain implementations, the disclosed systems, devices, and methods allow for the extraction and precipitation of lithium and other minerals and metals in combination with the capture and sequestration of carbon dioxide through the use of saline water, electrochemical production of hydroxides, and air capture. In these and other implementations, the mineral or metal such as lithium is ultimately precipitated as an element, chemical, or compound, such as lithium hydroxide, chromium, or other metals and minerals as any hydroxide(s) and/or carbon dioxide is ultimately converted to carbonates and stored in that form or captured as $CO_2$ gas and stored in that form. Further implementations will be readily apparent to those of skill in the art.

Additional implementations relate to various devices, systems, and methods relating to the extraction of rare minerals from the air and water integrated into a process that also results in the capture and sequestration of carbon dioxide as carbonates or as a gas. In some cases, a combined process employs one or more of the following elements: the extraction and concentration of rare minerals and metals, the manufacture of hydroxide-rich liquids for the joint function of particulate matter reduction, and the capture of carbon dioxide ($CO_2$) and/or the precipitation of carbonates and storing of such carbonates in the ocean or other location. The process also allows for the capture and storage of $CO_2$ as a gas.

Various Examples and implementations related to this aspect of the disclosed technology include the following:

Example 1 includes a method for the capture and sequestration of carbon dioxide ($CO_2$) that includes inputting liquid, performing electrolysis or electrodialysis on the inputted liquid to produce at least one hydroxide-rich stream, capturing $CO_2$ from air using the hydroxide-rich stream and a passive air capture system, and precipitating air-captured $CO_2$.

Example 2 includes the method of Example 1, wherein the precipitated air-captured $CO_2$ is stored as carbonates or gas.

Example 3 includes the method of Example 1, wherein the electrodialysis (ED) is performed via an ED stack.

Example 4 includes the method of Example 1, wherein the input liquid is saline water.

Example 5 includes the method of Example 4, wherein the saline water is filtered.

Example 6 includes the method of Example 1, further including a pretreatment step with at least one of nanofiltration, ion exchange, and reverse osmosis.

Example 7 includes the method of Example 1, wherein at least one hydroxide-rich stream is a dilute hydroxide-rich.

Example 8 includes the method of Example 3, wherein the ED stack includes repeating ED cells including one or more of a bipolar membrane, anion and/or cation permeable membranes in repeating sequences.

Example 9 includes the method of Example 8, further comprising an alkaline chamber adjacent to the bipolar membrane comprising a feed solution that concentrates cations.

Example 10 includes the method of Example 1, wherein carbonic acid, bicarbonates, and $CO_2$ are precipitated continuously as solid carbonates after electrodialysis.

Example 11 includes the method according to Example 1, wherein carbon-stripped, high pH seawater is passed through the passive air capture system.

Example 12 includes the method of Example 1, wherein $CO_2$ captured via the passive air system is precipitated as solid carbonates.

Example 13 includes the method of Example 1, wherein the input liquid is water stripped of carbonates.

Example 14 includes the method of Example 1, wherein neutral pH seawater and solid carbonates are returned to an ocean.

Example 15 includes the method of Example 1, wherein the input liquid is seawater having an increased salt concentration via one or more of reverse osmosis and/or nanofiltration units.

Example 16 includes the method of Example 1, wherein $CO_2$ capture is increased through the use of more than one capture source.

Example 17 includes the method of Example 1, wherein the input liquid is an element, mineral, or metal-containing liquid.

Example 18 includes the method of Example 17, further including precipitating at least one element, mineral, or metal from a portion of at least one hydroxide-rich stream.

Example 19 includes the method of Example 18, wherein at least one precipitated element, mineral or metal is lithium.

Example 20 is a method for the extraction of minerals via a hydroxide-rich stream, wherein the method includes inputting liquid, wherein the liquid is mineral-rich, performing electrolysis or electrodialysis on the inputted liquid to produce at least one hydroxide-rich stream, and precipitating hydroxide minerals for extraction from the at least one hydroxide-rich stream.

Example 21 includes the method of Example 20, wherein the electrolysis or electrodialysis is performed via a bipolar electrodialysis membrane plant.

Example 22 includes the method of Example 21, wherein a portion of the hydroxide-rich stream is used for the capture and sequestration of carbon dioxide as carbonates.

Example 23 includes the method of Example 20, further capturing $CO_2$ from the air via at least one hydroxide-rich stream.

Example 24 includes the method of Example 20, further including precipitating air-captured $CO_2$ as carbonates.

Example 25 includes the method of Example 20, further including precipitating air-captured particulate matter metals and minerals.

Example 26 includes the method of Example 20, wherein mixed hydroxides generated by electrochemistry minimizes cost and need for purification.

Example 27 includes the method of Example 20, wherein a high pH solution that has had metals, minerals, and $CO_2$ removed is passed through a passive air capture system.

Example 28 includes the method of Example 20, wherein $CO_2$ is captured by exposing a high pH solution to the air.

Example 29 includes the method of Example 20, wherein solid carbonates and/or metal compounds are precipitated, collected, and deposited on land or into an ocean or other water body.

Example 30 includes the method of Example 20, wherein costs for extraction of metals and minerals are greatly reduced by increasing seawater salt concentration prior to the use of the input liquid in electrodialysis.

Example 31 includes the method of Example 20, wherein at least one hydroxide-rich stream comprises lithium hydroxide.

Example 32 includes the method of Example 20, wherein the hydroxide minerals are precipitated and saved in solid form.

Example 33 is a method for the capture and sequestration of carbon dioxide ($CO_2$) that includes inputting liquid, performing electrolysis or electrodialysis on the inputted liquid to produce at least one hydroxide-rich stream, capturing $CO_2$ in gas form from the air using the hydroxide rich stream and a passive air capture system, and precipitating air-captured $CO_2$.

Another example includes a method for capturing and sequestering carbon dioxide that includes receiving a saltwater input liquid, performing an electrochemical process on the input liquid to produce at least one hydroxide-rich stream, and capturing $CO_2$ from air using the hydroxide-rich stream and a passive air capture system, thereby producing a liquid carbonate solution containing air-captured $CO_2$. In various cases this example also includes performing the electrochemical process comprises performing electrodialysis with an electrodialysis (ED) stack, the ED stack having ED-cells, each ED-cell having a bipolar membrane, an anion permeable membrane, and a cation permeable membrane. In some cases the example method includes precipitating one or more of carbonic acid, bicarbonates, and $CO_2$ as solid carbonates from the hydroxide-rich stream to produce a carbon-stripped, high pH hydroxide-rich stream for capturing $CO_2$ with the passive air capture system. In various cases of the example method, performing the electrochemical process includes performing electrolysis with an electrolysis unit and the method also includes producing the at least one hydroxide-rich stream, hydrogen gas, and chlorine gas with the electrolysis unit. In various implementations of the example method, performing the electrochemical process includes performing electrodialysis with a bipolar membrane electrodialysis unit constructed and arranged to produce the hydroxide-rich stream, a hydrogen-rich stream, and hydrogen gas.

Another aspect of the disclosed technology relates generally to the sequestration, storing, production, and/or handling of elements and compounds, such as carbon, hydrogen, chlorine, carbon dioxide, and other minerals and metals. In various implementations, devices, methods, and design principles allow for the capture and sequestration of carbon dioxide through the use of liquid sources (e.g., seawater), electrolysis, and passive air capture. In various implementations, carbon dioxide is ultimately converted to calcium carbonate and stored in that form in the ocean or other locations. In various implementations, the carbon dioxide is captured as gas and stored in that form. In various implementations, hydrogen and/or chlorine gases are also produced.

Hydrogen is an essential energy carrier that is used to generate electricity and heat. It is also used in fertilizer production and in petroleum refining. Hydrogen is largely produced through steam methane reforming and electrolysis of water molecules. Current hydrogen production processes use fossil fuels and emit considerable carbon dioxide into the atmosphere ("grey hydrogen"). Even hydrogen manufacturing plants equipped with carbon capture and storage ("blue hydrogen") are not considered a clean alternative as they are not carbon dioxide neutral.

The disclosed integrated technology also relates to the manufacturing of hydrogen using renewable energy ("green hydrogen") for electrolysis of alkaline mediums such as seawater or artificial brine and the simultaneous reduction of carbon dioxide either from the air or from industry gases and storing the carbon dioxide in the form of carbonates or in gas form. In certain implementations, the disclosed systems, devices, and methods allow for the production of chlorine gas ("green chlorine") and an aqueous sodium hydroxide solution. In certain implementations, the disclosed systems, devices, and methods allow for the production of hydrochloric acid by a direct combination of hydrogen and chlorine gases. Further implementations will be readily apparent to those of skill in the art.

Additional implementations relate to various devices, systems, and methods for the production of green hydrogen integrated into a process that also results in the capture and sequestration of carbon dioxide as carbonates or as a gas. In some cases, this combined process employs one or more of the following elements: electrolysis of an alkaline medium, the manufacture of hydroxide-rich liquids for the joint function of particulate matter reduction and the capture of carbon dioxide ($CO_2$), and/or the precipitation of carbonates and storing of such carbonates in the ocean or other location. In some cases, the process also allows for the capture and storage of $CO_2$ as a gas. Various examples and implementations related to this aspect of the disclosed technology include the following:

Example 34 includes a method for the capture and sequestration of carbon dioxide ($CO_2$). The method includes inputting liquid, performing electrolysis on the inputted liquid to produce at least one hydroxide-rich stream, capturing $CO_2$ from air using the hydroxide-rich stream and a passive air capture system, and precipitating air-captured $CO_2$.

Example 35 includes the method of Example 34, wherein the precipitated air-captured $CO_2$ is stored as carbonates or gas.

Example 36 includes the method of Example 34, wherein electrolysis of an alkaline medium or artificial brine is performed using renewable energy to produce green hydrogen gas, green chlorine gas, and an aqueous hydroxide-rich solution.

Example 37 includes the method of Example 34, wherein the input liquid is saline water.

Example 38 includes the method of Example 37, wherein the saline water is filtered.

Example 39 includes the method of Example 34, which further comprises at least one of (a) providing a continuous high-velocity feed of input water, or (b) a nanofiltration step.

Example 40 includes the method of Example 34, wherein at least one hydroxide-rich stream is not purified.

Example 41 includes the method of Example 36, wherein the electrolysis cell includes one or more ion-permeable membranes, electrodes—cathode, and anode where hydrogen and chlorine gases are produced. Multiple electrolysis cells can be connected either in series or in parallel depending on the salt concentration in the input water and the efficiency of the cell.

Example 42 includes the method of Example 41 and further includes an alkaline chamber with several inlets and outlets for salt and hydroxide-rich solutions.

Example 43 includes the method of Example 34, wherein carbonic acid, bicarbonates, and $CO_2$ are precipitated continuously as solid carbonates after electrolysis.

Example 44, the method according to Example 34, wherein hydroxide-rich, high pH aqueous solution is passed through the passive air capture system.

Example 45 includes the method of Example 34, wherein $CO_2$ captured via the passive air system is precipitated continuously as solid carbonates.

Example 46 includes the method of Example 34, wherein the input liquid is water stripped of carbonates.

Example 47 includes the method of Example 34, wherein neutral pH seawater and solid carbonates are returned to an ocean or other location.

Example 48 includes the method of Example 34, wherein the input liquid is seawater having an increased salt concentration via one or more reverse osmosis and/or nanofiltration/ion exchange.

Example 49 includes the method of Example 34, wherein $CO_2$ capture is increased through the use of more than one capture source.

Example 50 includes the method of Example 34, wherein the energy source is one or more forms of renewable energy such as wind, solar, geothermal, green hydrogen, and the like.

Example 51A includes the method of Example 50, and further includes producing green by-products along with one hydroxide-rich stream.

Example 51B includes the method of Example 51A, wherein at least one gas produced is green hydrogen gas.

Example 52 includes a method of producing green hydrogen and chlorine products along with a hydroxide-rich stream, wherein the method includes inputting alkaline liquid, performing electrolysis on the inputted liquid, and using renewable energy, to produce green hydrogen gas and at least one hydroxide-rich stream.

Example 53 includes the method of Example 52, wherein electrolysis is performed in a cell with ion-permeable membranes and electrodes and using renewable energy.

Example 54 includes the method of Example 52, wherein a portion of the hydroxide-rich stream is used for the capture and sequestration of carbon dioxide as carbonates.

Example 55 includes the method of Example 52, and further includes capturing $CO_2$ from the air via at least one hydroxide-rich stream.

Example 56 includes the method of Example 52, and further includes precipitating air-captured $CO_2$ as carbonates.

Example 57 includes the method of Example 52, and further includes precipitating air-captured particulate matter metals and minerals.

Example 58 includes the method of Example 52, wherein mixed hydroxides are generated by electrochemistry minimizing the cost and need for purification.

Example 59 includes the method of Example 52, wherein a high pH solution that has had metals, minerals, and $CO_2$ removed is passed through a passive air capture system.

Example 60 includes the method of Example 52, wherein $CO_2$ is captured by exposing a high pH solution to the air.

Example 61 includes the method of Example 52, wherein solid carbonates and/or metal compounds are precipitated, collected, and deposited into an ocean.

Example 62 includes the method of Example 52, wherein costs for green hydrogen production and renewable electricity are greatly reduced by increasing seawater salt concentration prior to the use of the input liquid in electrolysis cells.

Example 63 includes the method of Example 52, wherein at least one hydroxide-rich stream comprises sodium hydroxide.

Example 64 includes the method of Example 52, wherein the hydrogen and chlorine gases are stored in pressurized vessels.

Example 65 includes the method of Example 52, wherein the hydrogen and chlorine gases are combined and stored as hydrochloric acid.

Example 66 includes the method of Example 65, heat energy generated during the processes is captured and used for other upstream and downstream processes.

Example 67 includes a method for the capture and sequestration of carbon dioxide ($CO_2$). The method includes inputting alkaline liquid, performing electrolysis on the inputted liquid to produce at least one hydroxide-rich stream, capturing $CO_2$ in gas form from the air using the hydroxide-rich stream and a passive air capture system, and precipitating air-captured $CO_2$.

Another aspect of the disclosed technology relates generally to various devices, systems, and methods for simultaneous capture and sequestration of carbon dioxide as calcium carbonate and the extraction of lithium as lithium carbonate or as other compounds of lithium such as lithium hydroxide. Devices, systems, and methods can in some cases employ one or more of the following elements: the pretreatment of the alkaline water from geothermal brine or other sources with minerals such as lithium in them which include, among others, seawater, saline water, desalination concentrate; the manufacture of the hydroxide-rich alkaline stream and hydrogen-rich acidic stream through bipolar electrodialysis or an electrolysis process; the collection of $CO_2$ from the air in an air contactor and extraction of Li in an absorber using the hydroxide-rich alkaline and hydrogen-rich acidic streams; and the precipitation and post-processing of carbonates.

Further implementations relate to various devices, systems, and methods for the production of green hydrogen integrated into a process that also results in the capture and sequestration of carbon dioxide as carbonates or as gas and the extraction of lithium as lithium carbonate. This combined process in some cases employs one or more of the following elements: electrolysis of an alkaline medium, the manufacture of hydroxide-rich and hydrogen-rich liquids for the joint function of particulate matter reduction and the capture of carbon dioxide ($CO_2$), and extraction of Lithium, the precipitation of carbonates, and post-processing and storing of such carbonates. The process also allows for the capture and storing of $CO_2$ as a gas which can also be used for the direct conversion of lithium into lithium carbonate. Various examples and implementations related to this aspect of the disclosed technology include the following:

Example 68 includes a method for the simultaneous capture and sequestration of carbon dioxide ($CO_2$) along with the extraction of lithium as lithium carbonate. The method includes inputting liquid, performing bipolar membrane electrodialysis or electrolysis on the inputted liquid to produce at least one hydroxide-rich stream and one hydrogen-rich stream, capturing $CO_2$ from air using the hydroxide-rich stream and a passive air capture system, extracting lithium from the alkaline water using an absorber and a hydrogen-rich stream and precipitating air-captured $CO_2$ and lithium compounds.

Example 69 includes the method of Example 68, wherein the precipitated air-captured $CO_2$ is stored as carbonates or gas, and precipitated lithium compounds are stored as lithium carbonate or other forms of lithium compound such as lithium hydroxide.

Example 70 includes the method of Example 68, wherein the energy source is one or more forms of renewable energy such as wind, solar, geothermal, and green hydrogen.

Example 71 includes the method of Example 68, wherein electrolysis of an alkaline medium or artificial brine is performed using renewable energy to produce green hydrogen gas, green chlorine gas, and an aqueous hydroxide-rich solution. The green hydrogen and chlorine gases are stored in pressurized vessels for further processing or partially or fully combined in a combustion burner and the resultant gas is absorbed along with deionized water to form hydrochloric acid of various concentrations.

Example 72 includes the method of Example 71, wherein heat energy generated during the processes is captured and used for other upstream and downstream processes.

Example 73 includes a method for the capture and sequestration of carbon dioxide ($CO_2$). The method includes inputting alkaline liquid, performing electrolysis on the inputted liquid to produce at least one hydroxide-rich stream, capturing $CO_2$ in gas form from the air using the hydroxide-rich stream and a passive air capture system, and using the $CO_2$ to directly extract lithium from the absorber as lithium carbonate.

Another aspect of the disclosed technology relates generally to post-processing and sequestration in Direct Air $CO_2$ Capture and/or storing or handling of elements and compounds, such as sodium carbonate, carbon dioxide, sodium chloride, sodium hydroxide, calcium chloride, calcium hydroxide, and other minerals and metals. In various implementations, the disclosed technology relates to the devices, methods, and design principles allowing for the capture and sequestration of carbon dioxide through the use of liquid sources such as seawater, bipolar membrane electrodialysis or electrolysis, and passive air capture. In such implementations the carbon dioxide captured in the form of carbonates is either released in that form in a water body such as an ocean instead of storing on land or is partially or fully converted to calcium carbonate and stored in that form in a water body, such as an ocean, or another location. In some cases, the carbon dioxide is captured as gas and stored in that form.

In various cases, the disclosed technology uses liquid sources that are hydroxide-rich (e.g., sodium hydroxide) and hydrogen-rich (e.g., hydrochloric acid). For example, a sodium hydroxide-rich liquid when passed through an air capture system, which may be a static pond or an energy-intensive convection system for airflow, captures carbon dioxide in the form of sodium carbonate. Similarly, hydrogen-rich hydrochloric acid, when used in combination with certain rocks that are rich in minerals such as magnesium in the case of olivine, produces magnesium carbonate. Carbonates such as sodium carbonate and magnesium carbonate can be released into large water bodies such as the ocean to further increase the uptake of carbon dioxide from the atmosphere, stored on land, or ultimately converted to other carbonates such as calcium carbonate and then released into the ocean or stored on land.

The disclosed technology also relates to the post-processing of these hydroxide-rich and hydrogen-rich liquid solutions in ways that, among other things, optimize the process, increase the amount of carbon dioxide captured, and reduce the cost. In certain implementations, the disclosed systems, devices, and methods allow for the recycling of the aqueous hydroxide-rich solution left after the conversion of sodium carbonate to calcium carbonate. The recycled solution is passed to the bipolar membrane electrodialysis process for recovery and reuse. In another implementation, the disclosed systems, devices, and methods allow for the hydrogen-rich solution, after its reaction with mineral rocks such as olivine, to be recycled into the bipolar membrane electrodialysis process for recovery and reuse.

In various implementations of the disclosed technology, the disclosed systems, devices, and methods allow for the post-processing of sodium carbonate directly with a hydrogen-rich liquid source such as hydrochloric acid. Various implementations allow for the post-processing of sodium carbonate indirectly through an intermediate aqueous solution of compounds such as calcium hydroxide or calcium chloride. Such implementations recycle the sodium hydroxide solution or sodium chloride solution to the bipolar membrane electrodialysis process for recovery and reuse. In certain implementations of the disclosed technology, the disclosed systems, devices, and methods allow for the production of the intermediate aqueous solution such as calcium chloride from the divalent ion reject stream of the ion exchange and the hydrogen-rich liquid source as hydrochloric acid. Further implementations will be readily apparent to those of skill in the art.

Additional implementations relate to various devices, systems, and methods relating to the post-processing of solids and liquids after the capture of carbon dioxide through an air capture system. The post-processes, either individually or combined, employ one or more of the following elements: storing carbonates in a large body of water or on land, partial or full conversion of one form of carbonates into another prior to their storing, recovery, and reuse of the hydroxide-rich and the hydrogen-rich liquid solutions, and recovery and reuse of salt solution by treating the carbonates either directly with hydrochloric acid or indirectly with other compounds. The process also allows for the capture and storage of $CO_2$ as a gas.

Various examples disclosed herein relate to certain post-processing steps from various implementations described herein, that is after the air capture. These can include aspects such as: direct disposal of sodium carbonate into the ocean; recycling sodium hydroxide solution from the precipitator; recycling hydrochloric acid after neutralization over olivine rocks; recycling sodium chloride solution after direct neutralization of sodium carbonate with hydrochloric acid; recycling sodium chloride solution after indirect neutralization (through intermediate calcium chloride formation), and others. In various implementations, an air contactor may include a static pond or a cooling tower, or a fan employed for air convection. Various examples and implementations related to this aspect of the disclosed technology include the following:

Example 74 includes a method for the capture and sequestration of carbon dioxide ($CO_2$), including inputting liquid, performing bipolar membrane electrodialysis or electrolysis on the inputted liquid to produce at least one hydroxide-rich stream, capturing $CO_2$ from air using the hydroxide-rich stream and a passive air capture system, and precipitating air-captured $CO_2$.

Example 75 includes the method of Example 74, wherein the air capture unit includes a static pond that exposes the hydroxide-rich liquid to air.

Example 76 includes the method of Example 74, wherein the air capture unit includes a cooling tower for the contact between the hydroxide-rich liquid and air.

Example 77 includes the method of Example 74, wherein the air capture unit employs fans or other forms of energy for convection of air through the air capture unit while exposed to the hydroxide-rich liquid.

Example 78 includes the method of Example 74, wherein the precipitated air-captured $CO_2$ is stored as carbonates or gas.

Example 79 includes the method of Example 74, wherein the air-captured $CO_2$ is directly deposited in a water body or on land.

Example 80 includes the method of Example 74, wherein the hydroxide-rich liquid in the precipitator is recycled back to the electrochemical process step.

Example 81 includes the method of Example 74, the hydrogen-rich stream is neutralized over rocks such as olivine, and the mixture is sent to be deposited in a water body or on land. The excess hydrogen-rich stream is recovered prior to the deposition and recycled back to the electrochemical process step.

Example 82 includes the method of Example 74, wherein the air-captured $CO_2$ is recovered by acid neutralization of the sodium carbonates and stored as gas.

Example 83 includes the method of Example 82, the salt solution resulting from the neutralization is recycled back to the electrochemical process.

Example 84 includes the method of Example 74, wherein the air-captured $CO_2$ is converted to carbonates by reacting liquid sodium carbonate with other compounds such as calcium chloride or calcium hydroxide.

Example 85 includes the method of Example 84-, wherein the additional compounds, like divalent ions are sourced from the ion exchange process step or supplied from an external source, or both.

Another aspect of the disclosed technology relates generally to the post-processing of these hydroxide-rich and hydrogen-rich liquid solutions in ways, among other things, that include optimizing the process, increasing the amount of carbon dioxide captured, and reducing the cost. In certain implementations, the disclosed systems, devices, and methods allow for additional carbon dioxide absorption after the aqueous hydroxide-rich solution is converted to sodium carbonate in an air contactor. The sodium carbonate solution is passed through a single or a series of reactors that absorbs additional carbon dioxide to form sodium bicarbonate. The disclosed systems, devices, and methods allow for the use of carbon dioxide gas of varying concentrations.

In various implementations, the disclosed systems, devices, and methods allow for the post-processing of the sodium carbonate and the sodium bicarbonate solutions either directly with a hydrogen-rich liquid source such as hydrochloric acid or indirectly through an intermediate aqueous solution of compounds such as calcium hydroxide or calcium chloride. Various implementations recycle the sodium hydroxide or sodium chloride solution to the bipolar membrane electrodialysis process for recovery and reuse. Further implementations will be readily apparent to those of skill in the art. Additional implementations relate to various devices, systems, and methods relating to the post-processing of solids and liquids after the capture of carbon dioxide through an air capture system. Various examples and implementations related to this aspect of the disclosed technology include the following:

Example 86 includes a method for the capture and sequestration of carbon dioxide ($CO_2$), that includes inputting liquid, performing bipolar membrane electrodialysis or electrolysis on the inputted liquid to produce at least one hydroxide-rich stream, capturing $CO_2$ from air using the hydroxide-rich stream and a passive air capture system in the form of carbonates, capturing additional $CO_2$ from the industrial gas source to convert carbonates to bicarbonates, and precipitating the carbonates and bicarbonates for storage and disposal.

Example 87 includes the method of Example 86, wherein the $CO_2$ captured from the air and industrial sources is converted to calcium carbonate or other such mineral carbonates that are precipitated for storage and disposal on land or in water.

Example 88 includes the method of Example 86, wherein the sodium carbonate and sodium bicarbonate solution are injected directly into underground rocks for further mineralization and sequestration of the carbon dioxide captured.

Example 89 includes the method of Example 86, wherein the sodium carbonate and sodium bicarbonate solution are reacted with industrial waste products such as fly ash to form complex compounds that allow for further mineralization and sequestration of the carbon dioxide captured.

Example 90 includes the method of Example 86, wherein the air captured carbonates and bicarbonates are reacted with acid to form salts or hydroxides that are recycled and pure, concentrated, gaseous $CO_2$ that is compressed and stored for disposal.

Another aspect of the disclosed technology relates generally to the sequestration, sorting, and/or handling of elements and compounds, such as carbon, hydrogen, chlorine, carbon dioxide, and other minerals and metals in conjunction with devices, methods, and design principles allowing for the simultaneous capture/sequestration of carbon dioxide. Various implementations provide for the generation of hydrogen through the use of saline aqueous sources (e.g., seawater) with bipolar electrodialysis and passive air capture. Carbon dioxide is converted to solid calcium carbonate and ultimately stored in either the ocean or other location, or the carbon dioxide is captured and stored as a gas.

Bipolar membrane electrodialysis (BPED) is generally used in various implementations for the splitting of seawater into dilute hydroxide and acid streams. The disclosed technology relates to the manufacturing of multiple streams of products using BPED, including hydrogen gas, in addition to the hydroxide and acidic streams. Methods, devices, and systems in various implementations provide manufacture of green hydrogen gas, using BPED and renewable energy while simultaneously enabling removal carbon dioxide either from the air or from industrial gases, and storage of the carbon dioxide in the form of solid carbonates or in the gaseous form.

In various cases the BPED is designed such that an electrode with a negative charge (cathode) is placed adjacent to the cation-exchange layer of the bipolar membrane. The hydrogen ions generated from the dissociation of water in the bipolar membrane are (partially) consumed at the cathode via the hydrogen evolution reaction, in turn generating hydrogen gas and a relatively dilute acid stream. The hydroxyl ions generated on the opposite side of the bipolar membrane, on the other hand, are protected by an adjacent cation exchange membrane (CEM). Such a configuration produces multiple streams—dilute hydrochloric acid, hydrogen gas, and concentrated sodium hydroxide.

Various examples disclosed herein relate to various devices, systems, and methods relating to the production of green hydrogen gas, a concentrated hydroxide-rich stream, and a dilute hydrogen-rich stream, using BPED as part of a process that also results in the capture and sequestration of carbon dioxide as carbonates or as a gas. Various examples and implementations related to this aspect of the disclosed technology include the following:

Example 91 includes a method for the capture and sequestration of carbon dioxide ($CO_2$). The method includes inputting liquid, performing electrodialysis on the inputted liquid to produce at least one hydroxide-rich stream, capturing $CO_2$ from air using the hydroxide-rich stream and a passive air capture system, and precipitating air-captured $CO_2$.

Example 92 includes the method of Example 91, wherein electrodialysis of an alkaline medium or artificial brine is performed using renewable energy to produce green hydrogen gas, an aqueous hydrogen-rich solution, and an aqueous hydroxide-rich solution.

Example 93 includes the method of Example 91, wherein electrodialysis is performed in a cell with ion-permeable membranes and electrodes and using renewable energy such as wind, solar, geothermal, green hydrogen, or other renewable energy.

Another aspect of the disclosed technology relates generally to capturing and sequestering carbon dioxide from ambient air and industrial sources in conjunction with desalination of an input liquid and/or extraction of metals and minerals from the input liquid. Traditionally desalination facilities extract low TDS (total dissolved solids) water for residential and industrial use, from saline water such as seawater or brackish groundwater. In doing so the desalination facility uses energy resulting in carbon dioxide emissions and also creates a high saline brine reject that is often put back into the sea, resulting in an increasing salinity of the sea. Implementations of the disclosed technology relate generally to combined processes that closely integrate a desalination facility and carbon dioxide capture such that the waste streams (e.g., carbon dioxide emissions and high salinity water) are reduced and possibly eliminated, thus resulting in low or zero emissions and waste systems. In various implementations the system can simultaneously extract value add metals and/or minerals from the high salinity water depending on the elements present in it.

Various implementations according to the disclosed technology incorporate synergistic interdependencies that exist between desalination, mineral extraction, and carbon dioxide removal. For example, in the case of desalination, saline water such as seawater or brackish groundwater needs to be disinfected with chlorine-based compounds, filtered to remove elements like calcium that affect further processing of water and use energy to pressurize water for reverse osmosis. The carbon sequestration process uses salt that is from the reverse osmosis reject stream, creates chlorine-based byproducts for disinfection, forms sodium carbonate that is used in removing the calcium, and absorbs carbon dioxide that is produced when generating energy from fossil fuel. Further implementations will be readily apparent to those of skill in the art.

In various cases the integrated carbon sequestration and desalination process can also be combined with the mineral extraction process in which various minerals are dissolved in chlorine-based products such as hydrochloric acid and are precipitated using carbonate-based products such as sodium carbonate. Such products and processes are part of the carbon sequestration process. Further implementations will be readily apparent to those of skill in the art.

Various examples and implementations related to this aspect of the disclosed technology include the following:

Example 94 includes a method for the simultaneous capture and sequestration of carbon dioxide ($CO_2$) along with the desalination of saline water such as seawater and brackish water, and extraction of metals and minerals. The method includes inputting an input liquid, dissolving and extracting metals and minerals from the input liquid using solvents and carbonates from the carbon capture process, and recovering low total dissolved solids (TDS) water for residential and industrial use using reverse osmosis and other desalination related processes. The method also includes performing electrolysis on the high-salinity brine reject liquid to produce at least one hydroxide-rich stream, and one hydrogen-rich stream and capturing $CO_2$ from air using the hydroxide-rich stream and a passive air capture system.

Example 95 includes the method of Example 94, wherein seawater is pretreated with carbonates for removing calcium and other ions, and filtered prior to use in metal and mineral extraction processes, reverse osmosis processes for obtaining low TDS water, and electrochemical processes for solvent generation, to minimize fouling.

Example 96 includes the method of Example 94, wherein mineral extraction is done with a suitable sorbent used to preferentially absorb certain metals and mineral ions.

Example 97 includes the method according to Example 94, wherein the minerals are extracted by precipitating with carbonates produced in the carbon capture process and are then purified for subsequent sale.

Example 98 includes the method according to Example 94, wherein the saline water, such as seawater and brackish groundwater is passed through desalination processes such as reverse osmosis to obtain a low TDS water for residential and industrial use. The energy required for desalination processes is obtained from fossil fuel energy source and the carbon dioxide generated in the process is absorbed in the carbon capture process.

Example 99 includes the method of Example 94, wherein the electrolysis is performed via a bipolar membrane electrodialysis stack or via multiple electrolysis units connected in series or parallel to produce at least one hydroxide-rich stream and one hydrogen-rich stream. Some or all of the byproduct gases from the electrolysis unit are combined to form a hydrogen-rich stream of hydrochloric acid.

Example 100 includes the method according to Example 94, wherein carbonic acid, bicarbonates, and $CO_2$ are precipitated continuously as solid carbonates after electrodialysis.

Example 101 includes the method of Example 94, in which the hydrogen-rich stream comprises hydrochloric acid, and the method further includes concentrating the hydrochloric acid to recover additional water for residential and industrial use. In various implementations the recovery of such water increases the efficiency of the desalination facility.

Example 102 includes the method of Example 94 and further includes passing the input liquid through nanofiltration and ion exchange processes. In various cases the concentrate produced by the nanofiltration and ion exchange contains high amounts of divalent ions such as calcium and magnesium. In such cases the method can also include treating the concentrate with alkaline and carbonate products to remove hardness. The water is then recycled back to the desalination facility for use in industrial and agricultural facilities.

According to another aspect of the disclosed technology, various devices, systems, and methods are provided for simultaneous capture and sequestration of carbon dioxide from ambient air and mineral extraction to form carbonates. The devices, systems, and methods employ one or more of the following elements: saline water, electrodialysis or electrolysis of salt water, the manufacture of hydroxide-rich alkaline stream for absorption of $CO_2$ from air using an air contactor and from industrial gases using bubble column reactor, and the manufacture of hydrogen and chlorine-rich acidic stream for mineral extraction by dissolving the minerals and separating the impurities, and precipitating the extracted mineral in form of hydroxides and carbonates.

In Example 103, a method for the simultaneous capture and sequestration of carbon dioxide ($CO_2$) along with the mineral extraction, comprising inputting a saline liquid, processing the salt water stream in bipolar membrane electrodialysis or electrolysis to produce at least one hydroxide-rich stream and one hydrogen-rich stream, capturing $CO_2$ from air using the hydroxide-rich stream and a passive air capture system; further absorbing $CO_2$ from industrial gases such as from fossil fuel energy generator, extracting metals and minerals by dissolving mined rock and rock waste in hydrogen-rich stream and finally using an absorber and hydroxide-rich stream or carbonate stream to precipitate in various forms, including as carbonates.

In Example 104, the method in Example 103, various process units used from carbon sequestration, including electrodialysis or electrolysis, air contactor for $CO_2$ capture from ambient air, nanofiltration and ion exchange for removing divalent ions, bubble column reactor or sparger for $CO_2$ capture from industrial gases, are performed using one or more forms of renewable energy such as wind, solar, geothermal, and green hydrogen.

In Example 105, the method of Example 103, wherein the carbon dioxide generated from the fossil fuel energy source is absorbed to for carbonates such as sodium bicarbonate.

In Example 106, the method of Example 103, the hydroxide-rich stream is sodium hydroxide and the hydrogen-rich stream is hydrochloric acid or hydrogen and chlorine gases. Sodium hydroxide captures $CO_2$ from ambient air to form sodium carbonate in an air contactor. The sodium carbonate absorbs another unit of $CO_2$ from industrial gases to for sodium bicarbonate in a bubble column reactor or a sparger.

In Example 107, the method of Example 103, wherein the mined rock and rock waste is first ground to powder and then dissolved in hydrogen-rich stream and filtered to remove impurities.

In Example 108, the method in Example 103, wherein the dissolved metals and minerals are precipitated using solvents such as sodium hydroxide and sodium carbonate/bicarbonate solution that are produced as part of the carbon capture and sequestration process.

In Example 109, the method in Example 103, the salt solution after precipitation of the metals and minerals is recycled back to the electrodialysis (or electrolysis) after necessary filtration processes to produce hydrogen-rich and hydroxide-rich streams.

In Example 110, the method in Example 107, the hydrogen-rich acid stream is concentrated to recover additional water for in the process or release it for residential and industrial use.

Another aspect of the disclosed technology relates generally to the sequestration of carbon dioxide from ambient air and from industrial sources by hydrogenation to methanol. According to various implementations, the hydrogen byproduct produced during electrolysis, along with the solvent needed for carbon dioxide capture, is used up to hydrogenate the captured carbon dioxide to produce methanol. In various implementations renewable energy is used in the production of solvent and hydrogen, thus further resulting in the production of green methanol.

Traditionally methanol is produced from the steam methane reforming (SMR) process in which natural gas is used to form carbon dioxide, and carbon monoxide and is combined with hydrogen from water at high temperature and pressure in the presence of a catalyst to form methanol. Methanol is used as fuel storage and is also a primary ingredient for other chemical products including formaldehyde and a variety of other olefins such as ethylene, and propylene (Methanol-to-Olefins, MTO) process. The SMR process, and other similar traditional methanol manufacturing processes, release a significant amount of carbon dioxide gas. Implementations according to this aspect of the disclosed technology relate generally to an efficient process in which the carbon dioxide captured from ambient air and industrial gases is hydrogenated using green hydrogen byproduct produced along with the solvent needed for carbon capture. Thus, byproduct waste is reduced and captured carbon dioxide can be stored in the form of green methanol.

Various implementations of the disclosed technology provide devices, methods, and design principles enabling the capture and sequestration of carbon dioxide (e.g., from ambient air and/or industrial gases) through use of liquid sources such as seawater and electrolysis. In various cases the carbon dioxide is ultimately converted to mineral carbonate and stored in the ocean or another location. In some cases the carbon dioxide is captured as gas and stored in that form. Various implementations according to the disclosed technology also incorporate the hydrogenation of captured carbon dioxide gas or mineral carbonates using hydrogen produced as part of the electrolysis process step. In some cases the production of green methanol results from using renewable energy to fuel the process. The methanol produced from this process comes with low or zero carbon emission and, if necessary, can be further processed into other green chemical derivatives. Producing value-add products with products and byproducts from the carbon capture process results in creating a circular economy that can promote reduced emissions and greenhouse gases. Further implementations will be readily apparent to those of skill in the art. Various examples and implementations related to this aspect of the disclosed technology include the following:

Example 111 includes a method for the simultaneous capture and sequestration of carbon dioxide ($CO_2$) combined with hydrogenation of captured $CO_2$ to form methanol. The method includes inputting saline liquid, pretreating the liquid for removing hardness, and performing electrolysis on the high-salinity brine reject liquid to produce at least one hydroxide-rich stream and one hydrogen-rich stream. The method also includes capturing $CO_2$ from air using the hydroxide-rich stream and a passive air capture system.

Example 112 includes the method of Example 111, wherein carbon dioxide is captured from industrial gases using the hydroxide-rich solvent stream or the carbonate stream from the air capture system.

Example 113 includes the method of Example 111, wherein the electrolysis is performed via a bipolar membrane electrodialysis stack or via multiple electrolysis units connected in series or parallel to produce at least one hydroxide-rich stream and one hydrogen-rich stream. Some of the byproduct gases from the electrolysis unit are combined to form hydrogen-rich stream of hydrochloric acid.

Example 114 includes the method of Example 111, wherein carbonic acid, bicarbonates, and $CO_2$ are precipitated continuously as solid carbonates.

Example 115 includes the method of Example 111, wherein carbonates are neutralized with hydrochloric acid to re-release pure $CO_2$ which is combined with the hydrogen gas produced from electrolysis, in presence of a catalyst, at high temperatures and pressures, to form methanol.

Example 116 includes the method of Example 111, wherein carbonates are directly treated with hydrogen in presence of catalyst such as ruthenium and other chemicals such as alcohols to form methanol.

Example 117 includes the method of Example 111, further including using renewable energy.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

One

Figure 1:
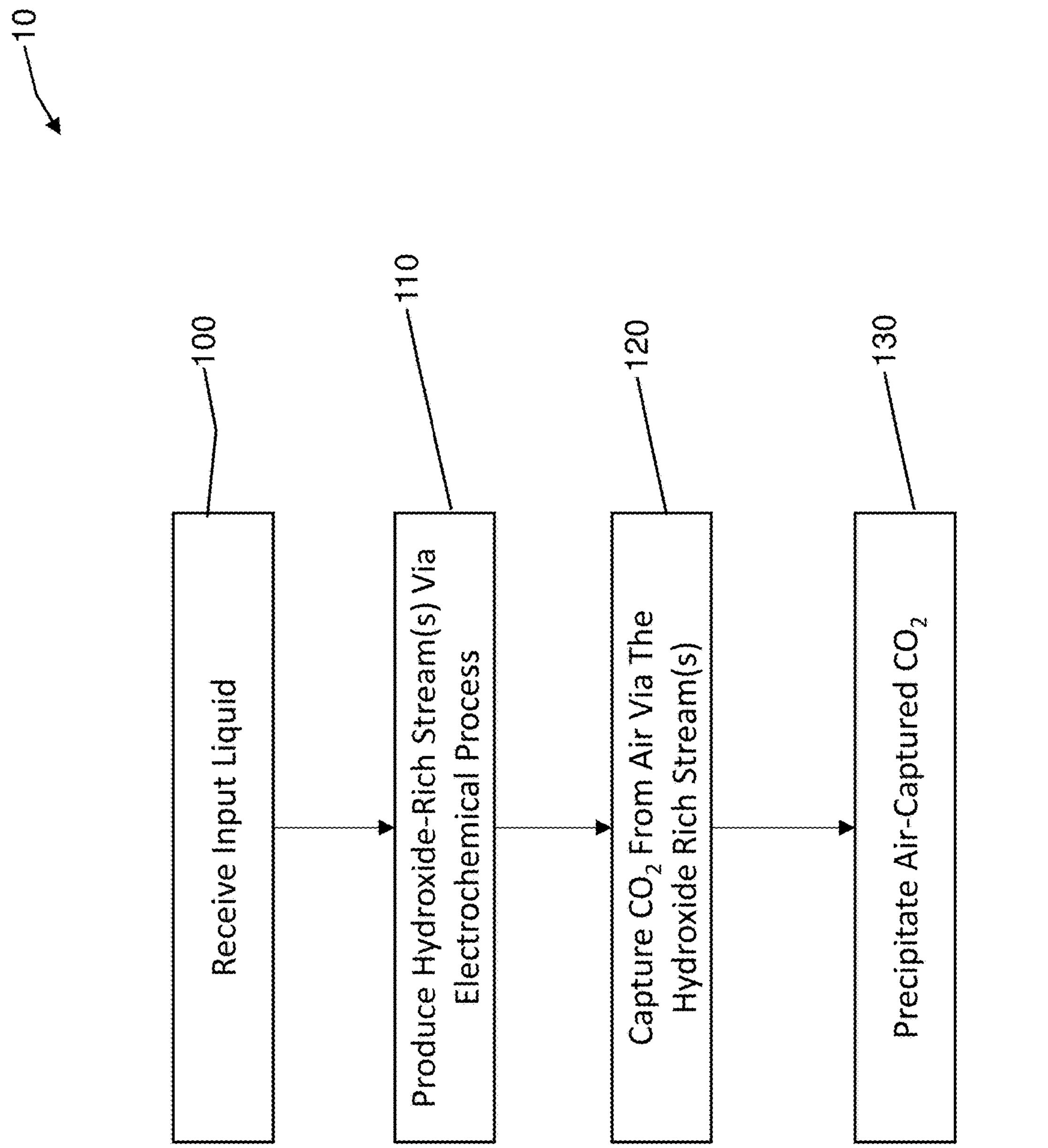
FIG. 1 shows a flow chart of a carbon capture process, according to one implementation.

The various examples and implementations disclosed or contemplated herein relate to methods, systems and devices for the capture and sequestration of carbon dioxide. Various implementations use an electrochemical process such as, for example, electrodialysis (ED) or electrolysis, to produce a hydroxide-rich flow from an input liquid such as a saline water. The hydroxide-rich stream can be used along with passive airflow over packing structures to directly capture $CO_2$ from the air. In various implementations solid carbonates are precipitated from the resulting liquid carbonate solution and then deposited in a body of water or otherwise stored. In some implementations the liquid carbonate solution is also or instead processed to release and store the captured $CO_2$ as a gas.

Additional liquid input can be used to continue the process, so as to operate the process in a continuous fashion. In various cases the input liquid is saline water, i.e., water with one or more dissolved salts such as, for example, sodium chloride. In some cases the input liquid is a saline water such as seawater. In various cases the input liquid is desalination brine, brackish water, brine effluent or another salt water.

As described herein, the disclosed technologies are often referred to broadly as a system 10, a capture system 10, or a carbon capture system 10, though it is understood that this is for brevity and is in no way intended to be limiting to any specific modality.

One object of various implementations of the capture system 10 is to minimize the energy use associated with $CO_2$ extraction methods. In various implementations the system does not rely on the use of calciners or boilers, and thus does not require constant power. This in turn means that various implementations can be powered exclusively via intermittent/renewable power. Another object of the disclosed system 10 according to various implementations is to maximize the collection of $CO_2$ by collecting $CO_2$ both in the creation of a solvent and directly from the air. Further, an object of various implementations is to provide air capture methods that eliminate the typical steps of heating a solvent or sorbent to extract $CO_2$ before capturing and sequestering the $CO_2$ by creating a stream of solid carbonates and depositing them in the ocean or other body of water, or on land. These and other objects are described in detail below.

Certain implementations of the capture system 10 relate to the sequestration of $CO_2$ using only saline water—such as seawater—and electricity. In these implementations, electricity is applied to saline water via an electrochemical process (e.g., electrodialysis or electrolysis) to create hydroxide-rich solvents which can be used to directly capture $CO_2$ from the air. The resulting precipitated solid carbonates are then deposited into a body of water, for example, an ocean, or on land. Additional saline water is used to continue the process, which can in some cases facilitate a continuous process for $CO_2$ capturing and sequestering, especially in locations with ready access to saline water.

In various representative implementations, the capture system 10 is performed offshore because such locations enable consistent wind flow, easy access to saline water such as seawater and easy depositing of precipitated carbonates back into the ocean. It is further appreciated that such locations minimize costs by avoiding or reducing the electrical costs of fans for air capture, can avoid or reduce transport costs for depositing carbonates in the ocean, and can reduce the pumping costs for seawater inputs.

In various alternative implementations, the capture system 10 can be employed onshore and can include various process modifications. These modifications can include, for example, 1) locating the system 10 near a source of saline water such as seawater, desalination brine, brackish water, brine effluent, or water with added salt, 2) locating the system 10 near a location with sustained winds and/or solar radiation, and/or 3) locating the capture system 10 near a site for the accumulation of solid carbonates.

FIG. 1 depicts an implementation of the carbon capture system 10 and various of its operational flows according to aspects of the disclosed technology. In this implementation, a variety of optional steps are performed. For example, in various implementations the system comprises a process having steps such as receiving an input liquid (box 100) and performing an electrochemical process such as, for example, electrolysis or electrodialysis on the input liquid to produce at least one hydroxide-rich stream (box 110). The process also includes capturing $CO_2$ from air using the hydroxide-rich stream and a passive air capture system (box 120), and precipitating air-captured $CO_2$ (box 130) as, for example, carbonates.

Figure 2:
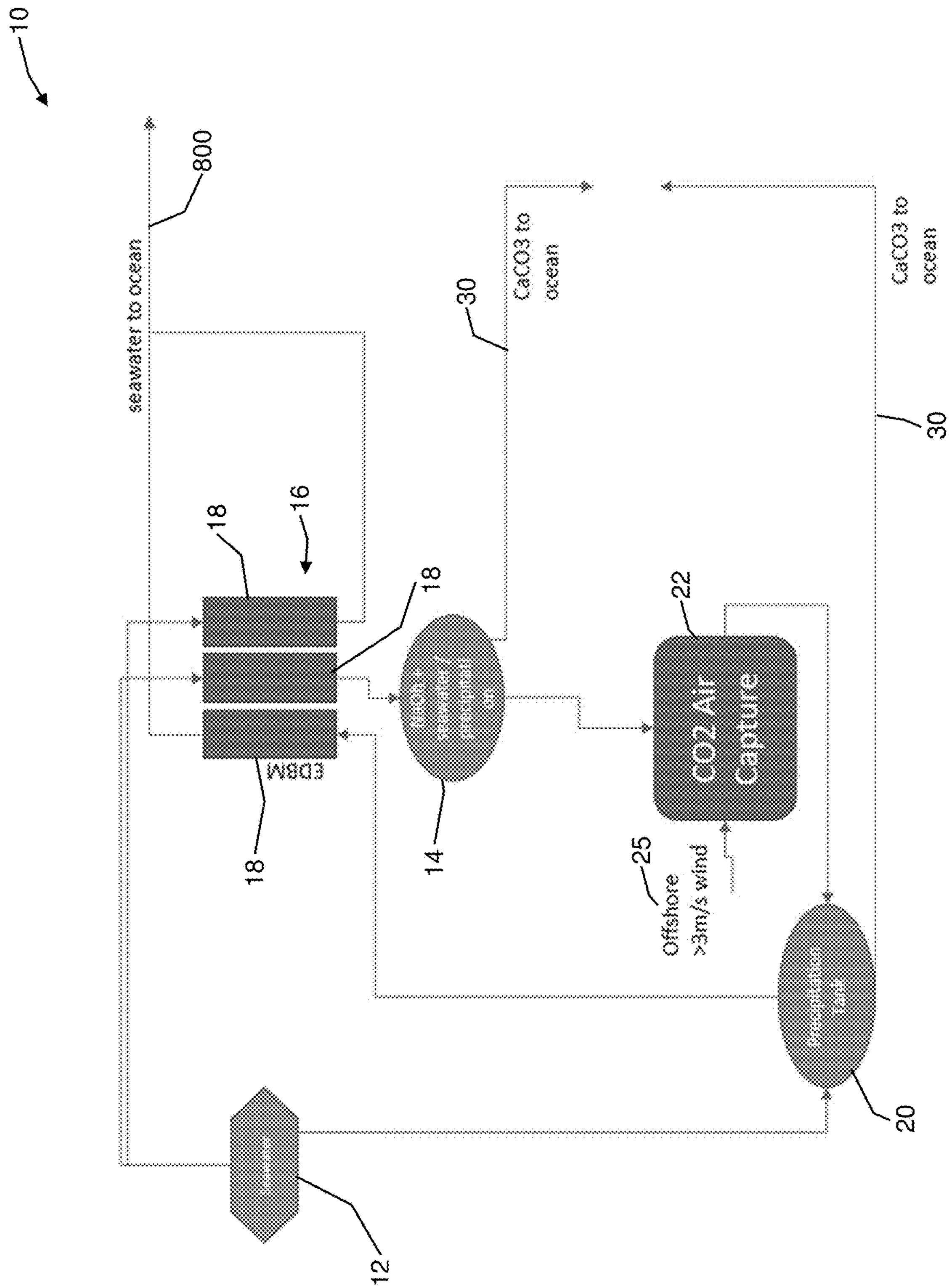
FIG. 2 shows a flow chart of the capture process, according to one implementation.
Figure 3:
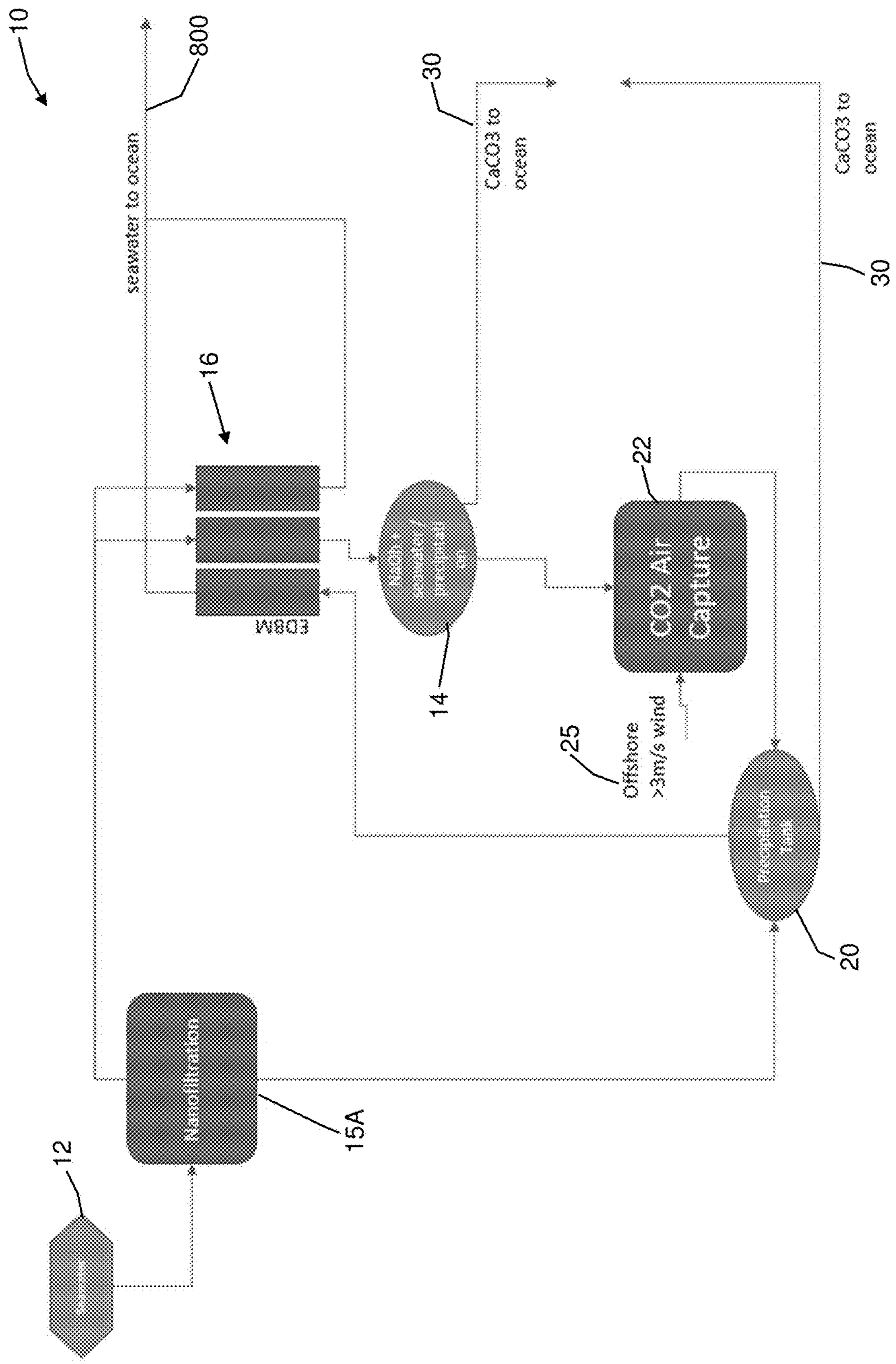
FIG. 3 shows potential pretreatment steps prior to electrodialysis, including nanofiltration and microfiltration, according to one implementation.
Figure 4:
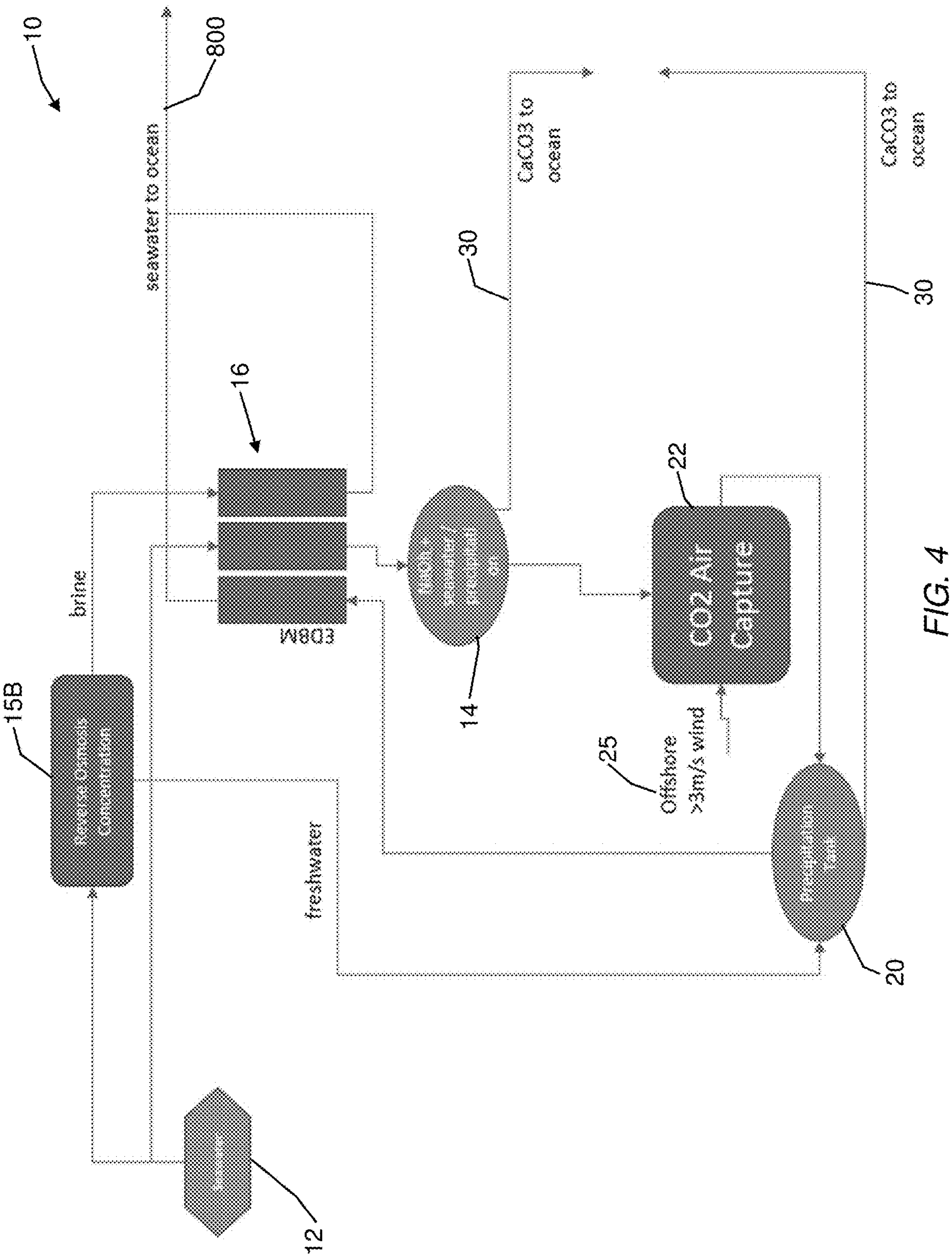
FIG. 4 shows an alternate process that pre-concentrates the feed streams, according to one implementation.

Turning to FIGS. 2-4, in various implementations of the capture system 10, an input liquid 12 such as seawater or other saline liquid is fed into the capture system 10 to produce an hydroxide-rich stream 14 containing salts such as NaOH and/or MgOH and/or CaOH and/or other hydroxides. It is understood that the capture system 10 and other implementations and examples described herein comprise one or more fluidic and/or electrical connections (shown generally at the lines) between a variety of optional components that can be arranged in a wide variety of arrangements, such that the various fluids/gases and electricity described herein are able to flow as described.

In various implementations, after the liquid input 12 enters the system 10, some portion of the input liquid 12 is exposed to an electrochemical processor 16. In various implementations the electrochemical process 16 includes electrodialysis (ED), as shown in FIGS. 2-4. In such cases the electrochemical processor includes an electrodialysis unit such as an ED stack that is configured to perform electrodialysis on the liquid 12. In various implementations, the ED stack comprises a stack of membranes 18 disposed between a positively charged plate and a negatively charged plate for bipolar electrodialysis (BPED). In such cases, the ED stack may also be referred to as an electrodialysis bipolar membrane (EDBM). In various implementations, the ED stack is configured or otherwise comprises a set of repeating ED-cells 18 in a 3-chamber pattern. This pattern includes repeating bipolar membranes and anion and cation permeable membranes.

Optionally, maintaining a sufficient flow rate through the electrodialysis unit can largely avoid the common problem in water purification systems of membrane fouling. As an example, in some cases the electrodialysis unit receives a continuous, high-velocity feed of the input liquid, e.g., water. Periodic reversing of the polarity of the system also serves to protect the membranes.

In various implementations, the electrochemical process 16 includes electrolysis, as will be described in greater detail further herein. In such cases the electrochemical processor 16 may include, for example, an electrolyzer to process the input liquid 12.

Returning to FIGS. 2-4, in use according to certain implementations, application of electricity via the electrochemical processor 16 causes the creation of the hydroxide-rich stream 14 from the input liquid 12. The hydroxides in this stream 14 are then available to capture $CO_2$ from the air 25 using a direct air $CO_2$ capture mechanism 22.

Certain of the saline water 12 that provided Ca+, Na+ and Mg+ ions to the ED stack 16 is now partially desalinated and of neutral pH. This seawater 800 can be returned to the ocean or used to balance pH of other waste streams before return.

Some or all of the hydroxide solution 14 is then sent to a direct air $CO_2$ capture mechanism 22 for the capture of carbon dioxide as carbonates. This mechanism can be one of many existing approaches. Once this stream 14 has progressed through the $CO_2$ capture system and becomes saturated with carbon, it is preferably sent to a precipitation system 20 to extract carbonates. In various implementations, the direct air capture system is preferably sited in a location with sustained wind speeds (shown at 25) to minimize flow time through the capture mechanism and energy cost.

In various implementations, the precipitation system includes a precipitation tank 20 in fluidic communication with the direct air $CO_2$ capture mechanism 22 and, optionally, one or more of the other system 10 components as described herein. As shown in FIGS. 2-4, in various implementations the precipitation tank 20 is connected upstream of the electrochemical processor 16. In some cases the tank 20 is coupled with a pretreatment stage, such as a nanofiltration stage 15A as shown in FIG. 3 or a reverse osmosis stage 15B as shown in FIG. 4. Additionally, in various implementations the precipitation tank 20 is coupled with the electrochemical processor 16, thus providing a recycling loop for the outflow from the air capture mechanism 22 after carbonates have precipitated from the stream in the tank.

In various implementations, the capture system 10 utilizes a method for the extraction of inorganic hydroxides that is given by:

$$X_a(O_bH_c)_m$$

where X represents any element or combination of elements that can chemically bond with oxygen and hydrogen or its multiple;

where at least one element in X is a group IA, IIA, IIIA, IVA, IB, IIB, IIIB, IVB, VB, VIIB, VIIB, or VIIIB element of the periodic table; and where a, b, and c are stoichiometrically determined positive integers.

According to certain implementations, the capture and sequestration of $CO_2$ described above by using an input liquid 12 such as saline water and electricity (via the electrochemical process 16, e.g., ED stack) as inputs. In these implementations, electrochemistry and water are used to create hydroxides of the form of the hydroxide-rich stream 14 specified above, and these hydroxides can then be used to directly capture $CO_2$ from the air.

As shown and discussed, the system 10 allows for the precipitation of solid carbonates after capturing $CO_2$ from the air. According to various implementations, the precipitation is given by:

$$X(CO_3)_m$$

where X is any element or combination of elements that can chemically bond with a carbonate group or its multiple;

where at least one said element is a group IA, IIA, IIIA, IVA, IB, IIB, IIIB, IVB, VB, VIIB, VIIB, or VIIIB element of the periodic table; and where m is a stoichiometrically determined positive integer.

Following such precipitation, solid carbonates can be placed into the ocean or other body of water to facilitate increased alkalinity.

Carbonates recovered from throughout the process can be returned to the ocean as shown in these implementations at 30, or to another body of water. As anthropogenic atmospheric carbon has increased, the air/water equilibrium has shifted and an increasing fraction of $CO_2$ is absorbed into the ocean as carbonic acid and bicarbonates. This has led to an increase in ocean acidity. Depositing carbonates from the process described herein into the ocean helps to counteract ocean acidification and support certain sea life dependent on carbonates.

The depositing of carbonates is, in certain implementations, performed in a location where these deposited carbonates will sink below the carbonate compensation depth and dissolve. Below this depth, the cool temperature and high pressure leads calcium carbonate to dissolve. Once dissolved, the Ca+ ions and carbonate ions can disperse through the ocean.

As noted above, in certain implementations, the input liquid 12 passes through one or more optional pretreatment stages 15 before entering the electrochemical processor 16. As one example, in some cases an optional filtration system 15A is utilized, such as a nanofiltration and/or a microfiltration system, as would be appreciated. In various cases the nanofiltration and/or microfiltration helps remove divalent ions from the concentrated sodium chloride solution making up at least part of the input liquid 12.

As shown in the implementation of FIG. 4, an optional reverse osmosis concentration system 15B is used to pre-concentrate a saline input liquid 12 (e.g., seawater) for use in the electrochemical processor 16 in some cases. In various implementations the efficiency of the electrochemical processor 16 (e.g., an ED bipolar membrane as shown in FIG. 4) increases with concentration of seawater, and so there are cost efficiencies in adding a standard reverse osmosis (RO) stage or an additional electrodialysis step prior to the electrochemical processor 16. Seawater is typically 30-35 g/l NaCl and other dissolved solids. In various implementations additional concentration by RO or ED can increase the concentration of brine to 70-100 g/l.

Figure 5:
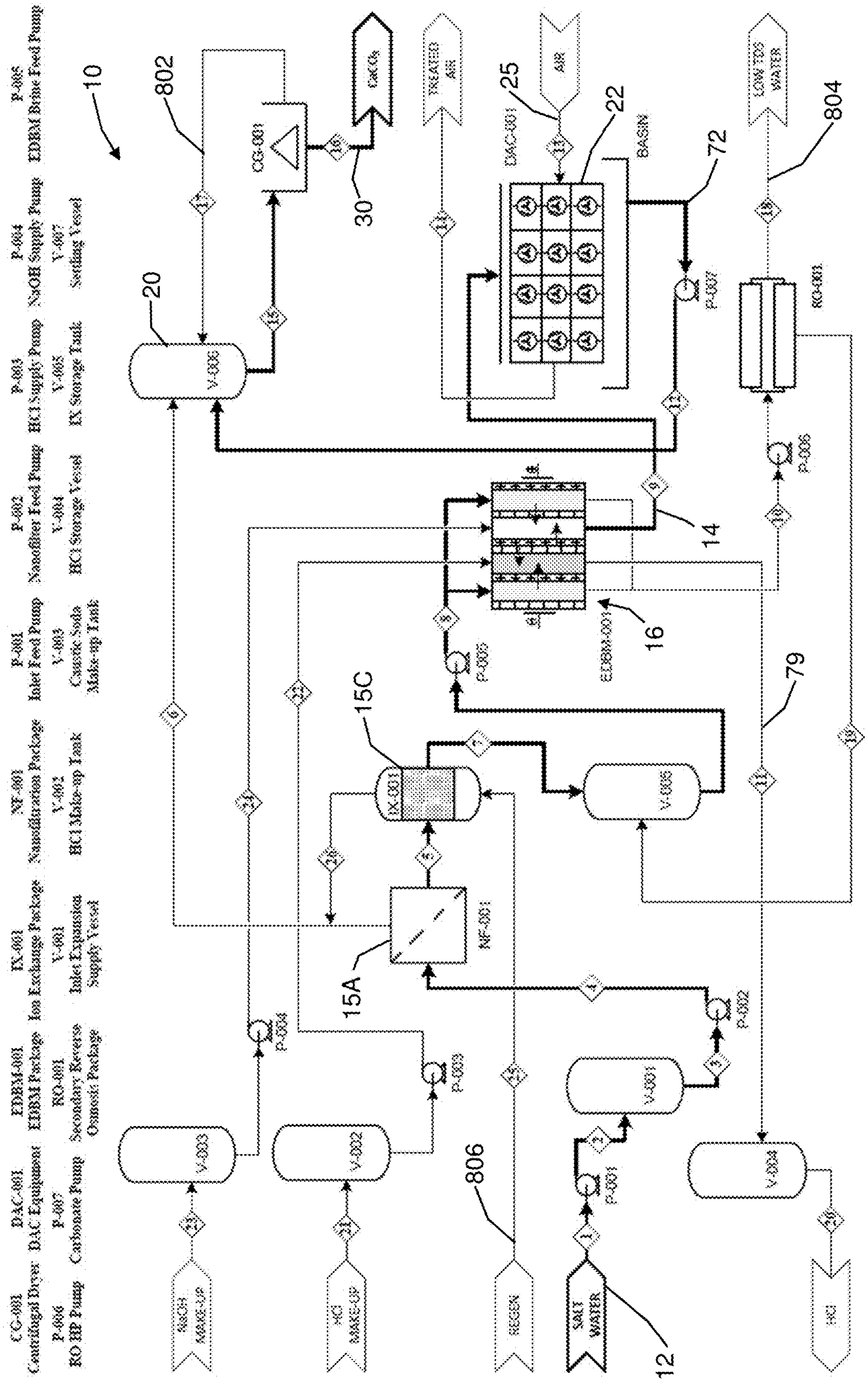
FIG. 5 is a flow chart depicting a carbon capture process, according to one implementation.

Another example of an optional pretreatment stage is shown as part of the carbon capture process and system 10 in FIG. 5. The pretreatment stage in this case includes a filtration system 15A and an ion exchange package 15C upstream from the electrochemical processor 16, the optional ion exchange system 15C can be useful for removing divalent ions from the input liquid to improve the feed composition for an electrochemical processor such as, for example, an electrodialysis bipolar membrane (EDBM).

Continuing with FIG. 5, the illustrated flow diagram provides a detailed depiction of the carbon capture process and system 10, according to one possible implementation. The detailed diagram depicts a number of pumps, vessels, and other components of the system, in addition to fluid connections between relevant components. It will be appreciated that the system may include fewer and/or additional components and aspects that are not shown in various cases.

Beginning at the left of the flow diagram, an input liquid 12 (in this example salt water) is pumped into an expansion vessel (V-001) before flowing to a pretreatment stage. The pretreatment stage in this case includes a nano-filtration unit (15A) and an ion exchange unit (15C) to remove divalent ions such as, for example, calcium and magnesium. The output from this pretreatment stage (e.g., filtrate) is stored in a vessel (V-005) before sending it to an electrochemical processor 16. In this example the electrochemical processor is implemented by an electrodialysis bipolar membrane (EDBM-001).

In the electrochemical processor 16, the treated input liquid 12 (e.g., salt stream) is split into an hydroxide-rich stream (14) and a hydrogen-rich stream (79). The hydroxide-rich stream 14 is then passed through an air contactor (22) wherein the stream absorbs carbon dioxide from an air stream (25) to form carbonates. The carbonates stream (72) are then pumped to a precipitator or a settling tank (20) where they are mixed with divalent ion streams from the nano-filtration 15A and the ion exchange package 15C to form calcium carbonate. The calcium carbonate solution is then separated into a slurry of calcium carbonate solids (30). In some cases a centrifugal dryer CG-001 is used to separate out the slurry of solid carbonates 30 and water (802), which is recycled back into the system.

As will be appreciated, in this example the main input into the capture process 10 is salt water (12) and the main outputs are carbonate solids (30) and hydrochloric acid (79). In various implementations the process/system 10 uses one or more additional inputs and may generate one or more additional outputs. In various implementations one or more ancillary inputs and/or outputs are largely recycled within the system. For example, in some cases an output from the electrochemical process 16 is processed (e.g., by reverse-osmosis) and provides low total dissolved solids (TDS) water (804), which can be used as a makeup liquid for the EDBM unit. In some cases an HCl make-up stream and/or NaOH make-up stream are also used to facilitate the EDBM unit. In various implementations a regen stream 806 including, for example, some amount of HCl, is used to regenerate the ion exchange pretreatment stage 15C. As will be appreciated, additional inputs and/or outputs may be present in various implementations of the system 10.

Figure 6:
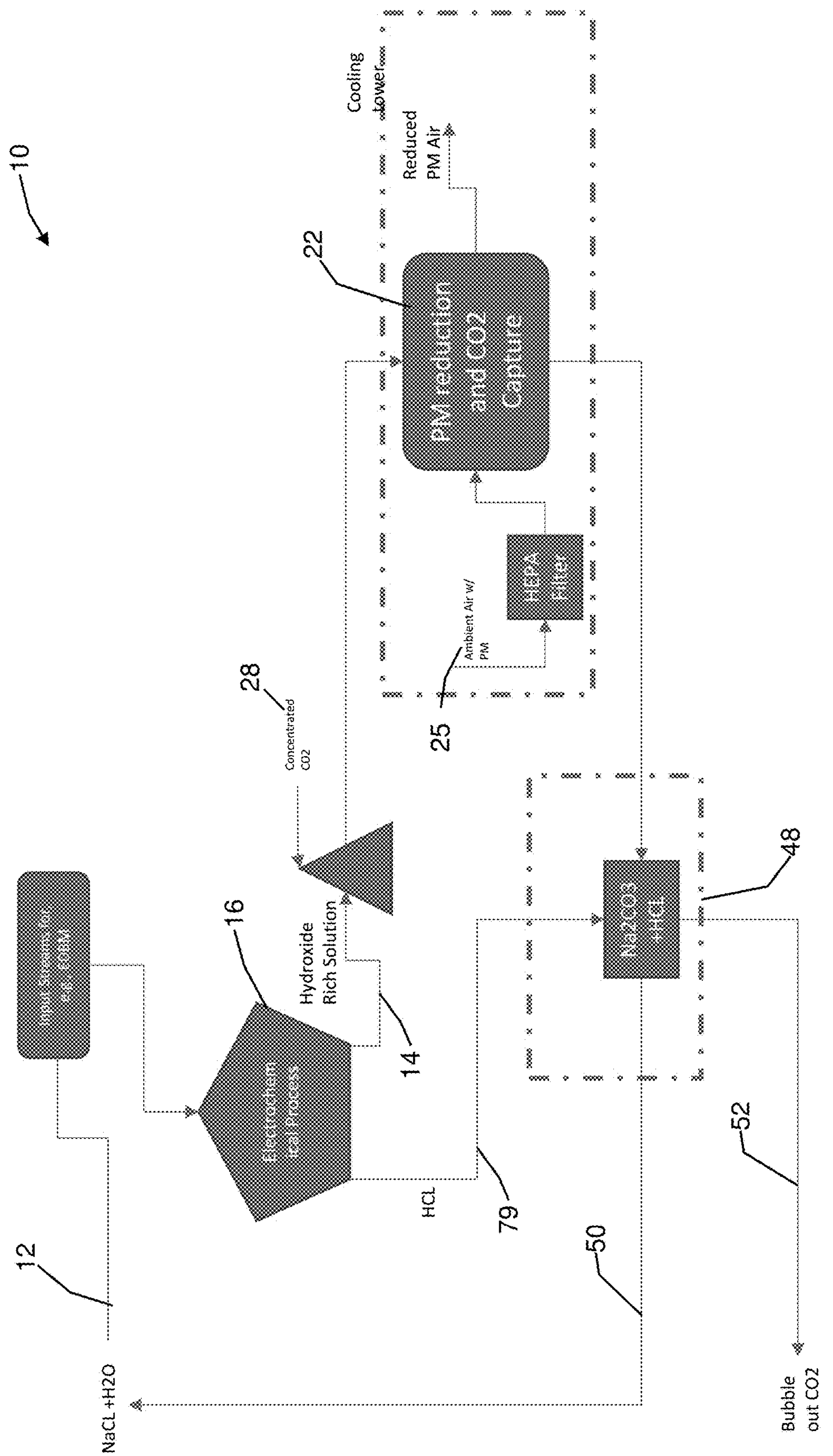
FIG. 6 depicts a further implementation of the system configured to capture carbon dioxide in gas form.

Turning to FIG. 6, in various implementations the capture system 10 is configured to capture $CO_2$ in gas form. As shown in FIG. 6, the system 10 is similar to the examples shown in FIGS. 2-5 with some modifications. The first is the mixing (shown generally at 48) of sodium carbonate ($Na_2CO_3$) produced by the direct air $CO_2$ capture mechanism 22 with a hydrogen-rich stream 79. This combination creates $CO_2$ in gas form 52 and saltwater 50. The salt water 50 can be returned to the electrochemical process 16 via the input liquid 12 for reuse in the process, and the gaseous $CO_2$ is stored.

The electrochemical process 16 in the system 10 of FIG. 6 can in some cases include an electrodialysis stack (e.g., an EDBM). In such cases, the electrodialysis stack receives the saltwater input liquid 12 and produces the hydrogen-rich stream 79, which is illustrated in this example as hydrochloric acid (HCl). The HCl can then be mixed with the sodium carbonate from the capture mechanism 16 to produce gaseous $CO_2$.

As one possible alternative, in various implementations the electrochemical process 16 includes an electrolysis unit. In such cases, the electrolysis unit produces, for example, hydrogen and chlorine gases in addition to a hydroxide-rich stream. The hydrogen and chlorine gases can then be combined in an HCl oven and a deionized water absorber to produce the hydrochloric acid 79, which can in turn be used to produce the gaseous $CO_2$ 52 when mixed with the $Na_2CO_3$ from the air capture system 22. Thus, various examples of the capture systems 10 providing a hydrogen-rich stream such as HCl may be equipped with an electrochemical process 16 implemented by either an electrodialysis stack or an electrolysis unit in combination with an HCl oven and deionized water absorber.

Further implementations of the disclosed systems and methods can be combined or otherwise utilized with the following additional examples, and the teachings of each of the disclosed implementations outlined herein can make use of the technologies disclosed in the other examples and aspects, such that the teachings contained herein all relate to variations on the implementations disclosed elsewhere herein. One of skill in the art would readily appreciate that in certain implementations, features or other aspects disclosed in any specific example detailed herein can be combined with additional features outlined in alternate examples, such that the instant disclosure contemplates combining various features for individual applications of the disclosed technology.

Two

Additional embodiments disclosed or contemplated herein relate to methods, systems and devices for the extraction, concentration and precipitation of various metals and mineral hydroxides as part of a capture and sequestration of $CO_2$ using containing water and salt inputs, electrochemical production of hydroxides, and airflow over packing structures.

Figure 7:
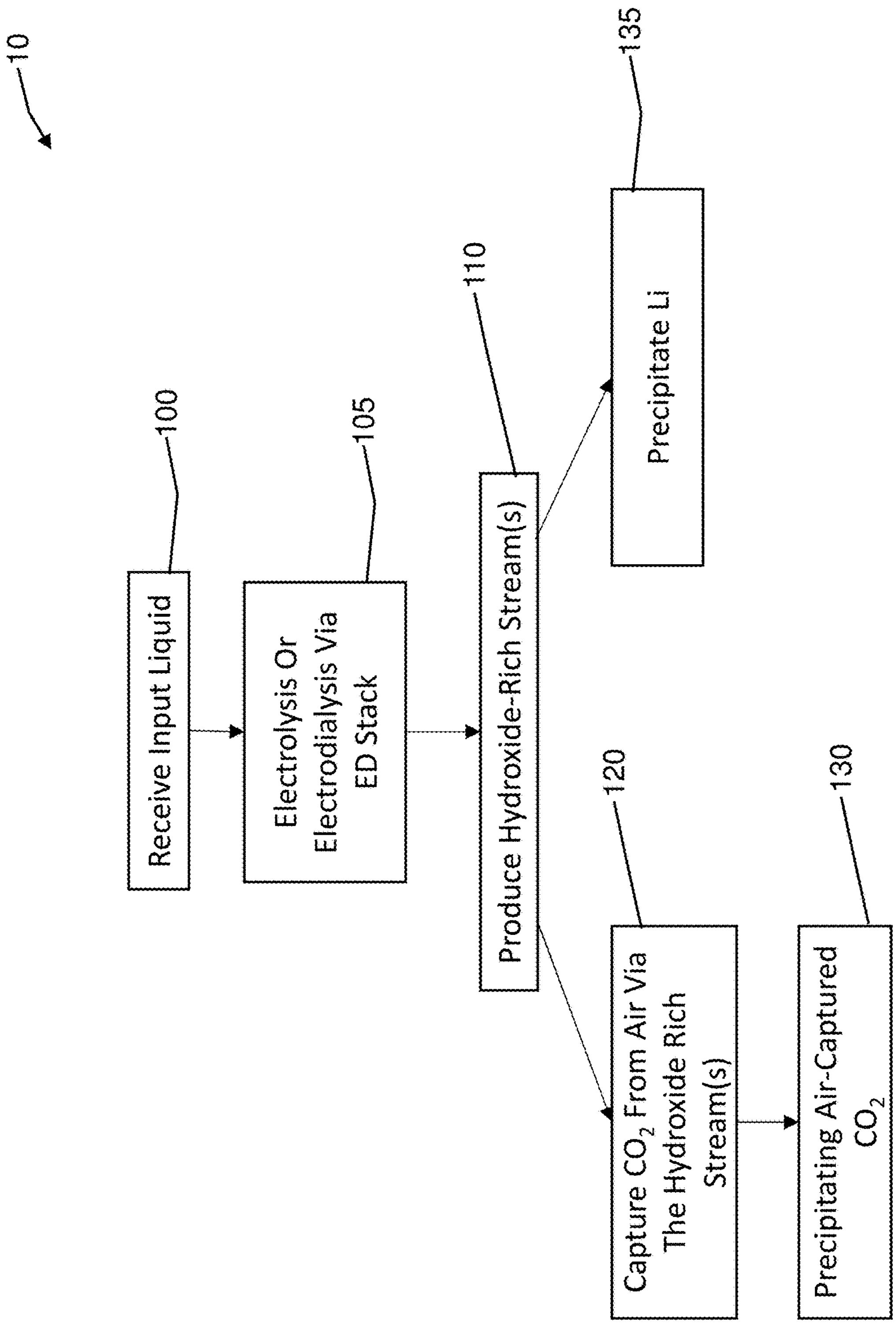
FIG. 7 depicts a flow chart depicting a carbon capture process, according to an implementation featuring the precipitation of lithium or another metal.

FIG. 7 depicts an implementation of the carbon capture system 10 and various of its operational flows according to aspects of the disclosed technology. In this implementation, a variety of optional steps are performed. For example, in various implementations the system comprises a process having steps such as receiving an input liquid (box 100), performing an electrochemical process, on the inputted liquid (box 105) to produce at least one hydroxide-rich stream (box 110), capturing $CO_2$ from air using the hydroxide-rich stream and a passive air capture system (box 120), and precipitating air-captured $CO_2$ (box 130). As shown in FIG. 7, in various implementations the electrochemical process is electrolysis. In various implementations the electrochemical process includes electrodialysis performed via an electrodialysis stack (box 105), such as an ED stack configured for bipolar electrodialysis (BPED). In certain implementations the capture system 10 further allows for the precipitation of minerals or metals, such as lithium (box 135).

As discussed above, additional carbon capture system 10 implementations disclosed or contemplated herein relate to methods, systems and devices for the extraction, concentration and precipitation of various metals and mineral hydroxides. The metals and mineral hydroxide processes can in various cases be implemented as part of the capture and sequestration of $CO_2$ using containing water and salt inputs, electrochemical production of hydroxides, and airflow over packing structures, as described herein.

Figure 8:
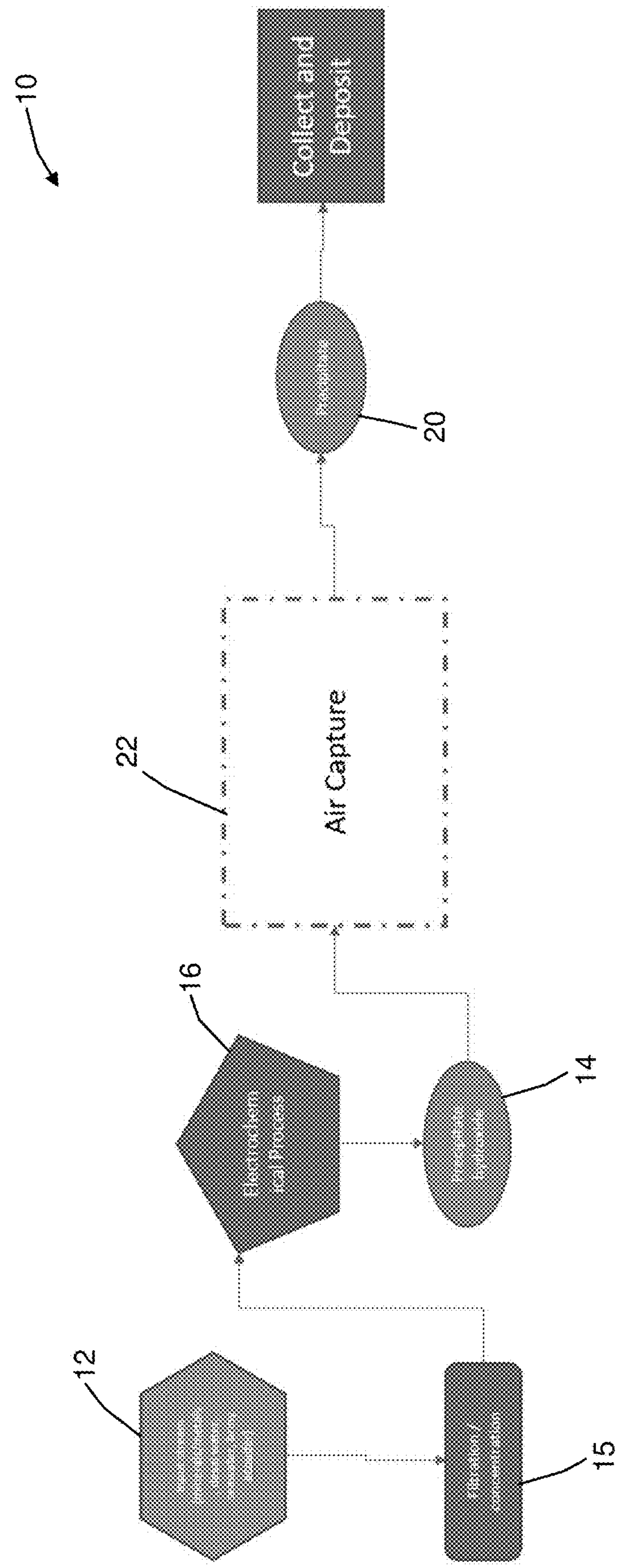
FIG. 8 shows a summary flow chart of one implementation of the disclosed system.
Figure 9:
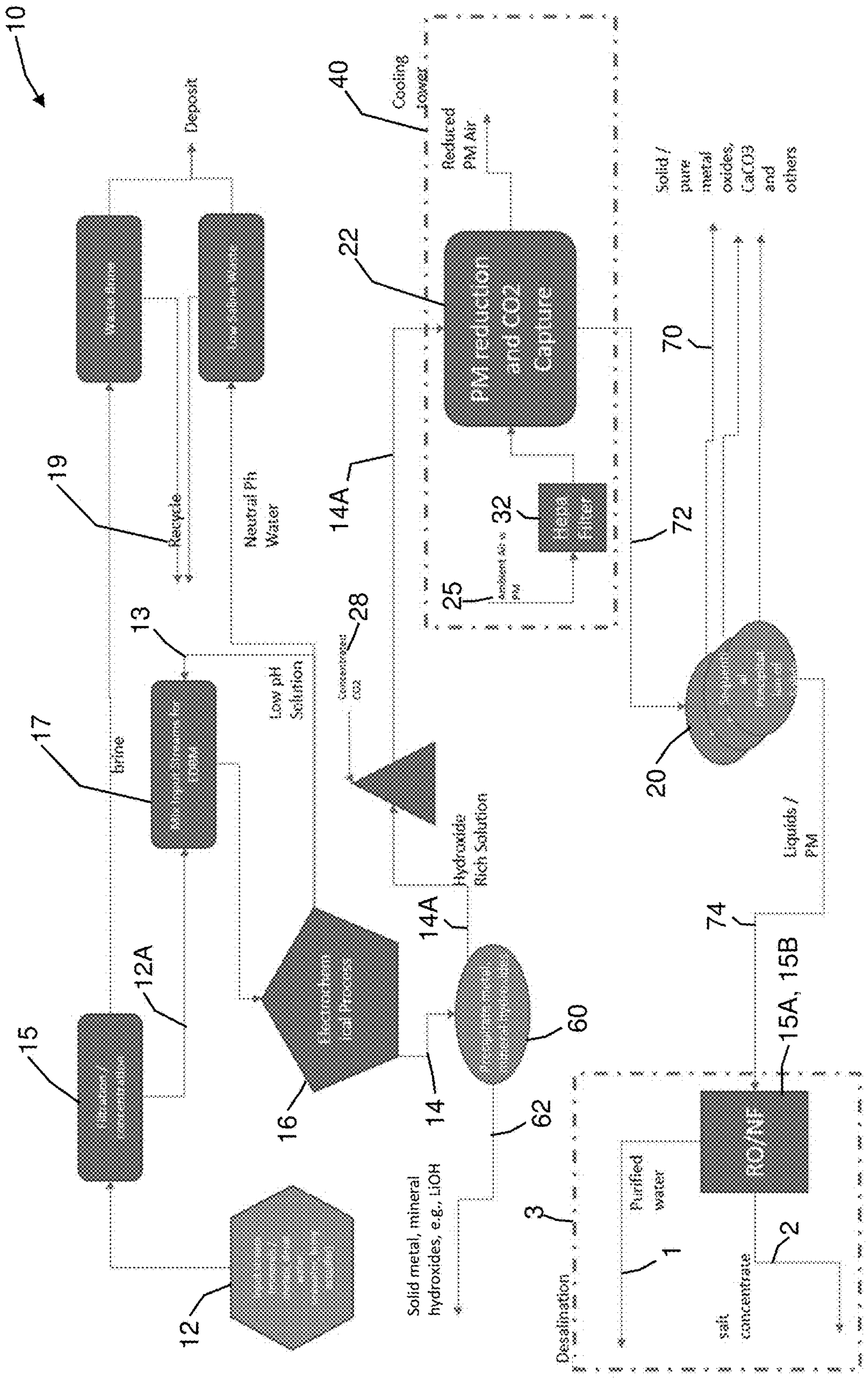
FIG. 9 shows a detailed flow chart of a carbon capture process, according to one implementation.
Figure 10:
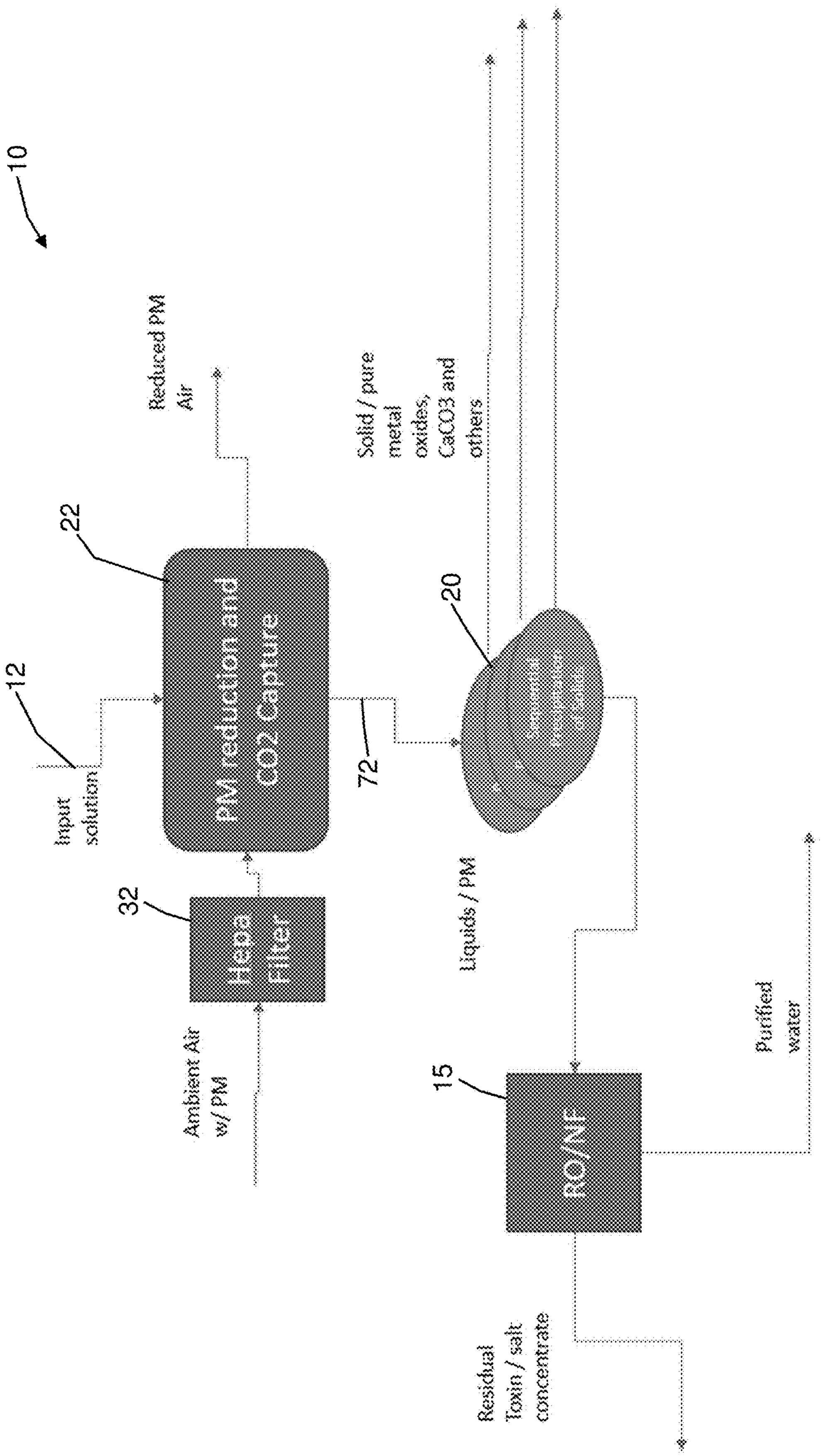
FIG. 10 shows detail of the particulate matter portion of the carbon capture process, according to one implementation of the disclosed system.

In certain implementations, in addition to the permanent $CO_2$ capture described above, the capture system 10 is also able to produce lithium, as shown in FIGS. 8-10, and in various cases can also reduce particulate matter concentrations in ambient air, as described herein. It is also understood that an object of various implementations of the capture system 10 described herein is to minimize the energy use and environmental impact associated with lithium and other metals extraction. Minimizing energy use itself is beneficial to the environment, plus the methods described have lower use of water and toxic chemicals than existing methods.

To that end, a capture system 10 according to certain implementations utilizes a method for the extraction of inorganic hydroxides that is given by:

$$X_a(O_bH_c)_m$$

- where X represents any element or combination of elements that can chemically bond with oxygen and hydrogen or its multiple;
- where at least one element in X is a group IA, IIA, IIIA, IVA, IB, IIB, IIIB, IVB, VB, VIIB, VIIB, or VIIIB element of the periodic table; and
- where a, b, and c are stoichiometrically determined positive integers.

The extraction according to certain implementations is done in combination with the capture and sequestration of $CO_2$ described above by using a metal- and/or mineral-containing input liquid 12 such as saline water 12 and electricity (via the electrochemical process 16, e.g., ED stack) as inputs, as is shown variously in FIGS. 8-10. In these implementations, electrochemistry and water are used to create hydroxides of the form of the hydroxide-rich stream 14 specified above, and these hydroxides can then be used to precipitate metal and mineral hydroxide solids and directly capture $CO_2$ from the air.

In these implementations, after capturing $CO_2$ from the air, the system 10 allows for the precipitation of solid carbonates as given by:

$$X(CO_3)_m$$

- where X is any element or combination of elements that can chemically bond with a carbonate group or its multiple;
- where at least one said element is a group IA, IIA, IIIA, IVA, IB, IIB, IIIB, IVB, VB, VIIB, VIIB, or VIIIB element of the periodic table; and
- where m is a stoichiometrically determined positive integer.

Following such precipitation, solid carbonates can be collected and/or deposited into the ocean or other body of water to facilitate increased alkalinity, as shown in FIGS. 8-10.

Continuing with reference to FIGS. 8-10, the system 10 comprises a variety of optional steps and sub-steps. In certain implementations, the system 10 comprises feeding mineral containing saline water as an input liquid 12 to an electrochemical process 16 such as a bipolar electrodialysis membrane/ED stack to produce a hydroxide-rich stream 14, as described above.

It is understood that in these implementations, the stream 14 can be divided into a number of discrete portions for varying uses. For example, in certain of these implementations of the system 10, portions of the hydroxide-rich stream 14 are used for capturing and precipitating air-captured $CO_2$ as carbonates and/or precipitating air-captured particulate matter, metals, and minerals such as lithium for use.

In these implementations of the system 10, certain of the minerals contained in the hydroxide-rich stream 14 are precipitated for extraction, while the other portions of the hydroxide-rich stream 14 are utilized for capturing $CO_2$ as described above.

As shown in FIG. 9, the input liquid 12 is run through a pretreatment stage 15 that includes one or more various filtration and/or concentration systems, such as the filtration and concentration examples discussed above with respect to FIGS. 2-5. The filtered input liquid 12A is optionally mixed 17 with the recycled waste streams 19 and with a low pH solution 13, and then run through an electrochemical process 16 to create the hydroxide-rich stream 14, as previously described. As shown in FIG. 9, in various implementations the low pH solution 13 is a generated output from the electrochemical process 16.

In these implementations, solids, such as LiOH, can be precipitated out 60 and collected for the minerals or metals, such as lithium.

The electrochemical process 16 according to certain implementations is configured to ensure that the hydroxide-rich stream 14 is a high pH alkaline solution. This hydroxide-rich, alkaline solution 14 produced by the electrochemical process 16 is subsequently sent to a precipitation system (as shown in FIG. 9 at 60) to remove 62 metal and mineral hydroxides, such as lithium. Precipitation is utilized in certain implementations of this step to gather the solid metal and mineral hydroxides and retain portions of the hydroxide solution to be used for carbon capture. The process of increasing the alkalinity also converts the bicarbonates, carbonic acid and trapped $CO_2$ into carbonate ions. It is appreciated that these will increasingly precipitate as pH increases.

The remainder of the stream 14A can be used for direct air carbon dioxide capture, as described above, via the optional introduction of concentrated $CO_2$ 28 and exposure to air 25, which is optionally filtered 32 for example in a cooling tower 40. That is, certain capture systems can utilize an air filter system 32 such as a HEPA filter 32 to filter particulate matter from the air 25 in the cooling tower 40, and the system can be further configured to capture additional particulate matter in the stream 14A during $CO_2$ capture (shown at 22). The resulting stream 72, with particulate matter and captured $CO_2$, contains liquid carbonates, which can then be precipitated 20 as solid metal oxides 70, $CaCO_3$ and other compounds as would be readily appreciated.

As is also shown in the implementation of FIG. 9, certain systems can utilize a filter system to introduce further liquids with particulate matter 72 into the precipitate 20.

The output liquid stream 74 from the sequential precipitation 20 of solids can be further purified via various desalination 3 methods (such as via nanofilter (NF) 15A and/or reverse osmosis (RO) 15B) to produce clean water 1 as one output and concentrated brine 2 as a second output, which can be recirculated as would be understood.

FIG. 10 depicts a further, simplified implementation, wherein the system 10 utilizes a filter 32, such as a HEPA filter for air inputs and an additional treatment stage 15 (including reverse osmosis and nanofiltration) for water/liquid inputs, though one of skill in the art would appreciate that further filtering techniques could easily be used.

As previously noted, according to certain implementations, the system 10 uses saline water 12 that contains metals and minerals such as those described above and are readily appreciated by those of skill in the art. In further implementations of the system 10, the system is operated or performed near non-saline water containing minerals and includes various process modifications, as would also be appreciated. In various implementations these modifications can include 1) adding sodium to the non-saline water, and 2) introducing minerals into the water at the beginning of the process.

Three

As discussed above, the various embodiments disclosed or contemplated herein relate to methods, systems, and devices allowing for the capture and sequestration of $CO_2$ using a liquid input such as saline water like seawater, brine, or other salty water with an electrochemical process and passive airflow over packing structures. According to another aspect of the disclosed technology, additional examples disclosed or contemplated herein relate to methods, systems, and devices for the production of byproducts such as, for example, green hydrogen and other gases such as chlorine gas or hydrochloric acid as part of the capture and sequestration of $CO_2$. As in various other described examples, the capture and sequestration of $CO_2$ from $CO_2$-containing water and salt inputs can occur through the electrochemical production of hydroxides and airflow over packing structures.

As discussed elsewhere herein, various implementations of the carbon capture system 10 according to the disclosed technology relate to the sequestration of $CO_2$ using an input liquid (e.g., saline water, such as seawater) and electricity. In these implementations, electricity is applied to saline water via an electrochemical process such as, for example, electrodialysis or electrolysis) to create hydroxide-rich solvents which can be used to directly capture $CO_2$ from the air. In various implementations resulting precipitated solid carbonates are then deposited into in a body of water such as the ocean, and additional saline water is used to continue the process in a continuous manner.

Figure 11:
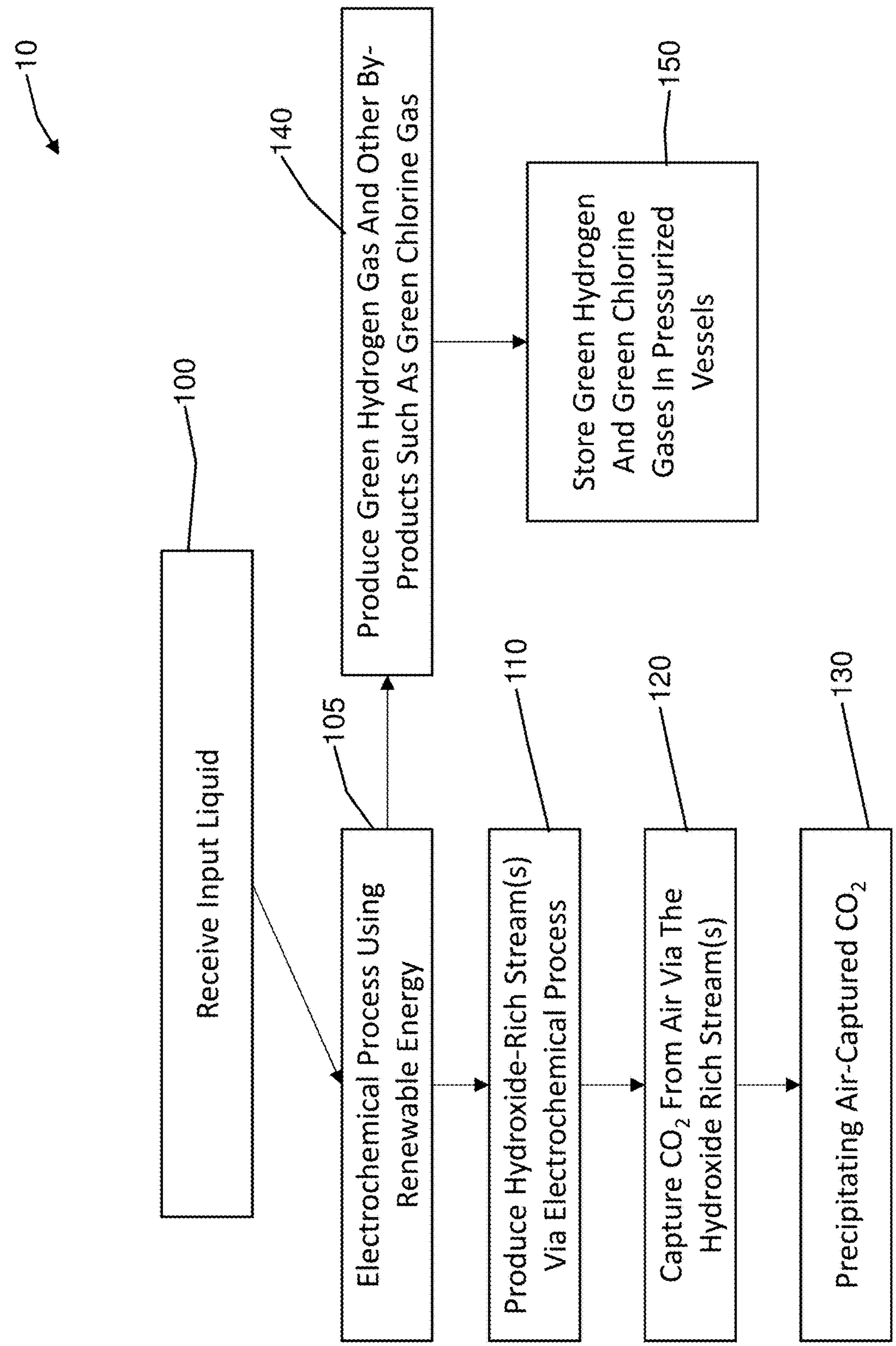
FIG. 11 is a flow chart depicting the capture process, according to an implementation featuring the production of green hydrogen gas and other byproducts such as green chlorine gas.
Figure 12:
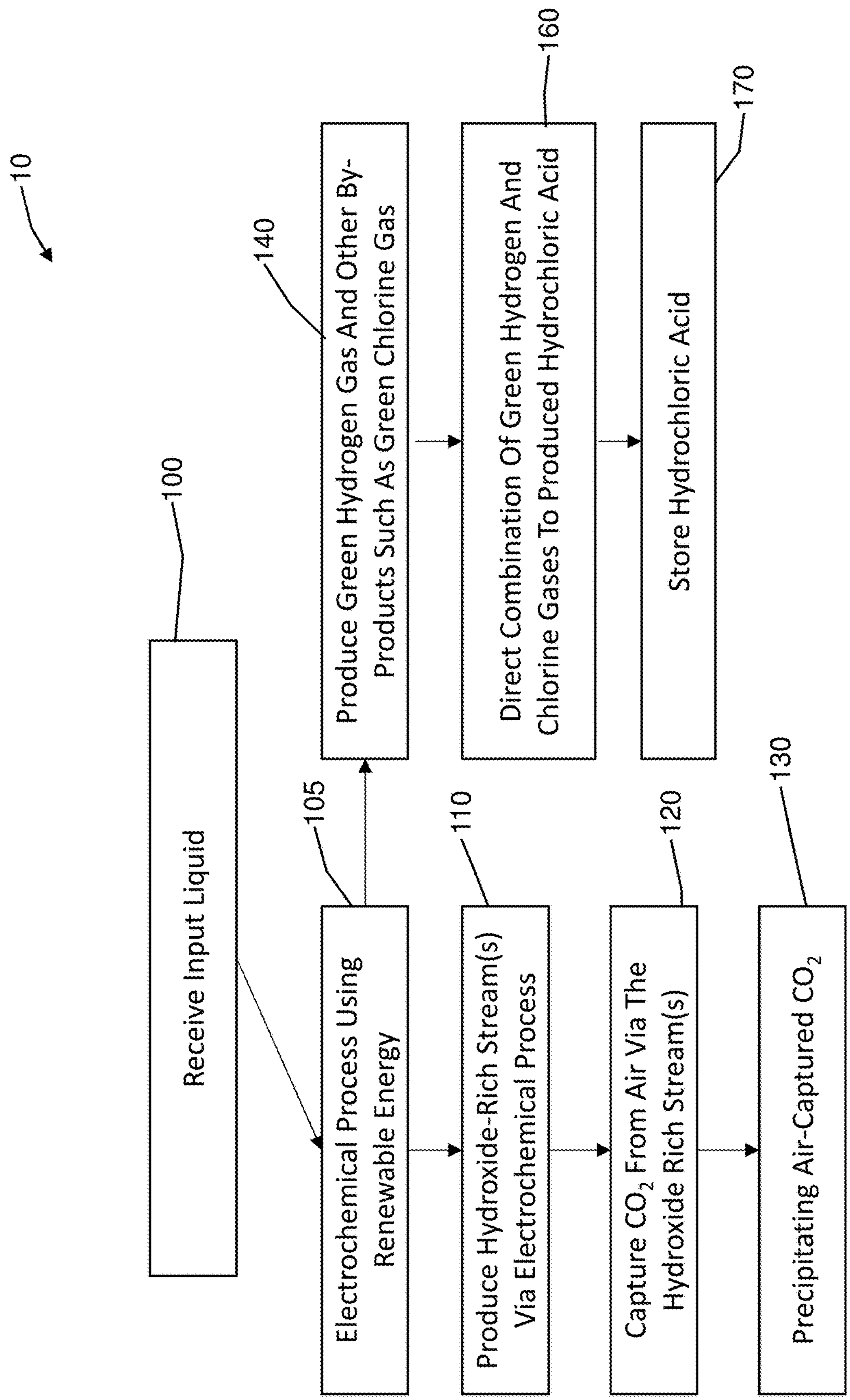
FIG. 12 is a flow chart depicting the capture process, according to an implementation featuring the production of hydrochloric acid.

FIGS. 11-12 depict various implementations of the carbon capture system 10 and various of its operational flows according to the disclosed technology. In these implementations, a variety of optional steps are performed, including steps depicted and discussed previously, such as with respect to FIG. 1. For example, in various implementations the capture system 10 comprises a process having steps such as receiving an input liquid (box 100) and performing an electrochemical process on the input liquid to produce at least one hydroxide-rich stream (box 110). The process also includes capturing $CO_2$ from air using the hydroxide-rich stream and a passive air capture system (box 120), and precipitating air-captured $CO_2$ (box 130) as, for example, solid carbonates.

In various implementations, the electrochemical process is configured to produce one or more byproducts in addition to the hydroxide-rich stream(s). For example, in various cases the electrochemical process includes an electrolyzing process that produces hydrogen gas and other gases such as chlorine gas. As shown in FIGS. 11 and 12, in various implementations, the electrochemical process (e.g., electrolysis) uses renewable energy (box 105) to thereby produce green hydrogen gas and other gases such as green chlorine gas (box 140) in addition to the hydroxide-rich stream(s). The system's operational flow 10 in FIG. 11 further allows for the storage of byproduct gases, such as hydrogen and chlorine, in pressurized vessels (box 150). The example operational process 10 in FIG. 12 includes the direct combination of the hydrogen and chlorine gases to produce hydrochloric acid (box 160). For example, in various implementations the hydrogen and chlorine gases are combined in an HCl oven and a deionized water absorber, and then stored in a vessel for further processing or selling (box 170).

Figure 13:
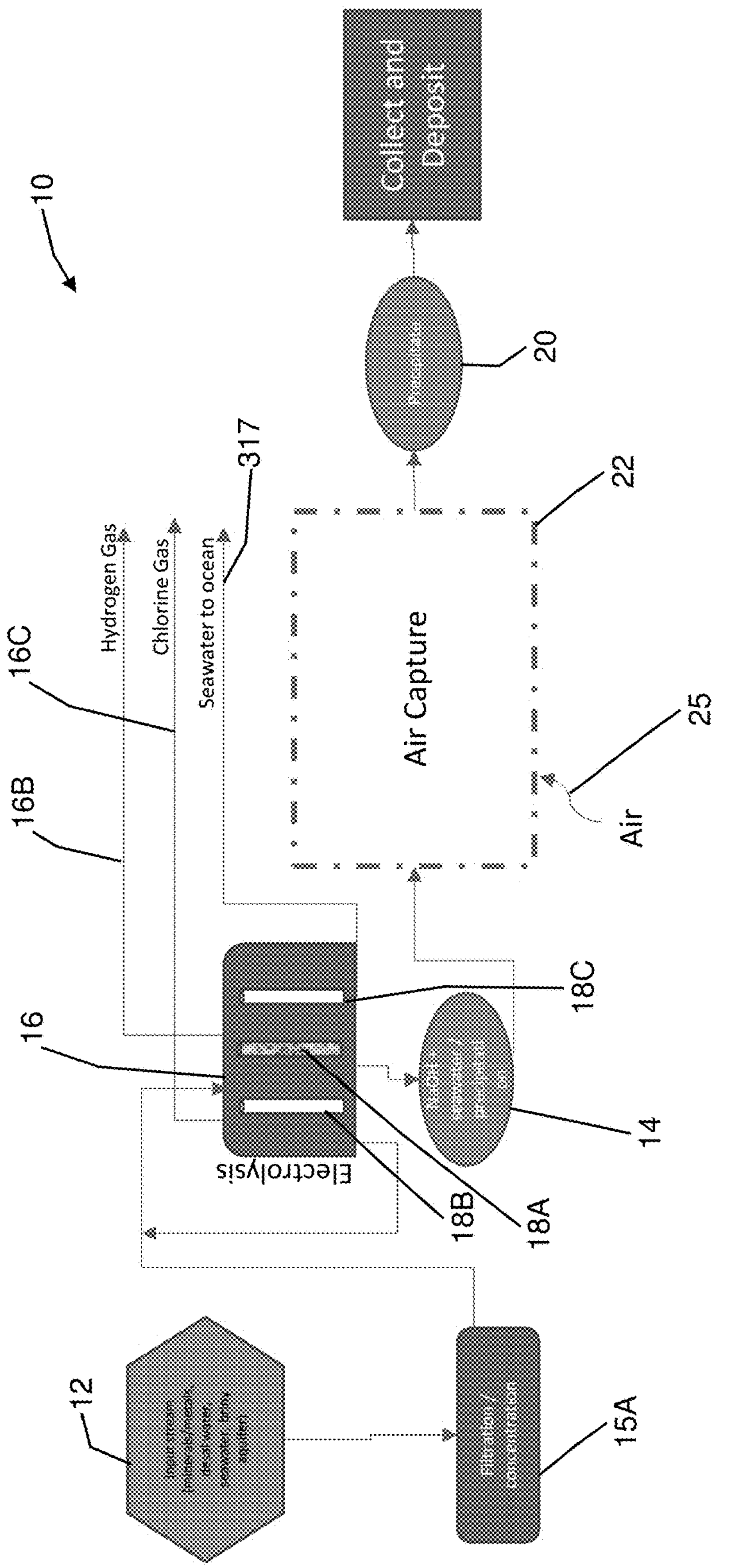
FIG. 13 shows a summary flow chart of one implementation of the disclosed system.
Figure 14:
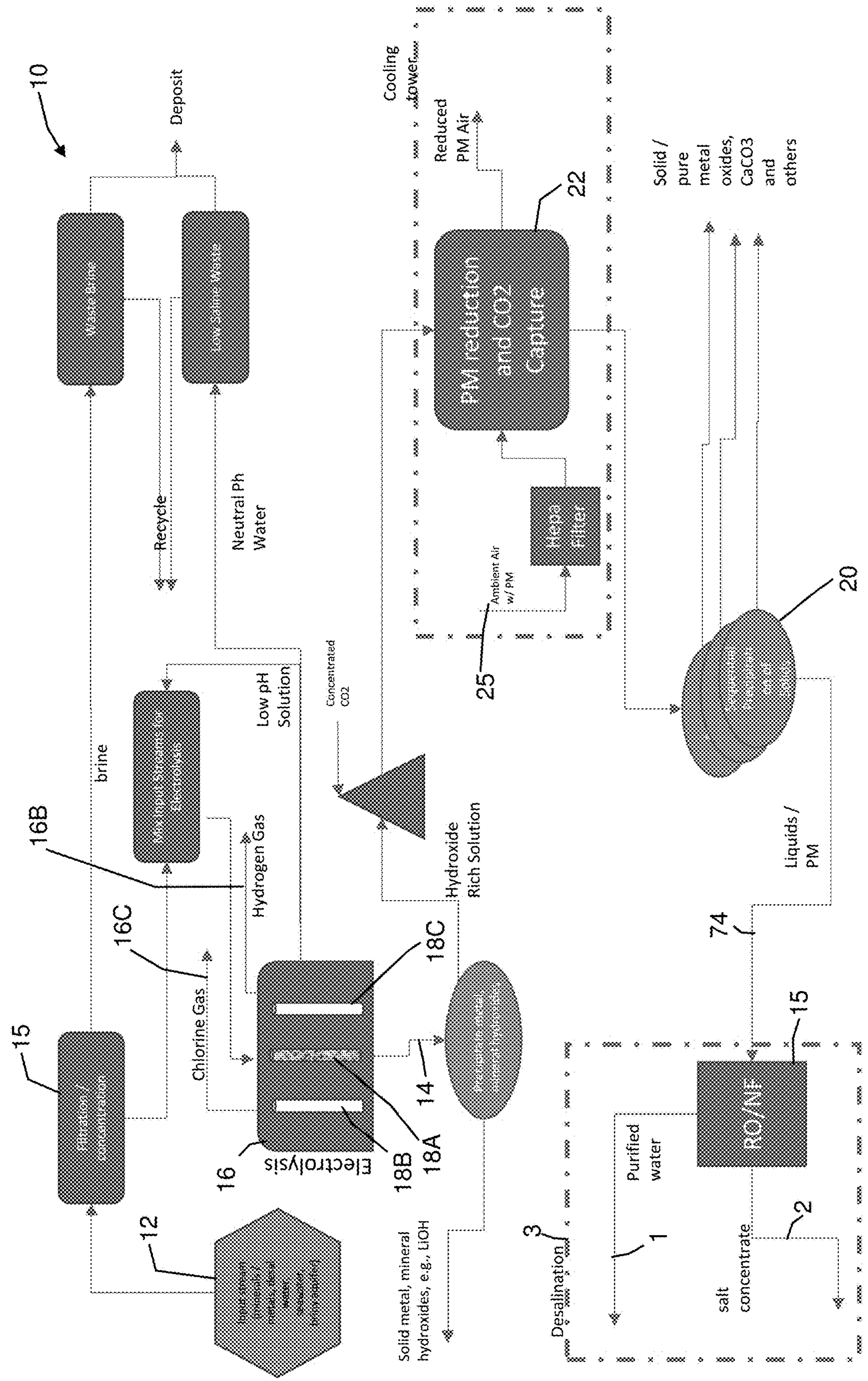
FIG. 14 shows a flow chart of the full process, according to one implementation.
Figure 15:
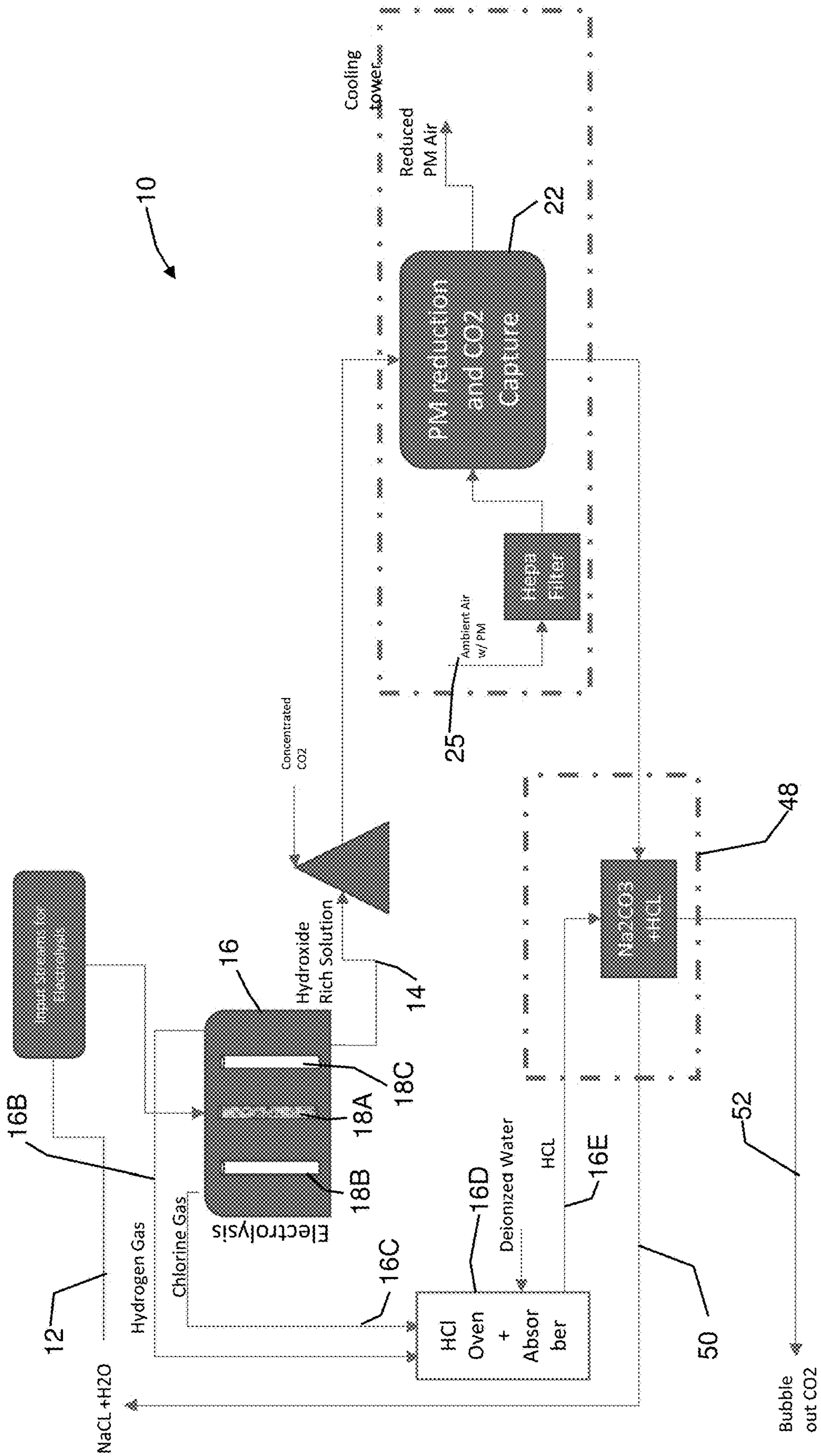
FIG. 15 depicts a further implementation of the system configured to capture carbon dioxide in gas form.

As shown in FIGS. 13-15, various implementations of the carbon capture system 10 produce green hydrogen and other gases or byproducts as part of capturing and sequestrating $CO_2$ according to the disclosed technology. As with the implementations of the system 10 shown in FIGS. 2-4, in various implementations of the capture system 10 depicted in FIGS. 13-15, an input liquid 12 such as seawater or other saline liquid is fed into the capture system 10 to produce a hydroxide-rich stream 14 containing salts such as NaOH and/or MgOH and/or CaOH and/or other hydroxides. As described herein, it is understood that implementations of the capture system 10, including those implementations shown in FIGS. 13-15, comprise one or more fluidic and/or electrical connections (shown generally at the lines) between a variety of optional components that can be arranged in a wide variety of arrangements, such that the various fluids/gasses and electricity described herein are able to flow as described.

Returning to FIGS. 13-15, in various implementations, after the liquid input 12 enters the capture system 10, some portion of the input liquid 12 is exposed to an electrochemical processor 16, which in this example is an electrolysis unit configured to perform electrolysis on the input liquid 12. In various implementations an optional pretreatment stage 15 is utilized, such as a nanofiltration and microfiltration system, an ion-exchange stage, and/or a reverse osmosis concentration stage, as would be appreciated. In various implementations, the electrolysis unit comprises a stack of ion-permeable membranes 18A disposed between a positively charged electrode 18B and a negatively charged electrode 18C. In various implementations, the electrochemical processor 16 is configured or otherwise comprises a set of electrolysis units connected in series or in parallel. Various other configurations of the electrochemical processor 16 can also be employed.

In use according to certain implementations, the application of electricity via the electrolysis unit causes the creation of the hydroxide-rich stream 14 from the input liquid 12. These hydroxides are then available to capture 22 $CO_2$ from the air 25. In various implementations, an optional precipitation tank 20 is provided as a part of the system 10. As shown in FIG. 13, the precipitation tank 20 is in fluidic communication with one or more of the other system components as described herein.

Certain of the saline water 12 that provided Ca+, Na+, and Mg+ ions to the electrolysis unit is now partially desalinated 317 and of neutral pH. This seawater can be returned to the ocean or used to balance the pH of other waste streams before return.

Some or all of the hydroxide solution 14 is then sent to a direct air $CO_2$ capture mechanism 22 for the capture of carbon dioxide as carbonates. This mechanism can be one of many existing approaches. Once this stream 14 has progressed through the $CO_2$ capture system and becomes saturated with carbon, it is, in various cases, sent to a precipitation system 20 to extract carbonates. In various implementations, the direct air capture system 22 is preferably sited in a location with sustained wind speeds (shown at 25) to minimize flow time through the capture mechanism and energy cost.

Accordingly, the example capture systems depicted in FIGS. 13-15 relate to the capture and sequestration of $CO_2$ using water and salt inputs, electrochemical production of hydroxides, and airflow over packing structures, as described herein. In addition to the permanent $CO_2$ capture described above, various capture systems (e.g., such as those in FIGS. 13-15) are also able to produce hydrogen and chlorine gases, and can in some cases also reduce particulate matter concentrations in ambient air, as described herein. It is also understood that an object of various systems is to use renewable energy to minimize the environmental impact associated with the production of hydrogen gas. Renewable energy use itself is beneficial to the environment. In addition, various methods described herein have multiple uses for the chemicals produced, in some cases more than existing methods.

In various implementations, the capture system 10 utilizes a method for the extraction of inorganic hydroxides that is given by:

$$X_a(O_bH_c)_m$$

where X represents any element or combination of elements that can chemically bond with oxygen and hydrogen or its multiple;

where at least one element in X is a group IA, IIA, IIIA, IVA, IB, IIB, IIIB, IVB, VB, VIIB, VIIB, or VIIIB element of the periodic table; and where a, b, and c are stoichiometrically determined positive integers.

The production of hydrogen gas according to certain implementations is done in combination with the capture and sequestration of $CO_2$ described above by receiving an input saline liquid 12 such as seawater and renewable electricity to power the electrolysis unit, as is shown variously in FIGS. 13-15. In these implementations, electrochemistry and water are used to create hydroxides in the form of the hydroxide-rich stream 14 specified above, and simultaneously produce hydrogen gas 16B and chlorine gas 16C as byproducts. The hydroxide-rich stream is used to directly capture $CO_2$ from the air.

In these implementations, after capturing $CO_2$ from the air, the system 10 allows for the precipitation of solid carbonates as given by:

$$X(CO_3)_m$$

where X is any element or combination of elements that can chemically bond with a carbonate group or its multiple;

where at least one said element is a group IA, IIA, IIIA, IVA, IB, IIB, IIIB, IVB, VB, VIIB, VIIB, or VIIIB element of the periodic table; and where m is a stoichiometrically determined positive integer.

Following such precipitation, solid carbonates can be placed into the ocean or other bodies of water to facilitate increased alkalinity.

In various implementations, the capture systems and methods 10 in FIGS. 13-15 comprise a variety of optional steps and sub-steps. In certain implementations, the capture system 10 includes feeding mineral-containing saline water as an input liquid 12 to an electrolysis unit to produce a hydroxide-rich stream 14, as described above.

In various implementations, a hydrogen-rich stream is produced at least in part with the electrochemical process 16. For example, the byproduct gas streams of hydrogen gas (16B) and chlorine gas (16C) from the electrochemical process 16 can be combined in a combustion chamber and passed through a deionized water absorber (16D) to form hydrochloric acid (16E) of various concentrations, as shown in the implementation of FIG. 15. In certain implementations, the byproduct gas streams of hydrogen gas (16B) and chlorine gas (16C) from the electrochemical process 16 can be stored in pressurized vessels for further processing and sale.

In various implementations of the capture system 10, certain of the minerals contained in the hydroxide-rich stream 14 are precipitated for extraction, while the other portions of the hydroxide-rich stream 14 are utilized for capturing $CO_2$ as described above. As an example, in various implementations one or more mineral hydroxides (e.g., lithium hydroxide) are precipitated from the hydroxide-rich stream 14 as shown in FIG. 14.

Turning back to FIG. 15, in certain implementations, the system 10 can capture $CO_2$ in gas form 52. As shown in FIG. 15, the system 10 is similar to the examples in FIGS. 13 and 14 with some modifications. The first is the mixing 48 of $Na_2CO_3$ produced via the direct air $CO_2$ capture mechanism 22 with the low pH hydrochloric acid stream 16E produced from the hydrogen gas 16B and chlorine gas 16C generated by the electrochemical process 16. This combination creates $CO_2$ in gas form 52 and saltwater 50. The saltwater 50 can be returned to the electrochemical process 16 for reuse in the process, and the gaseous $CO_2$ is stored, as previously described.

According to certain implementations, the system 10 uses saline water 12 that contains metals and minerals such as those described above. In further implementations, the capture system and/or process 10 is operated or performed near non-saline water containing the minerals and including various process modifications, as would also be appreciated. These modifications can include, for example, 1) adding sodium to the non-saline water, and 2) introducing the minerals into the water at the beginning of the process.

Figure 16:
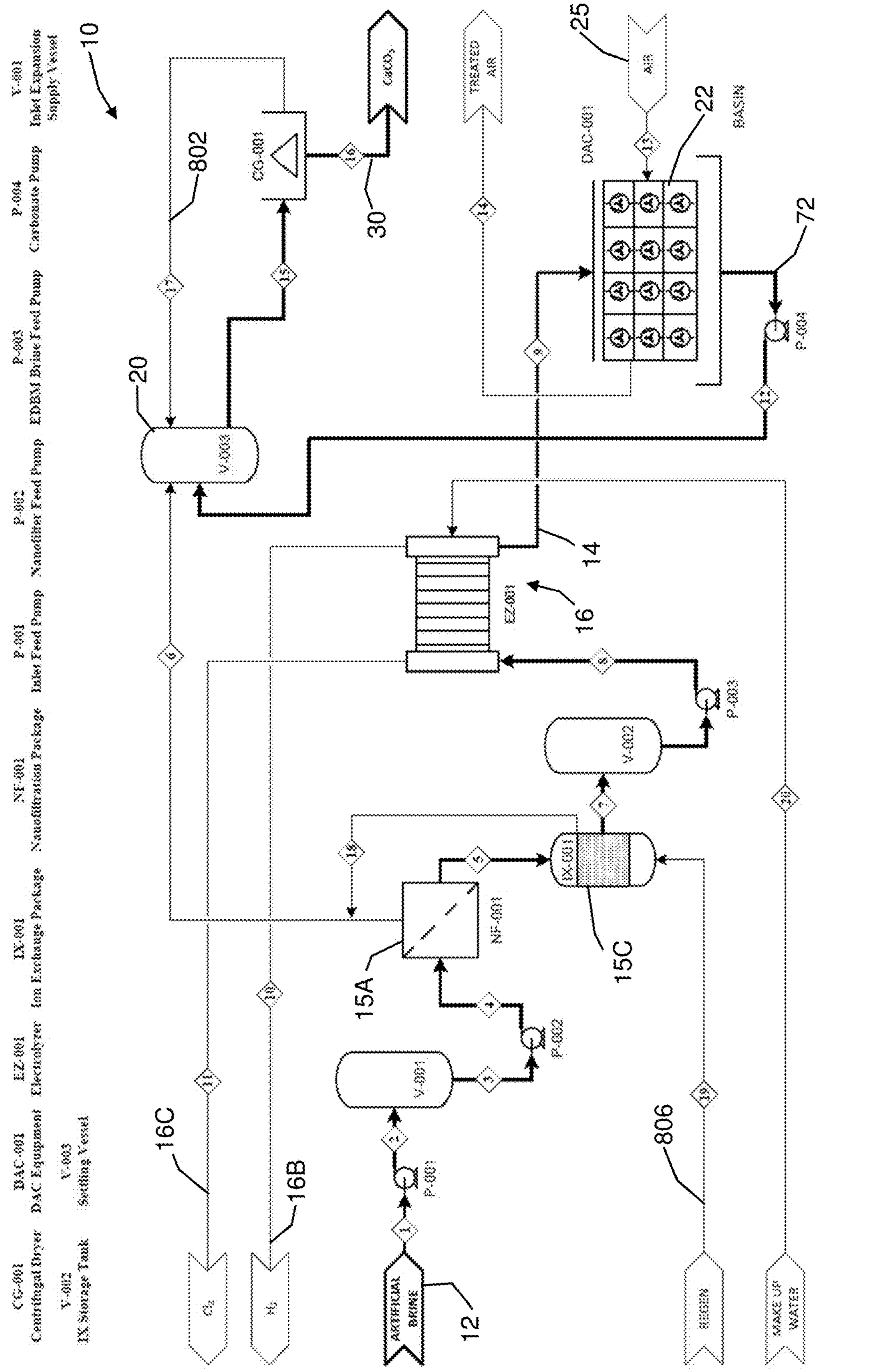
FIG. 16 shows a flow chart depicting a carbon capture process, according to one implementation of the system.

FIG. 16 is a flow chart providing a detailed depiction of a carbon capture process and system 10, according to one possible implementation. The detailed diagram depicts a number of pumps, vessels, and other components of the system, in addition to fluid connections between relevant components. It will be appreciated that the system may include fewer and/or additional components and aspects that are not shown in various cases.

Continuing with reference to FIG. 16, in this example the system 10 receives a saltwater input liquid 12 that is then pumped into an expansion vessel (V-001) before sending it to a pretreatment stage. The pretreatment stage in this example includes a nano-filtration unit (15A) and an ion exchange unit (15C) to remove divalent ions such as, for example, calcium and magnesium. The output from this pretreatment stage, (e.g., filtrate) is stored in vessel (V-002) before sending it to an electrochemical processor 16. In various implementations, the electrochemical processor is an electrolysis unit as shown in FIG. 16.

The electrochemical processor 16 (e.g., electrolysis unit) splits the pretreated input liquid into a hydroxide-rich stream 14, a hydrogen gas stream (16B), and a chlorine gas stream (16C). The hydroxide-rich stream is then passed through an air contactor (22) wherein it absorbs carbon dioxide from an air stream (25) to form carbonates. These carbonates (stream 72) are then pumped to a precipitator or a settling tank (20) where they are mixed with divalent ion streams from the nano-filtration 15A and ion exchange package 15C to form calcium carbonate. The calcium carbonate solution is then separated into a slurry of calcium carbonate solids (stream 30). In some cases a centrifugal dryer CG-001 is used to separate out the slurry of solid carbonates 30 and water (802), which is recycled back into the system.

According to various implementations, the input liquid 12 received by the capture system 10 is an artificial brine. In some cases the artificial brine is different than seawater brine or a brine reject obtained from seawater reverse osmosis and is instead made by adding salt to fresh water.

In various implementations the process/system 10 in FIG. 16 uses one or more additional inputs and may generate one or more additional outputs. As just one possible example, in various implementations a regen stream 806 including, for example, some amount of HCl, is used to regenerate the ion exchange pretreatment stage 15C. As will be appreciated, additional inputs and/or outputs may be present in various implementations of the system 10.

Four

Turning to FIGS. 17-22, some implementations are related to another aspect of the disclosed technology including one or more of capture and sequestration of $CO_2$, extraction of lithium compounds, and production of byproducts such as green hydrogen and other gases such as chlorine gas or hydrochloric acid. Various implementations disclosed or contemplated herein relate to methods, systems, and devices allowing for the simultaneous capture and sequestration of $CO_2$ in an air contactor and extraction of lithium compounds in an absorber using a liquid input such as saline water like seawater, brine, or other salty water with electrolysis.

Additional implementations disclosed or contemplated herein relate to methods, systems, and devices for the production of byproducts—green hydrogen and other gases such as chlorine gas or hydrochloric acid as part of combined capture and sequestration of $CO_2$ in an air contactor and lithium extraction in an absorber using containing water and salt inputs, electrochemical production of hydroxide-rich and hydrogen-rich streams.

Additional implementations disclosed or contemplated herein relate to methods, systems, and devices for the sequestration of $CO_2$ in a gas form by using the hydroxide-rich stream to capture $CO_2$ as carbonates in an air contactor and regenerating the $CO_2$ using the hydrogen-rich stream. The collected $CO_2$ gas is then used in combination with the lithium absorber to form lithium carbonate.

As previously discussed, and also described herein with respect to FIGS. 17-22, the disclosed technologies are referred to broadly as an operational flow 10 and/or capture system 10, though it is understood that this is for brevity and in no way intended to be limiting to any specific modality.

Certain implementations of the disclosed capture system 10 relate to the sequestration of $CO_2$ and extraction of Li using only saline water—such as geothermal or seawater—and electricity. In these implementations, electricity is applied to saline water via electrolysis to create hydroxide-rich solvents which can be used to directly capture $CO_2$ from the air. The electrolysis also creates hydrogen-rich solvents which can be used to recover Li from an absorber. The resulting precipitated lithium carbonate is recovered for post-processing/selling and other solid carbonates such as calcium carbonate are then deposited into the ocean, and additional saline water is used to continue the process, so as to make it continuous.

Figure 17:
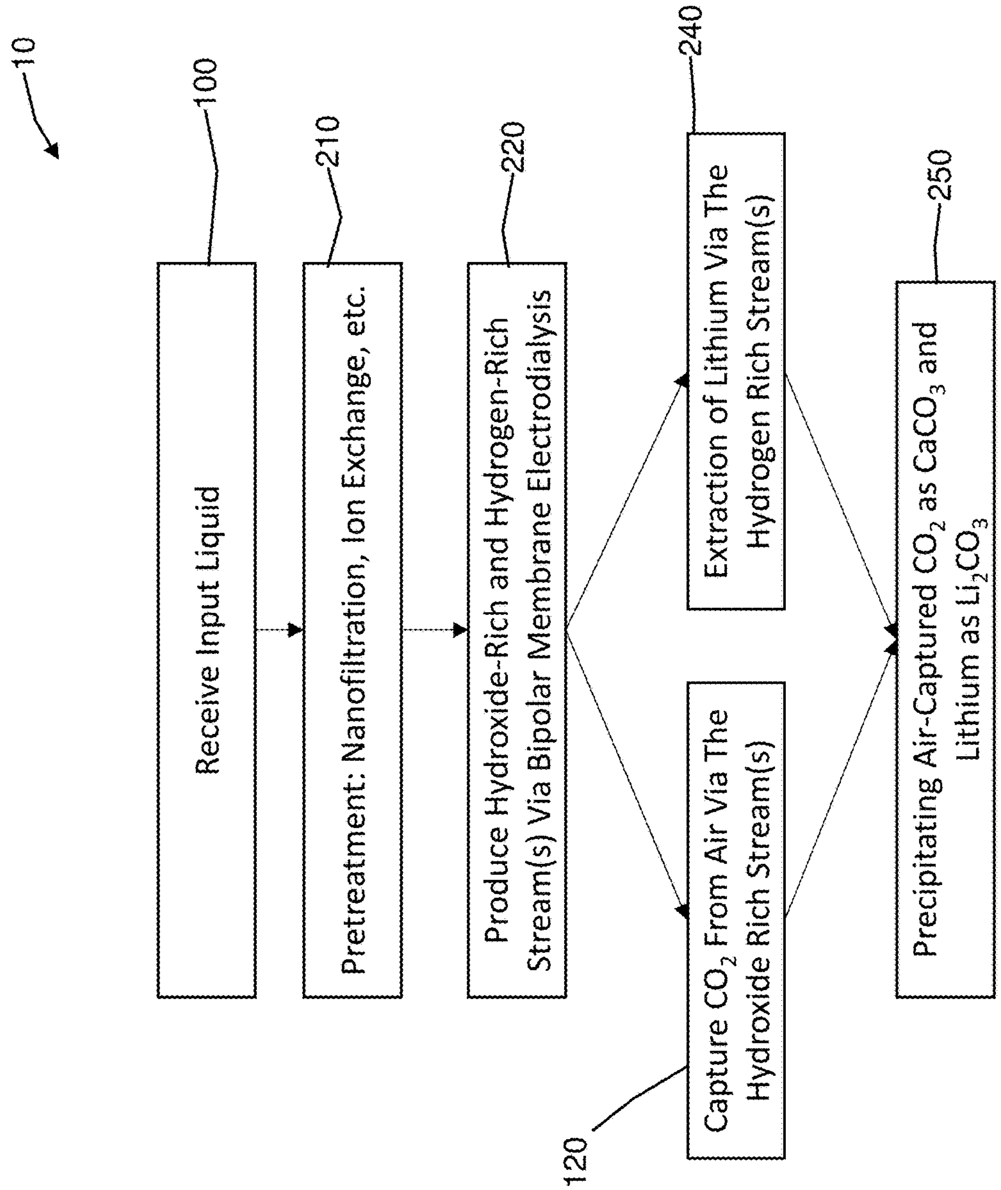
FIG. 17 shows a flow chart of the combined carbon capture and lithium extraction process, according to one implementation.
Figure 18:
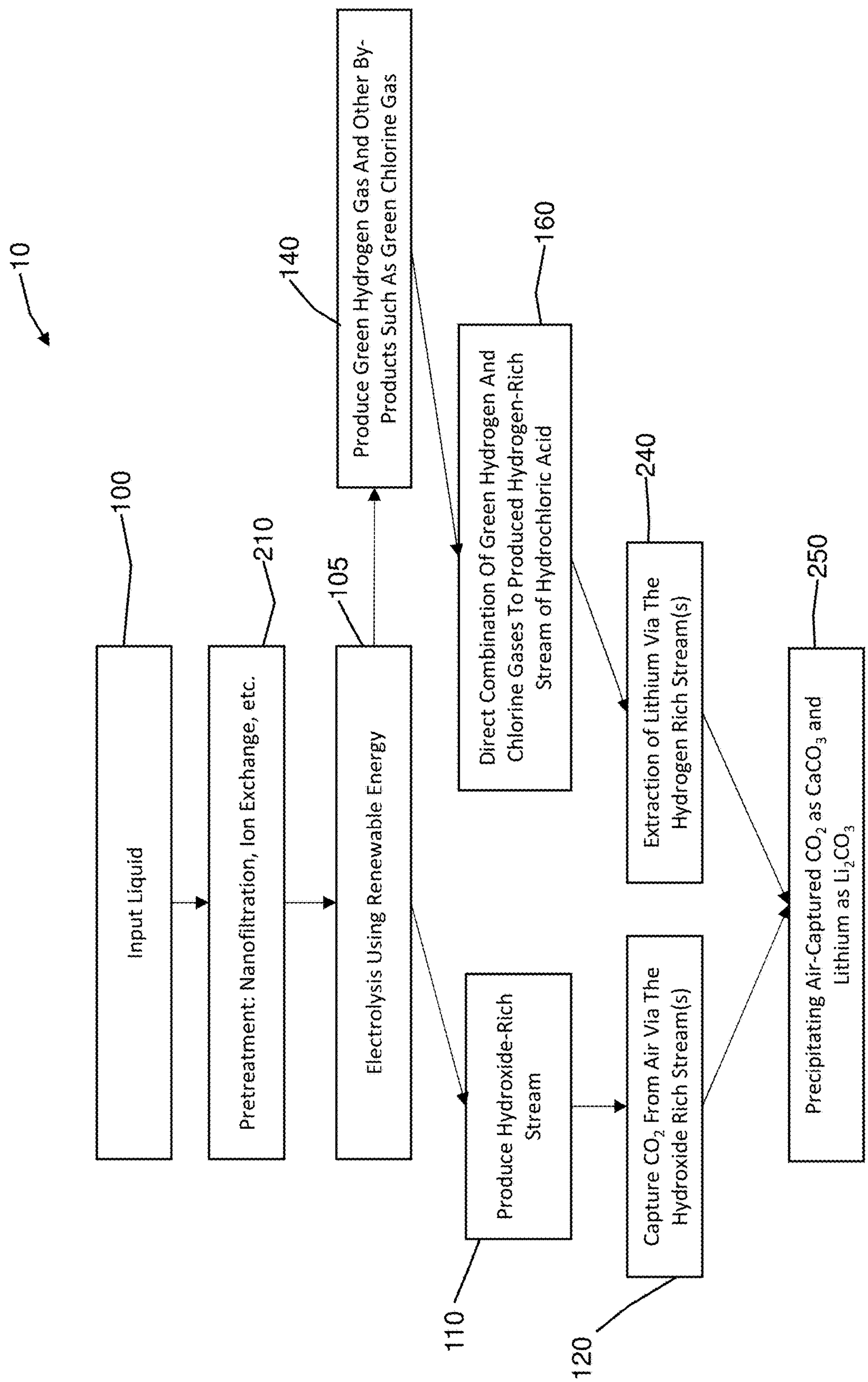
FIG. 18 depicts a flow chart depicting the carbon capture process and lithium extraction, according to an implementation featuring the production of green hydrogen gas and other byproducts such as green chlorine gas and hydrochloric acid.

FIGS. 17 and 18 depict various implementations of the carbon capture system 10 described herein. In these implementations, a variety of optional steps are performed. For example, in various implementations the system 10 comprises a process as shown in FIG. 17 having steps such as receiving an input liquid (box 100), which is pretreated and filtered (box 210) prior to performing an electrochemical process on the inputted liquid. In the illustrated example, the electrochemical process includes electrodialysis, which produces at least one hydroxide-rich stream and one hydrogen-rich stream (box 220). The process further includes capturing $CO_2$ from air using the hydroxide-rich stream and a passive air capture system (box 120) and extracting Li from an absorber using the hydrogen-rich stream (box 240). The process also includes precipitating air-captured $CO_2$ and Li from the absorber as carbonates (box 250).

As shown in FIG. 18, in various implementations, the electrochemical process includes electrolysis. In various cases the electrolysis is performed using renewable energy (box 105) to produce hydrogen gas and other gases such as chlorine gas (box 140) in addition to the hydroxide-rich stream(s) (box 110). In certain implementations, the operational flow of the system 10 further allows for the direct combination of the hydrogen and chlorine gases in a HCl oven and a deionized water absorber to produce hydrochloric acid (box 160). The hydrochloric acid is used in the Li absorber to form soluble Li compounds (box 240) that are precipitated as carbonates (box 250).

Figure 19:
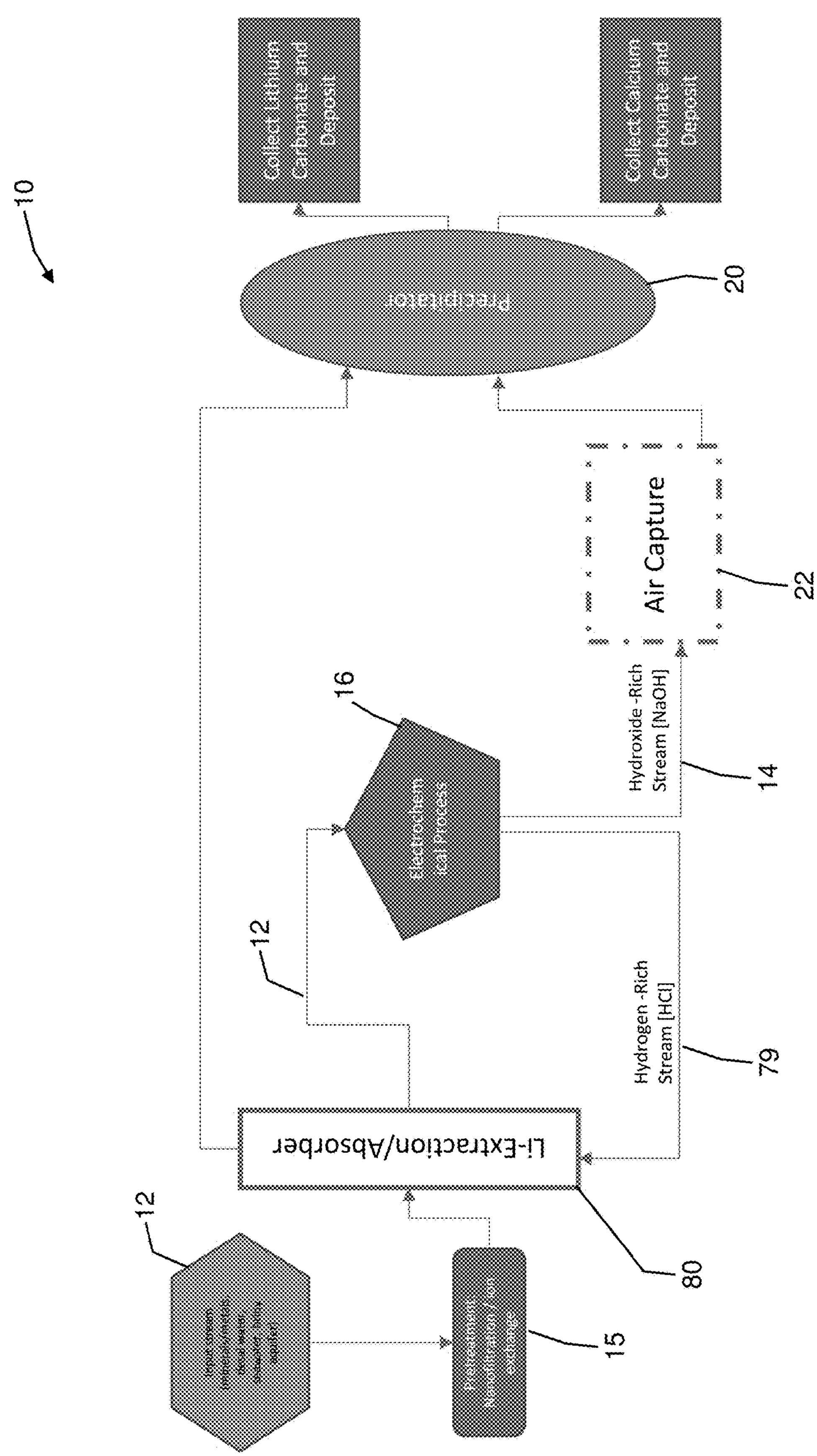
FIG. 19 shows a summary flow chart of one implementation of the disclosed system using the bipolar membrane electrodialysis.

As shown in FIG. 19, in various implementations of the system 10, an input liquid 12 such as seawater or other saline liquid is fed into the capture system 10, pretreated and filtered to remove coarse particles and divalent ions such as calcium and magnesium 15A, and passed through the Li absorber 80. The input liquid 12 coming out of the Li absorber is then passed into an electrochemical processor 16. In this example the processor 16 includes a bipolar membrane electrodialysis stack 16 that produces a hydroxide-rich stream 14 containing salts such as NaOH and/or MgOH and/or CaOH and/or other hydroxides, as well as a hydrogen-rich stream containing acids such as HCl 79. As described herein, it is understood that the capture system 10 comprises one or more fluidic and/or electrical connections (shown generally at the lines) between a variety of optional components that can be arranged in a wide variety of arrangements, such that the various fluids/gasses and electricity described herein are able to flow as described.

Figure 20:
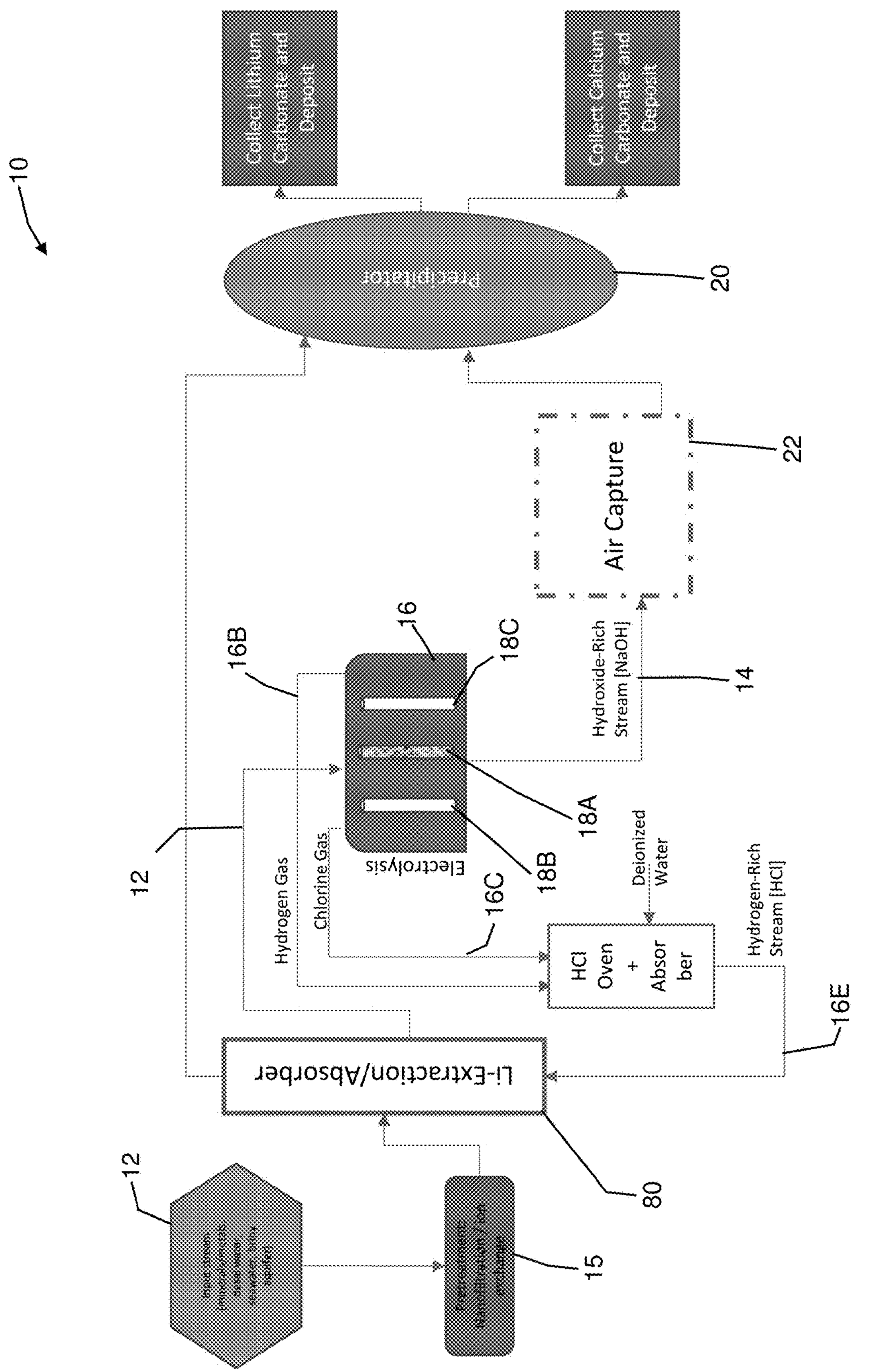
FIG. 20 shows a flow chart of one implementation of the disclosed system using the electrolysis unit to produce green hydrogen gas.

As shown in FIG. 20, in various implementations, after the liquid input 12 enters the system 10, and is passed through pretreatment 15A and Li absorption steps 80, some portion of the input liquid 12 is exposed to an electrochemical processor 16 that includes an electrolysis unit that is configured to perform electrolysis on the input liquid 12. In various implementations, the electrolysis unit comprises a stack of ion-permeable membranes 18A disposed between a positively charged electrode 18B and a negatively charged electrode 18C. In various implementations, the electrolysis unit is configured or otherwise comprises a set of electrolysis units connected in series or in parallel. Various other configurations of the electrolysis units can also be employed.

In use according to certain implementations, the application of electricity via the electrolysis unit causes the creation of the hydroxide-rich stream 14 from the input liquid 12. In various implementations, a hydrogen-rich stream is produced at least in part with the electrochemical process 16. As shown in FIG. 20, in certain implementations, the byproduct gas streams of hydrogen gas (16B) and chlorine gas (16C) are combined in a combustion chamber and deionized water absorber (16D) to form the hydrogen-rich stream of hydrochloric acid (16E) of various concentrations. The hydroxide-rich stream is used to capture 22 $CO_2$ from the air 25. The hydrogen-rich stream is used to extract Li from the Li absorber 80.

Some or all of the hydroxide solution 14 is then sent to a direct air $CO_2$ capture mechanism 22 for the capture of carbon dioxide as carbonates. This mechanism can be one of many existing approaches. Once this stream 14 has progressed through the $CO_2$ capture system and becomes saturated with carbon, it is again preferably sent to a precipitation system 20 to extract carbonates. The direct air capture system is preferably sited in a location with sustained wind speeds to minimize flow time through the capture mechanism and energy cost.

As shown in FIG. 19, in various implementations some or all of the hydrogen-rich solution 79 from the bipolar membrane electrodialysis stack is sent to the Li absorber 80 to extract Li from the sorbent in form of Li compound. As shown in FIG. 20, in various implementations some or all of the hydrogen-rich solution 16E from the electrolysis unit is sent to the Li absorber 80. In both examples, one of the output streams from the lithium absorber 80 is then sent to a precipitation system 20 which contains sodium carbonate generated through the direct air capture system. Lithium compound, in one such manifestation, is then precipitated as lithium carbonate.

To that end, the system 10 according to certain implementations utilizes a method for the extraction of inorganic hydroxides that is given by:

$$X_a(O_bH_c)_m$$

where X represents any element or combination of elements that can chemically bond with oxygen and hydrogen or its multiple;

where at least one element in X is a group IA, IIA, IIIA, IVA, IB, IIB, IIIB, IVB, VB, VIIB, VIIB, or VIIIB element of the periodic table; and where a, b, and c are stoichiometrically determined positive integers.

In these implementations, after capturing $CO_2$ from the air, the system 10 allows for the precipitation of solid carbonates as given by:

$$X(CO_3)_m$$

where X is any element or combination of elements that can chemically bond with a carbonate group or its multiple;

where at least one said element is a group IA, IIA, IIIA, IVA, IB, IIB, IIIB, IVB, VB, VIIB, VIIB, or VIIIB element of the periodic table; and where m is a stoichiometrically determined positive integer.

Following such precipitation, value add carbonates such as lithium carbonates are separated and processed further for sale and storage while other solid carbonates such as calcium carbonate can be placed into the ocean or other bodies of water to facilitate increased alkalinity.

Various implementations of the system 10 as illustrated in FIGS. 19-22 include a variety of optional steps and substeps. In certain implementations, some or all of the hydrogen-rich solution 79 from the electrochemical processor 16 (e.g., bipolar membrane electrodialysis stack) in FIG. 19 or the stream 16E in the case of the electrochemical processor 16 (e.g., electrolysis unit) in FIG. 20 is neutralized over rocks such as olivine to enhance weathering and further increase the amount of carbon dioxide removal.

Figure 21:
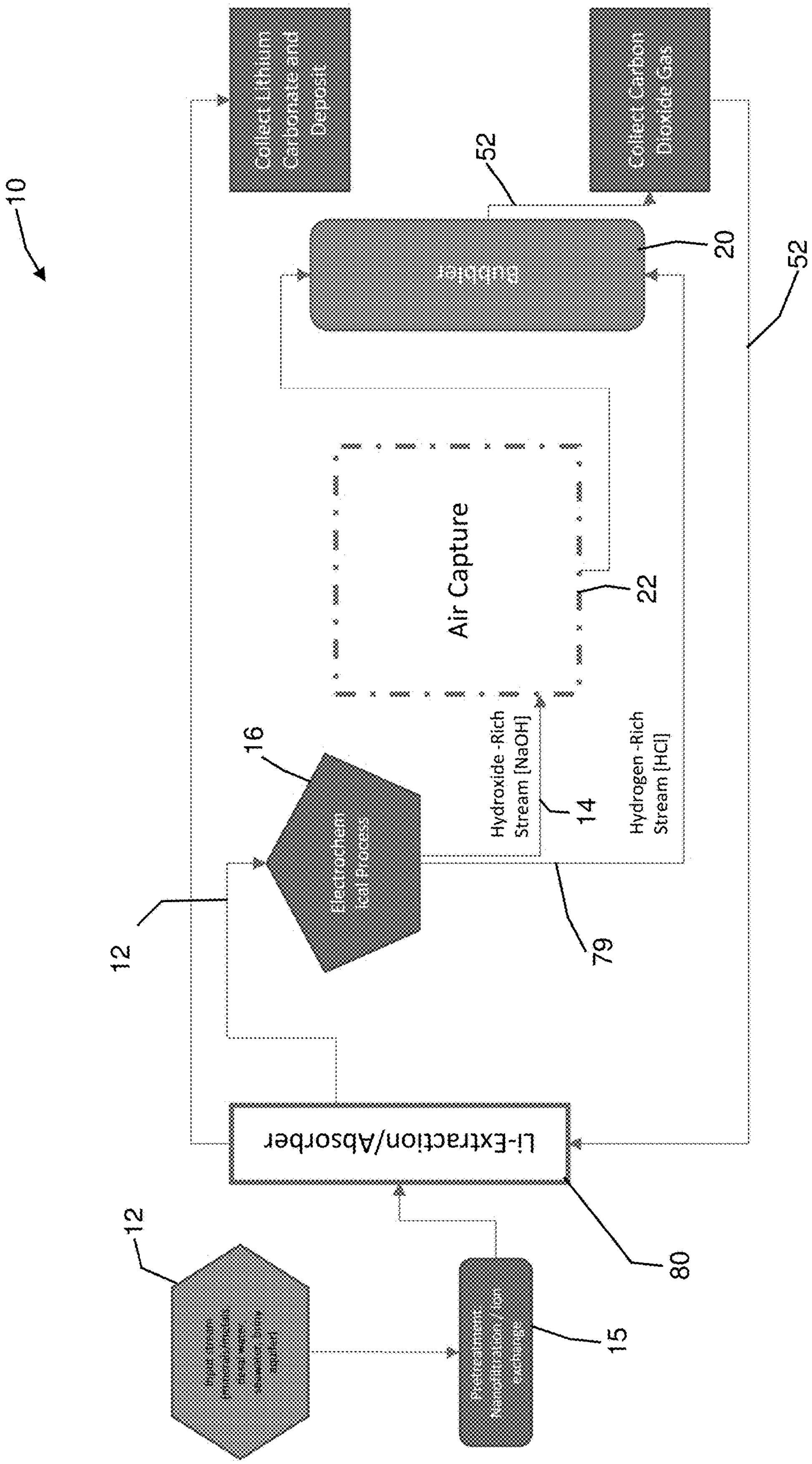
FIG. 21 depicts a further implementation of the system configured to capture carbon dioxide in gas form and use it partially or fully for lithium extraction.

As shown in the implementation of FIG. 21, in certain implementations, the system 10 can capture $CO_2$ in gas form. This approach uses the same process described herein with two modifications. The first is the mixing of $Na_2CO_3$ produced via the direct air $CO_2$ capture mechanism 22 with the low pH hydroxide-rich stream produced via the electrochemical process 16 (see, e.g., discussion of FIG. 6 herein). In various implementations the $Na_2CO_3$ is mixed with the low pH hydrochloric acid produced from the hydrogen and chlorine gases generated by the electrochemical processor 16 (in this case an electrolysis unit) and discussed further with respect to FIG. 15. The combination in each case creates $CO_2$ in gas form 52 and saltwater (not shown). The saltwater can be returned to the electrochemical process 16 for reuse in the process, and the gaseous $CO_2$ is stored, as previously described, or used in Li absorber 80 to directly convert Li-ions absorbed on the sorbent into lithium carbonate, which is stored and post-processed for sale, as previously described.

Figure 22:
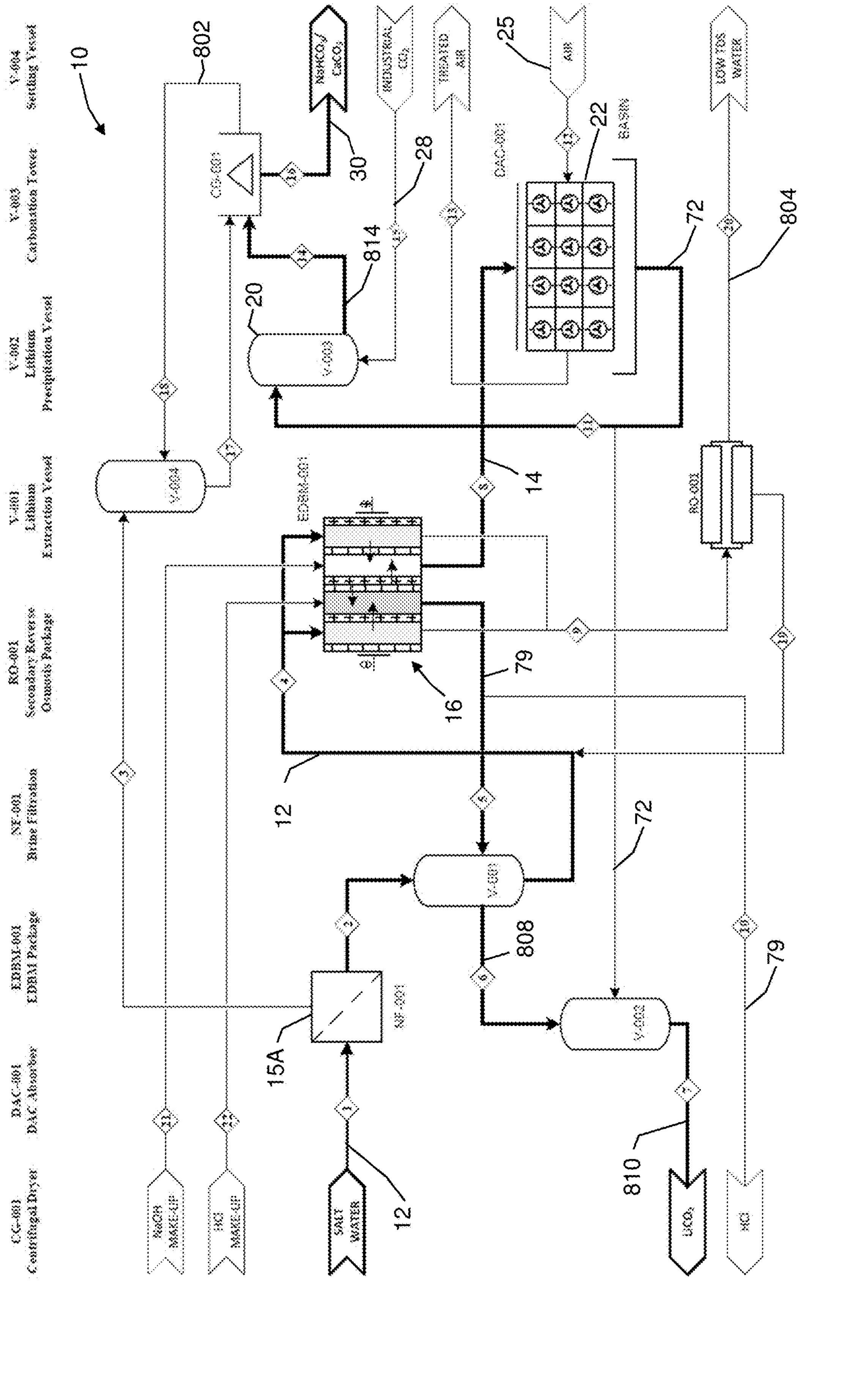
FIG. 22 is a flow chart depicting a carbon capture process according to one implementation.

FIG. 22 is a flow chart providing a detailed depiction of a carbon capture process and system 10, according to one possible implementation. The detailed diagram depicts a number of vessels, and other components of the system, in addition to fluid connections between relevant components. It will be appreciated that the system may include fewer and/or additional components and aspects that are not shown in various cases.

As is shown in FIG. 22, in this example the system 10 receives an input liquid 12 including salt water, that flows to a pretreatment stage. The pretreatment stage in this example includes a nano-filtration unit (15A) to remove divalent ions such as, for example, calcium and magnesium. The filtrate output from the pretreatment stage is then passed through a lithium extraction vessel (V-001) to selectively absorb lithium ions from the saltwater input liquid 12.

The absorbed lithium ions are extracted in stream 808 using hydrochloric acid (79) from an electrochemical processor 16. Carbonates 72 from the air contactor 22 are fed along with the lithium-ion stream 808 (e.g., lithium chloride) into a lithium precipitation vessel (V-002). The carbonates mix with the lithium-ion stream in the precipitation vessel to produce a lithium carbonates stream 810. The input liquid (e.g., saltwater stream) 12, which is now depleted of lithium, is output from the lithium extraction vessel (V-001) and fed to the electrochemical processor 16. In this example the electrochemical processor 16 is an electrodialysis bipolar membrane unit (EDBM-001).

According to various implementations, the EDBM unit splits the salt stream 12 into an hydroxide-rich stream (14) and a hydrogen-rich stream (79). In various cases the hydrogen-rich stream is hydrochloric acid, which is optionally made available as an output, and also fed to the lithium extraction vessel as previously noted. The hydroxide-rich stream is passed through the air contactor (22) wherein it absorbs carbon dioxide from an air stream (25) to form carbonates. These carbonates (72) are then fed to a sparger or a bubble column reactor (V-003) wherein concentrated $CO_2$ (28) from industrial gases is passed through to form bicarbonates (814). The bicarbonates and other carbonate precipitates are separated in the centrifuge dryer (CG-001) as stream 30.

As will be appreciated, in this example one of the main inputs into the capture process 10 is the input saltwater liquid (12). In various implementations another input is concentrated $CO_2$ 28 from, for example, various industrial processes and plants. In the depicted example, some of the outputs are carbonate and bicarbonate solids (30), hydrochloric acid (79), and lithium carbonates 810.

In various implementations the process/system 10 uses one or more additional inputs and may generate one or more additional outputs. In various implementations one or more ancillary inputs and/or outputs are largely recycled within the system. For example, in some cases an output from the electrochemical process 16 is processed (e.g., by reverse-osmosis) and provides low total dissolved solids (TDS) water (804), which can be used as a makeup liquid for the EDBM unit. In some cases an HCl make-up stream and/or NaOH make-up stream are also used to facilitate the EDBM unit. As will be appreciated, additional inputs and/or outputs may be present in various implementations of the system 10.

Five

Turning now to FIGS. 23-30, various systems, methods and devices implement another aspect of the disclosed technology relating to post-processing and sequestration in Direct Air $CO_2$ Capture and/or storing or handling of various elements and compounds. Various embodiments disclosed or contemplated herein allow for the capture and sequestration of $CO_2$ using a liquid input such as saline water like seawater, brine, or other salty water with an electrochemical process and passive airflow over an air contactor. Additional embodiments relate to post-processing of the air-captured $CO_2$ carbonates, the recycling of the hydroxide-rich liquid solution, the neutralization, over olivine rocks, and the recycling of the hydrogen-rich liquid solution, and the storing of $CO_2$ in gas form while recycling the salt solutions back to the electrochemical process.

As previously described herein, examples and implementations of the disclosed technologies, including the implementations in FIGS. 23-30 are referred to broadly as a capture system 10 with various operational processes, though it is understood that this is for brevity and in no way intended to be limiting to any specific modality.

As discussed elsewhere herein, certain implementations of the capture system 10 relate to the sequestration of $CO_2$ using an input liquid with only saline water—such as seawater—and electricity. In these implementations, electricity is applied to saline water via electrolysis to create hydroxide-rich solvents which can be used to directly capture $CO_2$ from the air. The resulting liquid carbonate solution or the further processed precipitated solid carbonates are then deposited into the ocean, or stored on land, and additional saline water is used to continue the process, so as to make it continuous.

Figure 23:
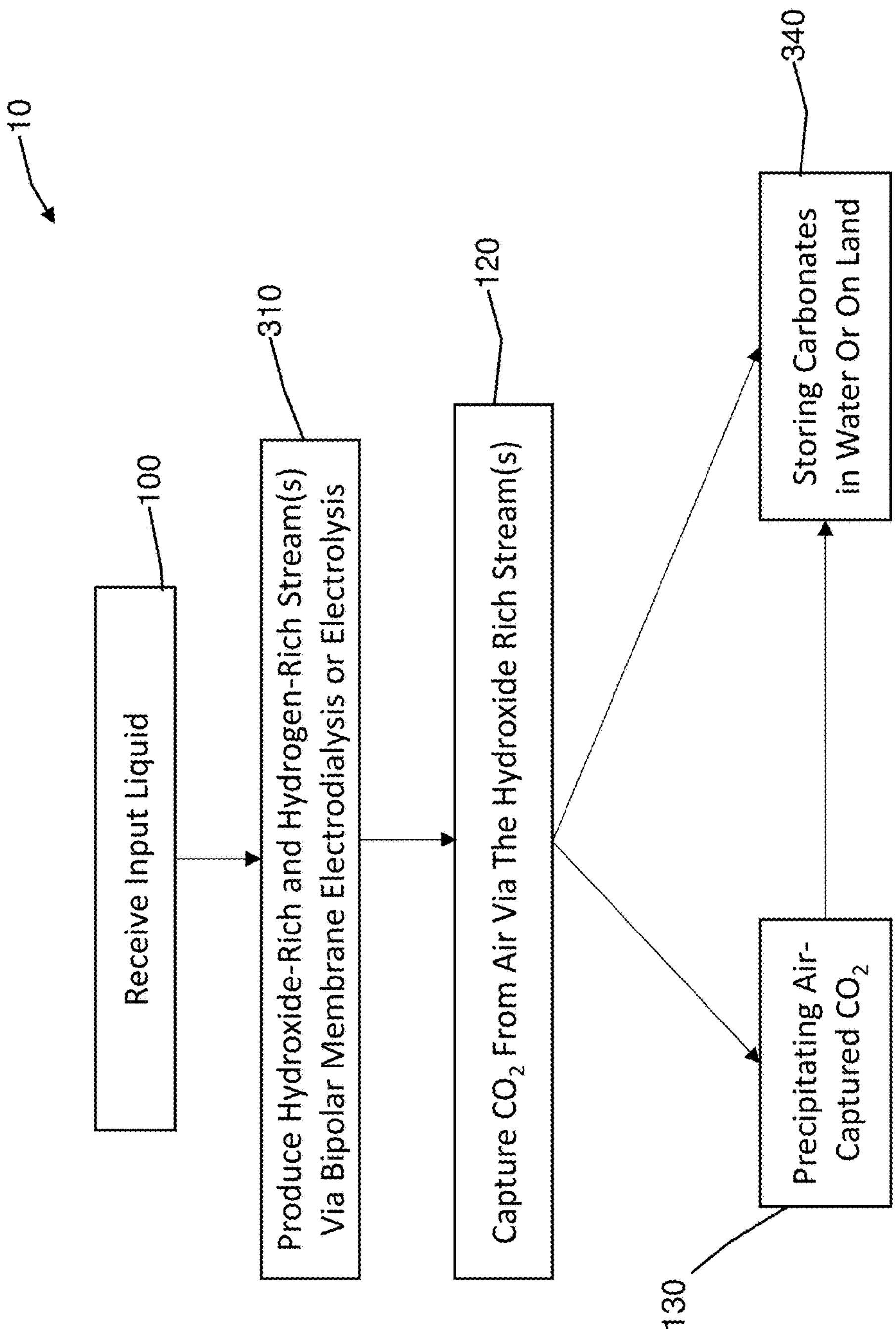
FIG. 23 shows a flow chart of the capture process, according to one implementation featuring the direct disposal of air-captured $CO_2$ carbonate in addition to the precipitated carbonate.
Figure 24:
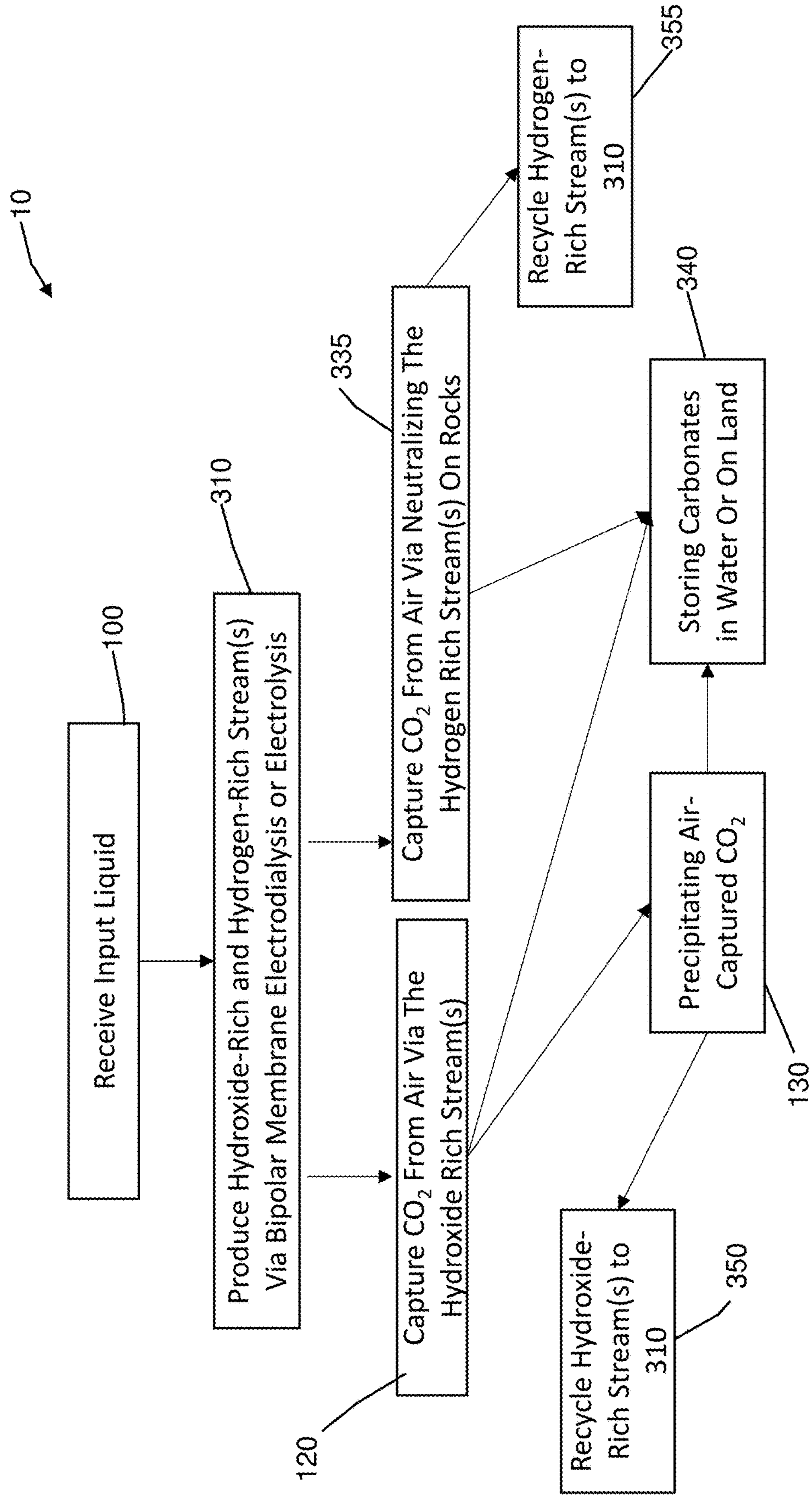
FIG. 24 depicts a flow chart depicting the capture process, according to an implementation featuring the recycling of the hydroxide-rich stream from the precipitator and the hydrogen-rich stream from the acid neutralization over Olivine-like rocks process.
Figure 25:
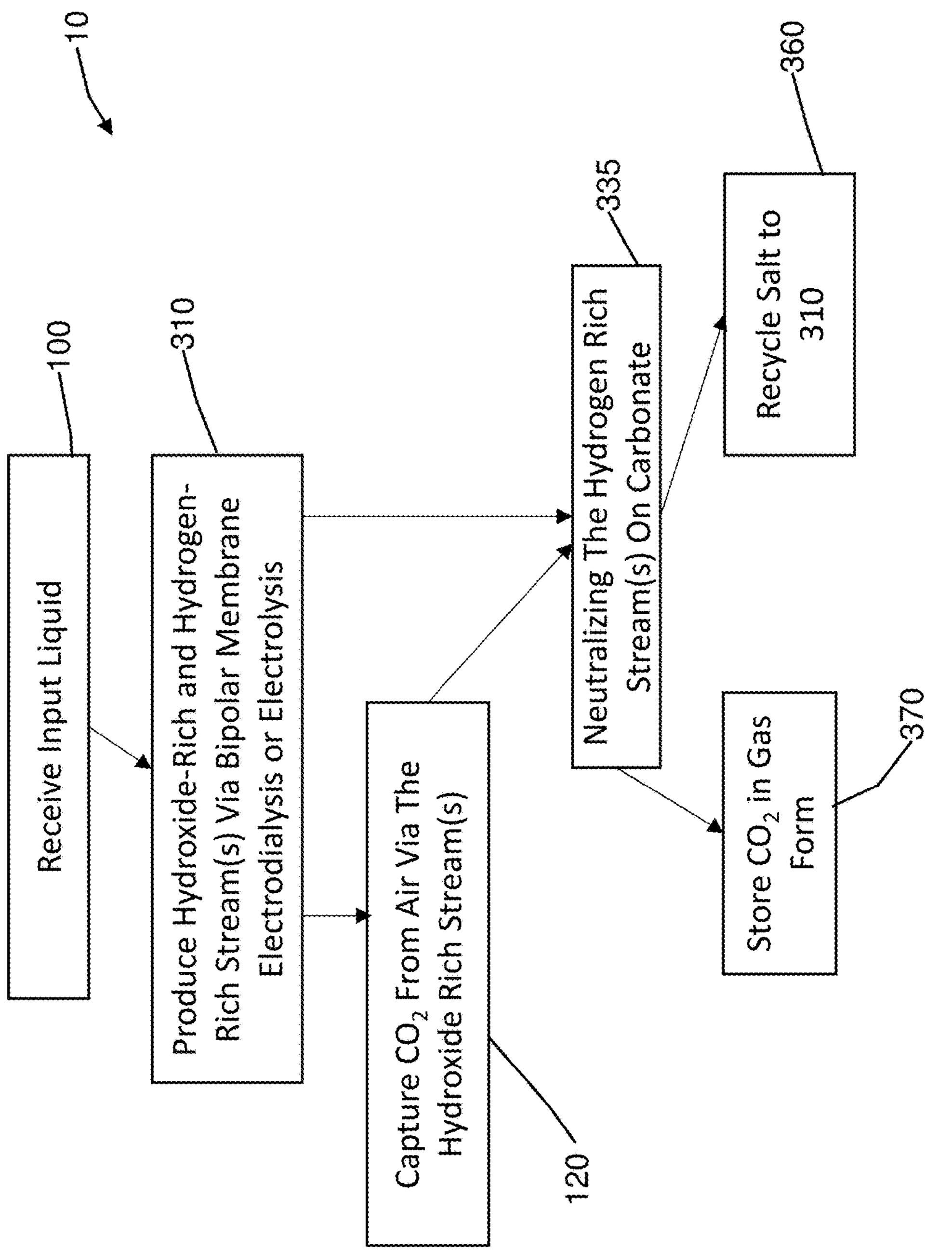
FIG. 25 depicts a flow chart depicting the capture process, according to an implementation featuring the recycling of the salt solution by neutralization of air-captured $CO_2$ carbonates with the hydrogen-rich stream.
Figure 26:
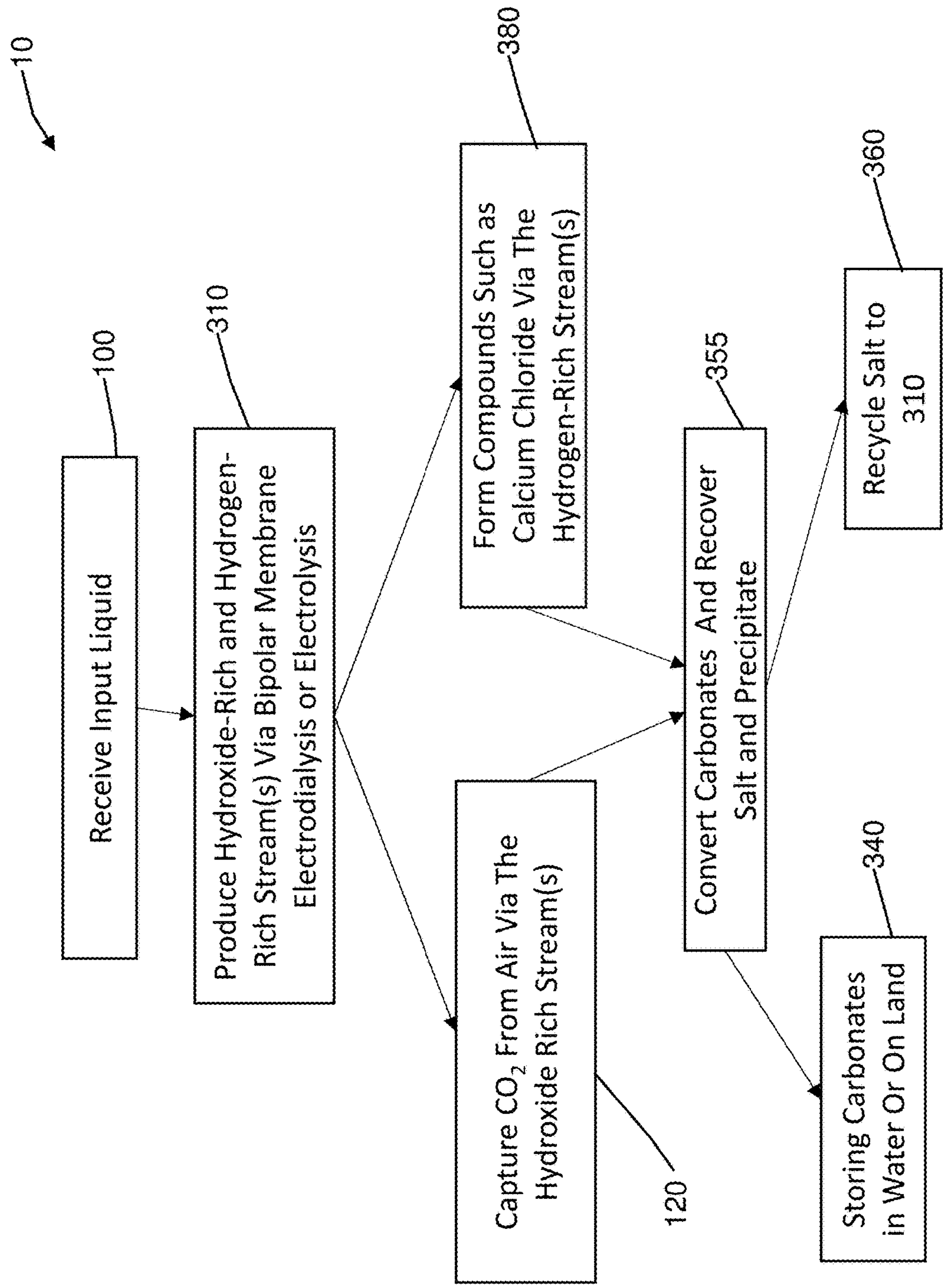
FIG. 26 depicts a flow chart wherein the neutralization of air-capture $CO_2$ carbonates is done indirectly, employing a liquid solution such as calcium chloride. The liquid solution can be sourced, either fully or partially, within the system by reacting the divalent ion rejects from ion exchange with a hydrogen-rich stream or can be sourced from outside.

FIGS. 23-26 depict various implementations of the capture system 10 described herein. In these implementations, a variety of optional post-processing steps are performed after the capture of carbon dioxide from the air via hydroxide-rich streams. For example, as shown in FIGS. 23, 24, and 26, in various implementations the liquid carbonate solution from the air contactor is directly stored in an ocean or on land (box 340). In some cases the hydrogen-rich stream is neutralized over olivine rocks (box 335), as shown in FIGS. 24 and 25. In various implementations, the hydroxide-rich stream (box 350) and the hydrogen-rich stream (box 355) are recycled back to the electrochemical process step 310 as depicted in the example of FIG. 24. In some cases the salt solution is recycled back (box 360) to the electrochemical process step either through a direct neutralization step (box 335) as shown in FIG. 25 or indirectly using liquid solutions (box 380) as shown in FIG. 26. Further, in various implementations the system 10 stores $CO_2$ in gas form (box 370) as depicted n FIG. 25.

Figure 27:
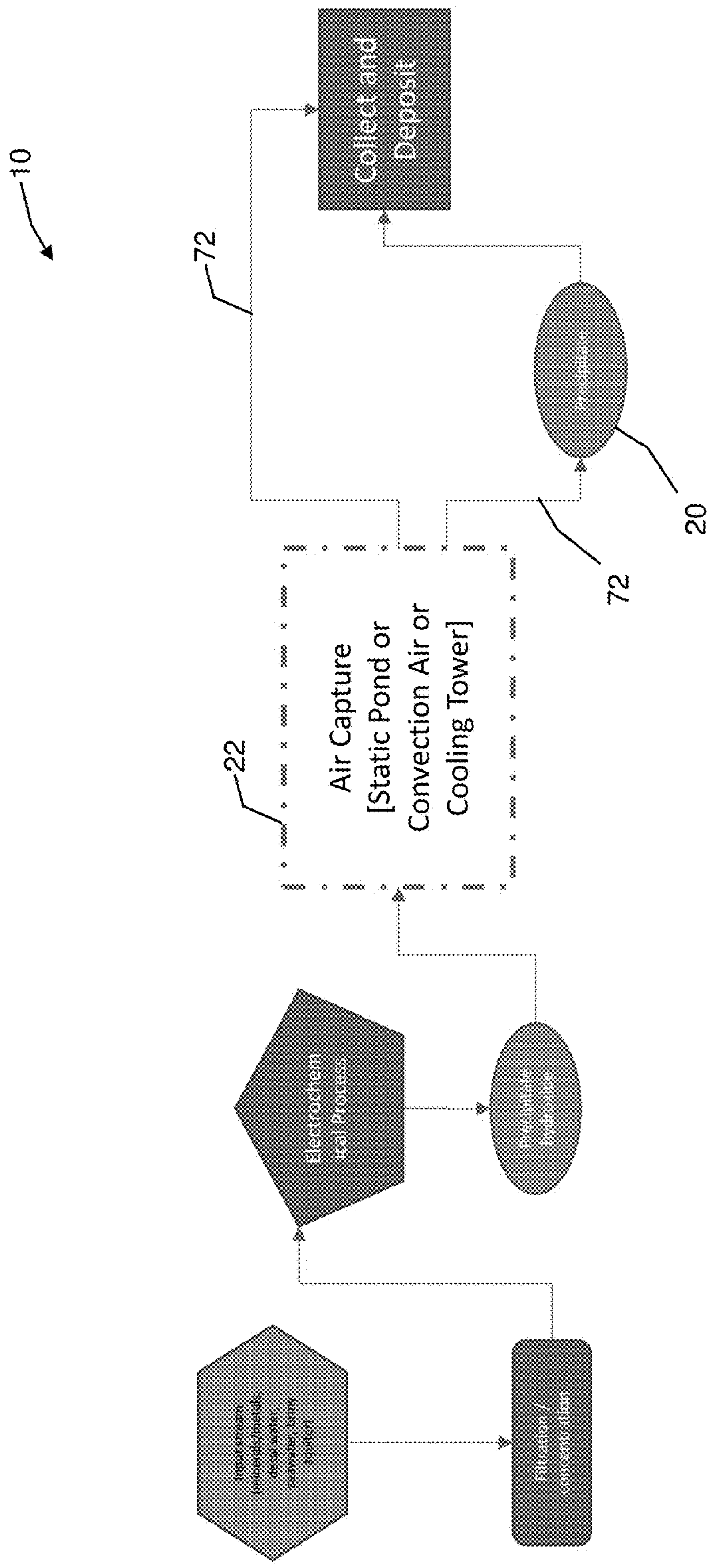
FIG. 27 shows a summary flow chart of one implementation of the disclosed system featuring direct disposal of sodium carbonates into the ocean.

Various implementations of the capture system 10 with various post-processing steps are depicted in FIGS. 27-30 according to the disclosed technology. As shown in FIG. 27, in various post-processing implementations of the air-captured $CO_2$, the carbonate solution 72 leaving the air contactor 22 is directly deposited in a large water body such as an ocean or first converted into another carbonate in a precipitator 20 and the precipitate is then deposited in an ocean or stored on land. In various implementations, the air contactor 22 is a static pond wherein a rich-hydroxide solution is exposed to air for a certain time before being disposed of. In another implementation, the air contactor 22 is a cooling tower or a system with fans or other energy-supported units to help the convection of air and increase the contact with the hydroxide-rich solution.

Figure 28:
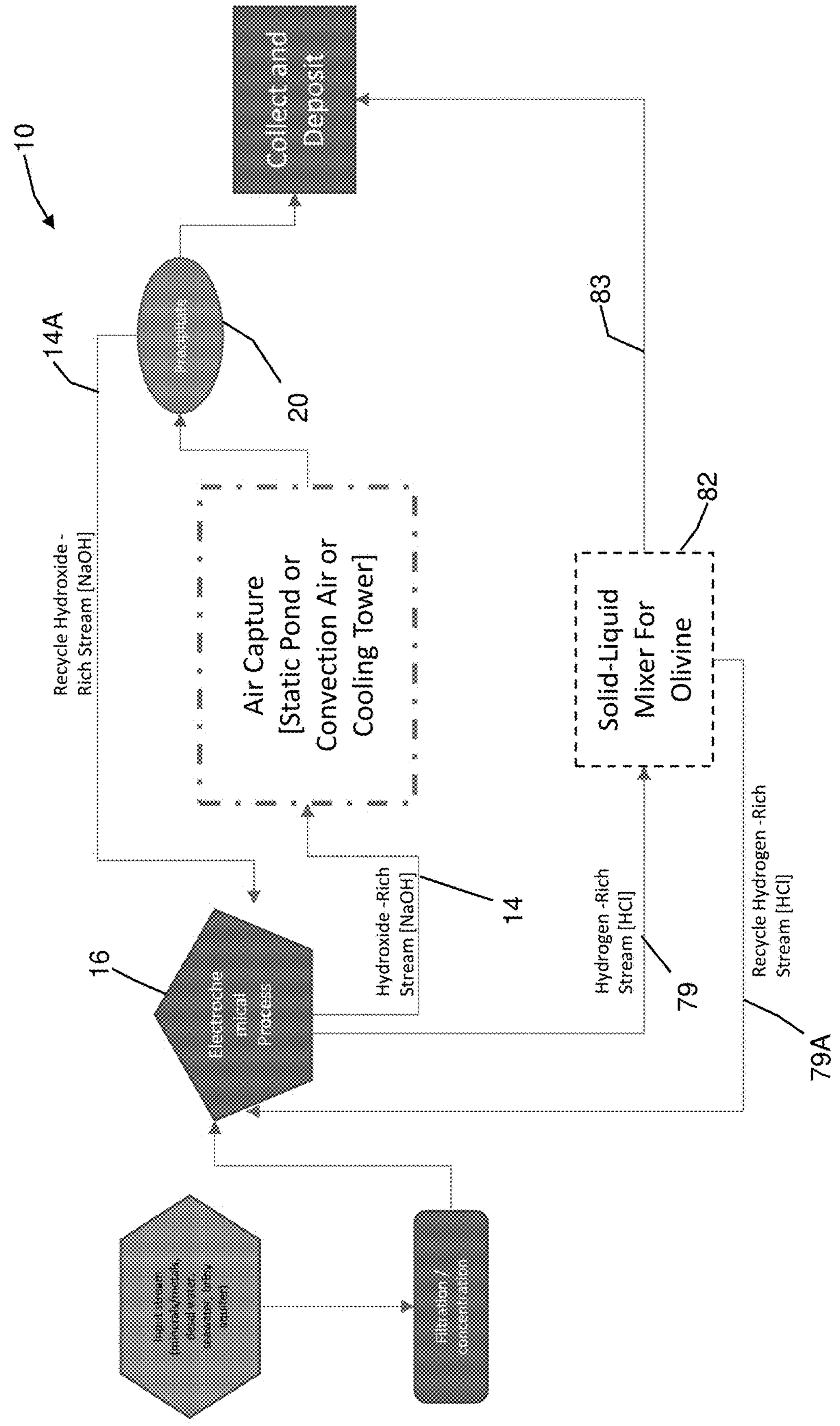
FIG. 28 shows a flow chart of the full process, according to one implementation of the disclosed system featuring the acid neutralization over olivine rocks and the recycling of the sodium hydroxide and hydrochloric acid streams.

As shown in FIG. 28, in various implementations, the hydroxide-rich liquid 14A from the precipitator 20 is recycled back to the electrochemical process 16. In various implementations, the hydrogen-rich liquid 79 from the electrochemical process 16 is neutralized in a solid-liquid mixer with Olivine rocks 82, and the neutralized mixture 83 is either stored in an ocean or on land while the unused hydrogen-rich solution 79A is recycled back to the electrochemical process 16. Various other configurations of the acid-neutralization process can also be employed.

In use according to certain implementations, the application of heat or cooling via a heat exchanger may be required for enhancing the kinetics of certain reactions and processes.

Figure 29:
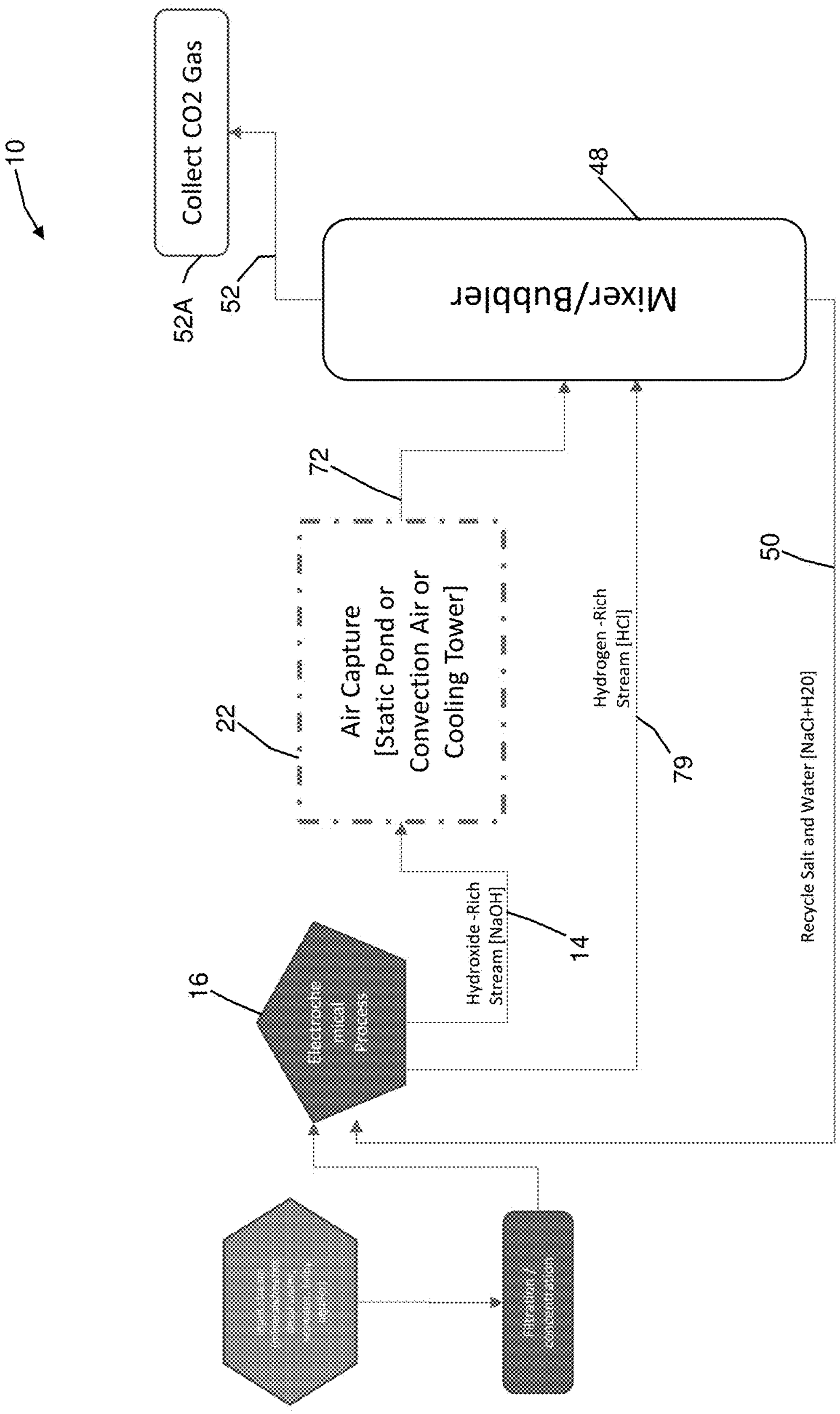
FIG. 29 depicts a further implementation of the system configured to capture carbon dioxide in gas form and recycling of the salt solution back to the electrochemical process step.
Figure 30:
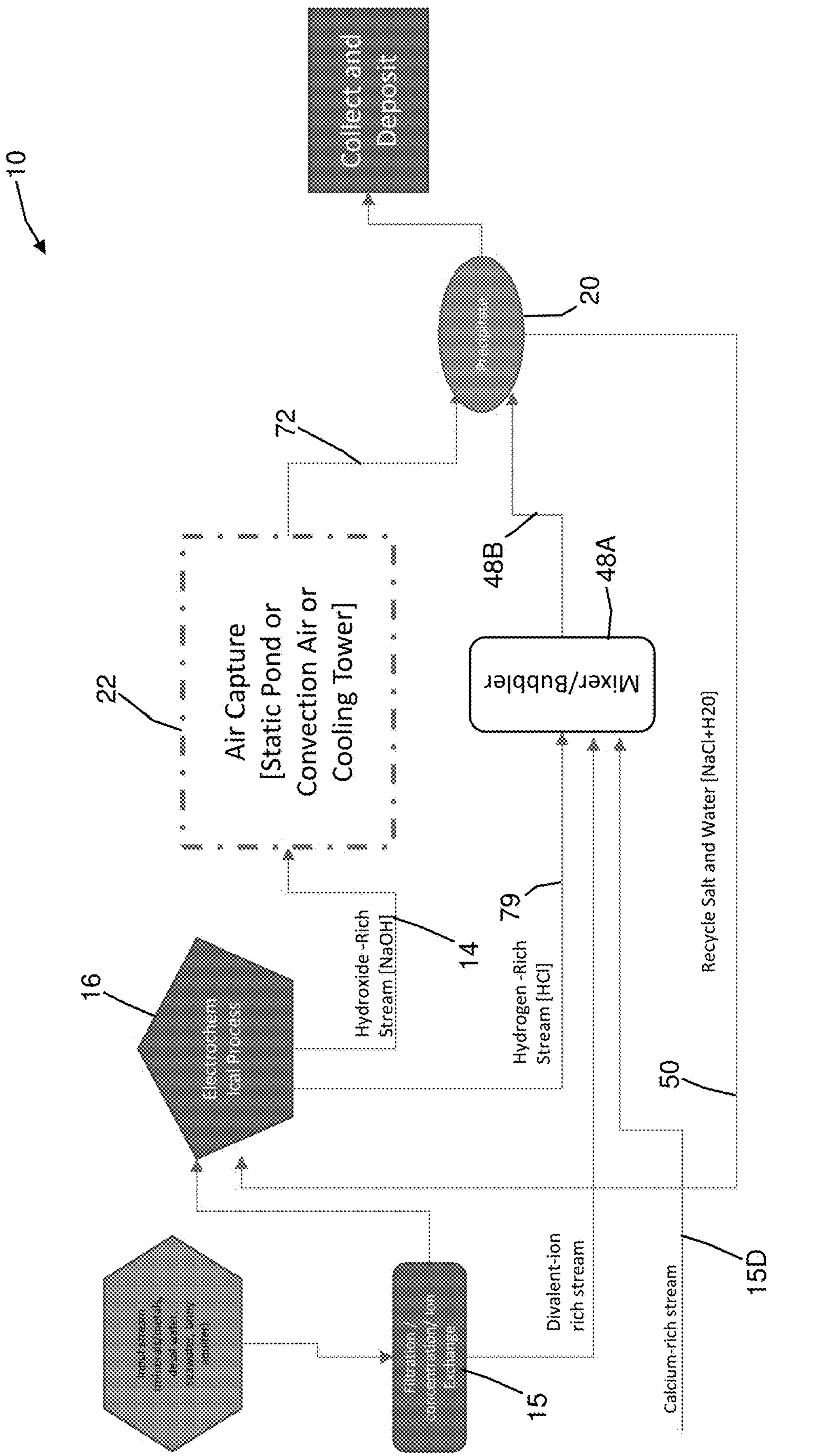
FIG. 30 depicts an alternate implementation of the system configured to recycling of the salt solution back to the electrochemical process step while precipitating calcium carbonate that is ultimately disposed of in the ocean or on land.

As shown in FIGS. 29 and 30, in various implementations, the liquid carbonate solution 72 from the air-capture unit 22 is directly or indirectly neutralized with a hydrogen-rich stream such as hydrochloric acid 79 in a mixer/bubbler 48. The direct neutralization reaction releases carbon dioxide gas 52 which is then captured for storage in pressurized vessels 52A. The resulting sodium chloride solution 50 is recycled back to the electrochemical process step 16.

In various implementations, as shown in FIG. 30, the hydrogen-rich stream 79 reacts with the divalent rejects from a pretreatment system 15 including, for example, filtration, concentration, and ion exchange stages), in a mixer bubbler 48A to form liquid solutions 48B, e.g., calcium chloride solution. This calcium chloride solution 48B combines with the sodium carbonate solution 72 from the air capture system 22 in a precipitator 20 to form a precipitate-calcium carbonate which is then disposed of in the ocean or on land. The liquid solution from the precipitator is the sodium chloride salt solution 50 which is then recycled back to the electrochemical process step.

In various implementations, as shown in FIG. 30, a calcium-rich stream or stream of other similar compounds 15D obtained from an external source is used in the mixer/bubbler 48A along with the hydrogen-rich stream 79 to form a chloride solution 48B which reacts with sodium carbonate from the air contactor 22 in the precipitator 20 to form a precipitate that is disposed of in the ocean or on land and a liquid salt solution 50 that is recycled back to the electrochemical process step.

Figure 31:
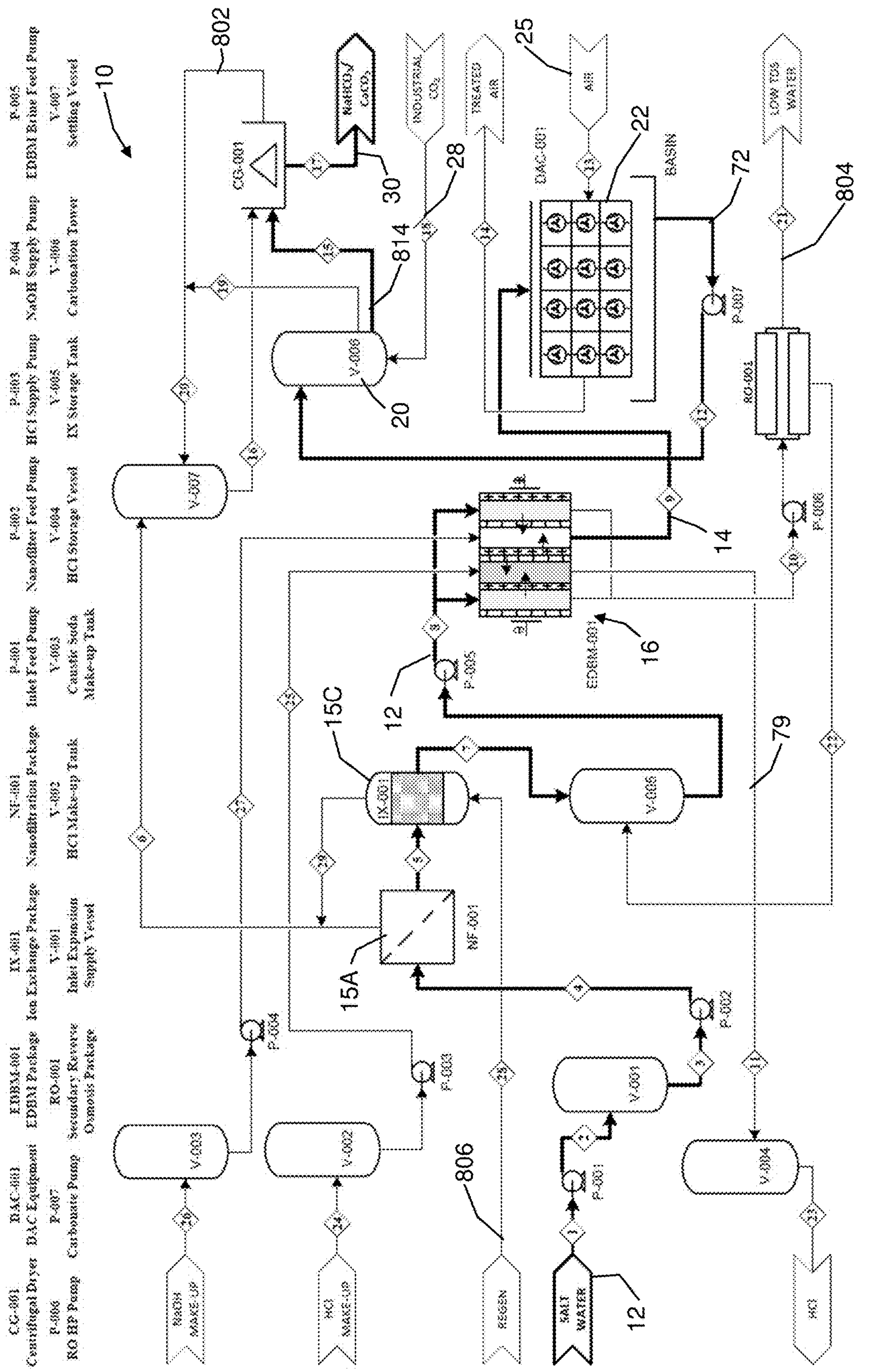
FIG. 31 is a flow chart depicting a carbon capture process, according to one implementation.

FIG. 31 is a flow chart providing a detailed depiction of a carbon capture process and system 10, according to one possible implementation. The detailed diagram depicts a number of pumps, vessels, and other components of the system, in addition to fluid connections between relevant components. It will be appreciated that the system may include fewer and/or additional components and aspects that are not shown in various cases.

As is shown in FIG. 31, in this example the system 10 receives an input liquid 12 that includes salt water. The input liquid 12 is pumped into an expansion vessel (V-001) before sending it to a pretreatment system that includes a nano-filtration unit (15A) and an ion exchange unit (15C) to remove divalent ions such as calcium and magnesium. The filtrate output from the pretreatment stage is stored in a vessel (V-005) before sending it (pump, P-005) to an electrochemical processor 16.

In various implementations the electrochemical processor 16 includes an electrodialysis bipolar membrane (EDBM-001) unit as shown in FIG. 31. The EDBM unit splits the input salt liquid 12 into an hydroxide-rich stream (14) and a hydrogen-rich stream (79). The hydroxide-rich stream 14 is then passed through an air contactor (22) wherein it absorbs carbon dioxide from air stream (25) to form carbonates. These carbonates (72) are then fed to a sparger or a bubble column reactor or a carbonation tower (V-006) wherein concentrated $CO_2$ (stream 18) from industrial gases is passed through the carbonate solution to form bicarbonates (814). The bicarbonates along with other carbonates (30) are dried in a centrifuge dryer (CG-001) to separate out a slurry of solids (30) and recycle back the additional water (802).

Figure 32:
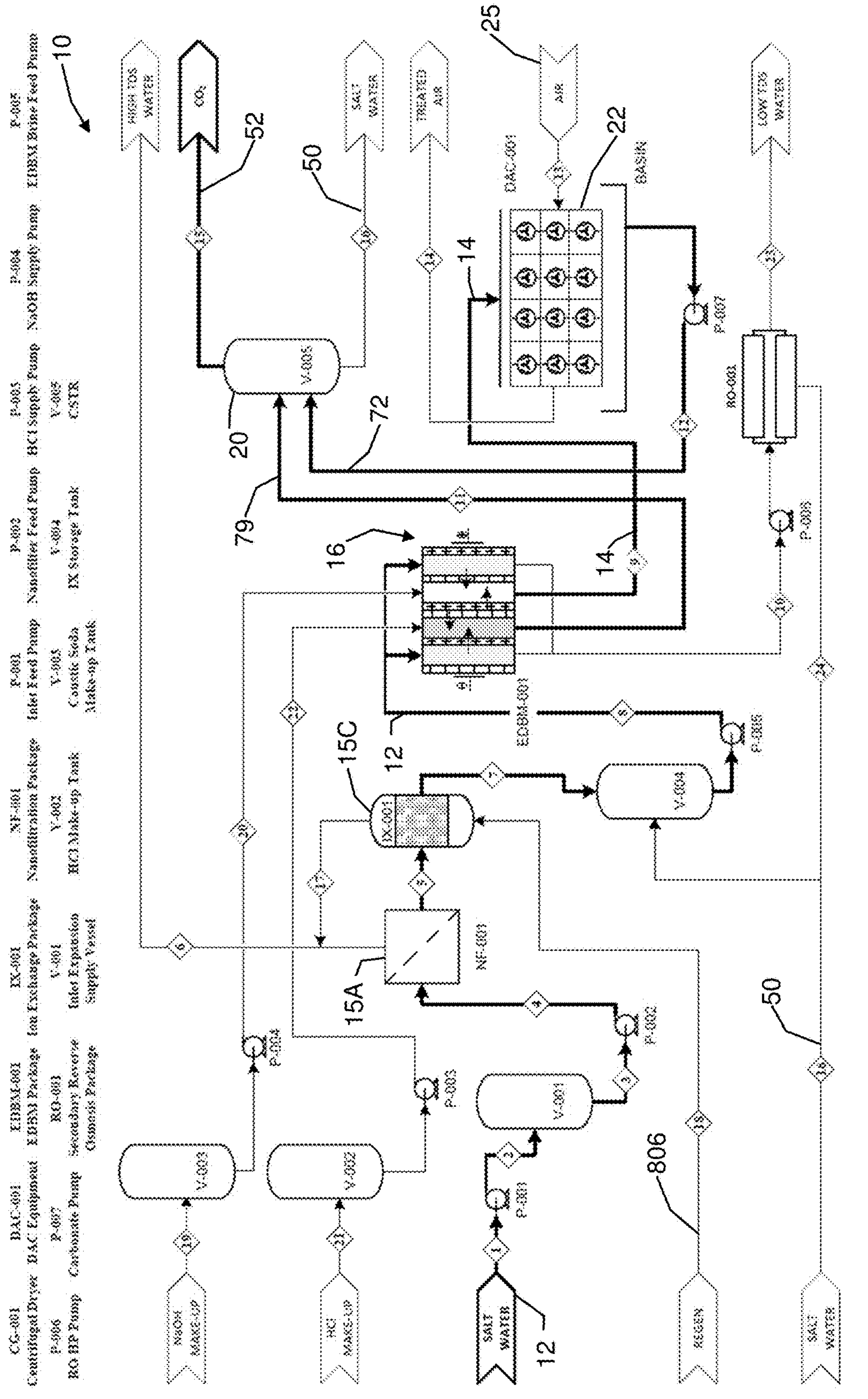
FIG. 32 is a flow chart depicting a carbon capture process, according to one implementation.

FIG. 32 is a flow chart providing a detailed depiction of a carbon capture process and system 10, according to one possible implementation. The detailed diagram depicts a number of pumps, vessels, and other components of the system, in addition to fluid connections between relevant components. It will be appreciated that the system may include fewer and/or additional components and aspects that are not shown in various cases.

As is shown in FIG. 32, in this example the system 10 receives an input liquid 12 that includes salt water (12) that is pumped into an expansion vessel (V-001) before sending it to a pretreatment stage that includes, for example, a nano-filtration unit (15A) and an ion exchange unit (15C) to remove divalent ions such as calcium and magnesium. The output from the pretreatment stage (e.g., filtrate) is stored in vessel (V-004) and mixed with recycled salt water (50) before sending it to an electrochemical processor 16.

In the various implementations, the electrochemical processor 16 is an electrodialysis bipolar membrane (EDBM-001) unit. The EDBM unit in this example splits the salt input liquid into an hydroxide-rich stream (14) and a hydrogen-rich stream (79). The hydroxide-rich stream is then passed through an air contactor (22) wherein it absorbs carbon dioxide from air stream (25) to form carbonates. These carbonates (72) are then fed to, e.g., a continuous stirred tank reactor (CSTR, V005), and mixed with hydrochloric acid (79) to form carbon dioxide gas (52) which in some cases is compressed and stored for further processing. In various implementations the salt solution 50 remaining in the CSTR is recycled back to the EDBM unit.

Turning now to FIGS. 33-36, various systems, methods and devices implement another aspect of the disclosed technology relating to post-processing of hydroxide-rich and hydrogen-rich liquid solutions in ways, among other things, that include optimizing the process, increasing the amount of carbon dioxide captured, and reducing the cost. The various embodiments disclosed or contemplated herein allow for the capture and sequestration of $CO_2$ using a liquid input such as saline water like seawater, brine, or other salty water with an electrochemical process and passive airflow over an air contactor.

As described herein elsewhere, examples and implementations of the disclosed technologies are referred to broadly as a capture system 10 with various operational flows or processes, though it is understood that this is for brevity and in no way intended to be limiting to any specific modality.

Figure 33:
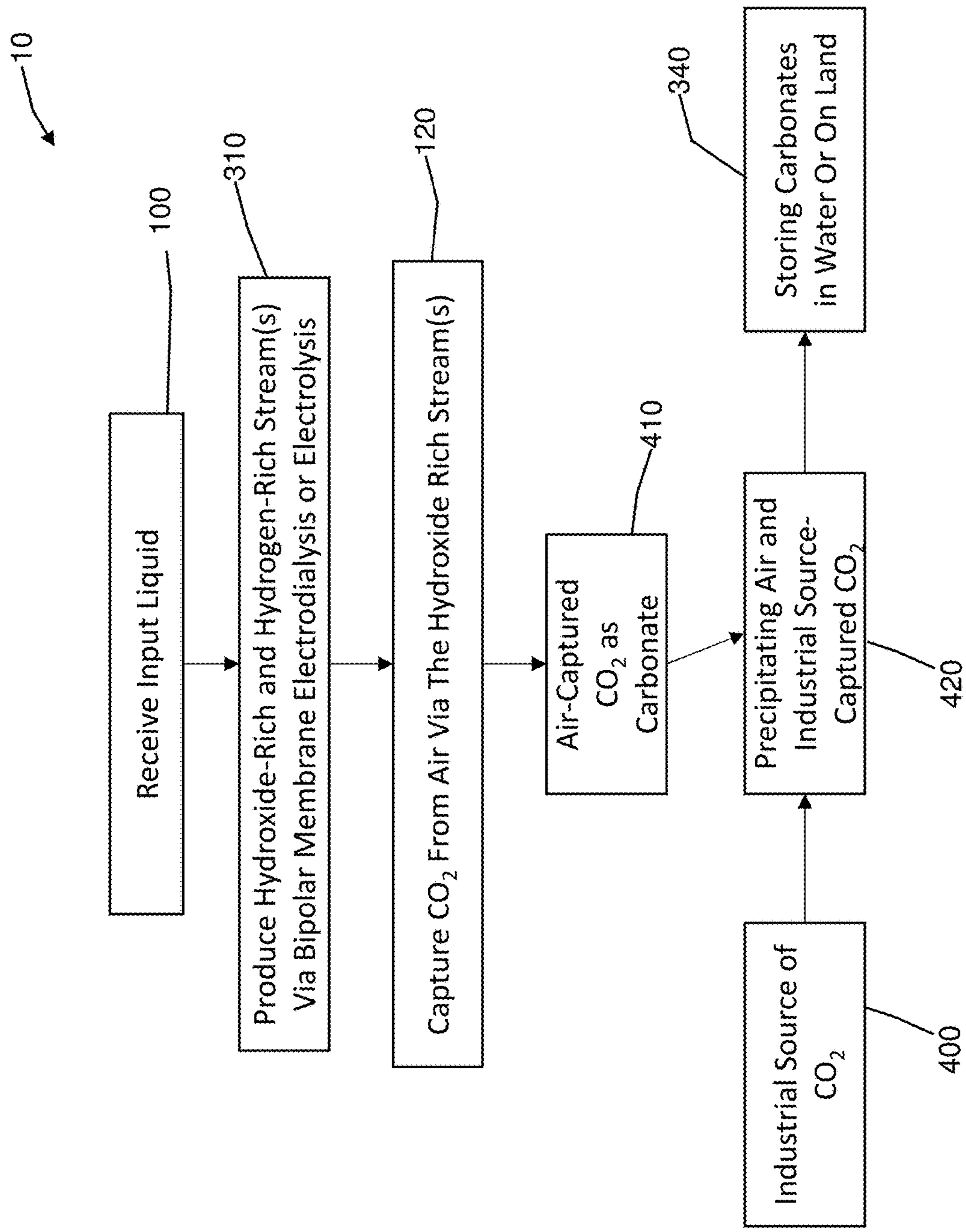
FIG. 33 depicts a flow chart wherein $CO_2$ is captured from air in the form of carbonate which is further used to absorb $CO_2$ from an industrial source to form bicarbonate.
Figure 34:
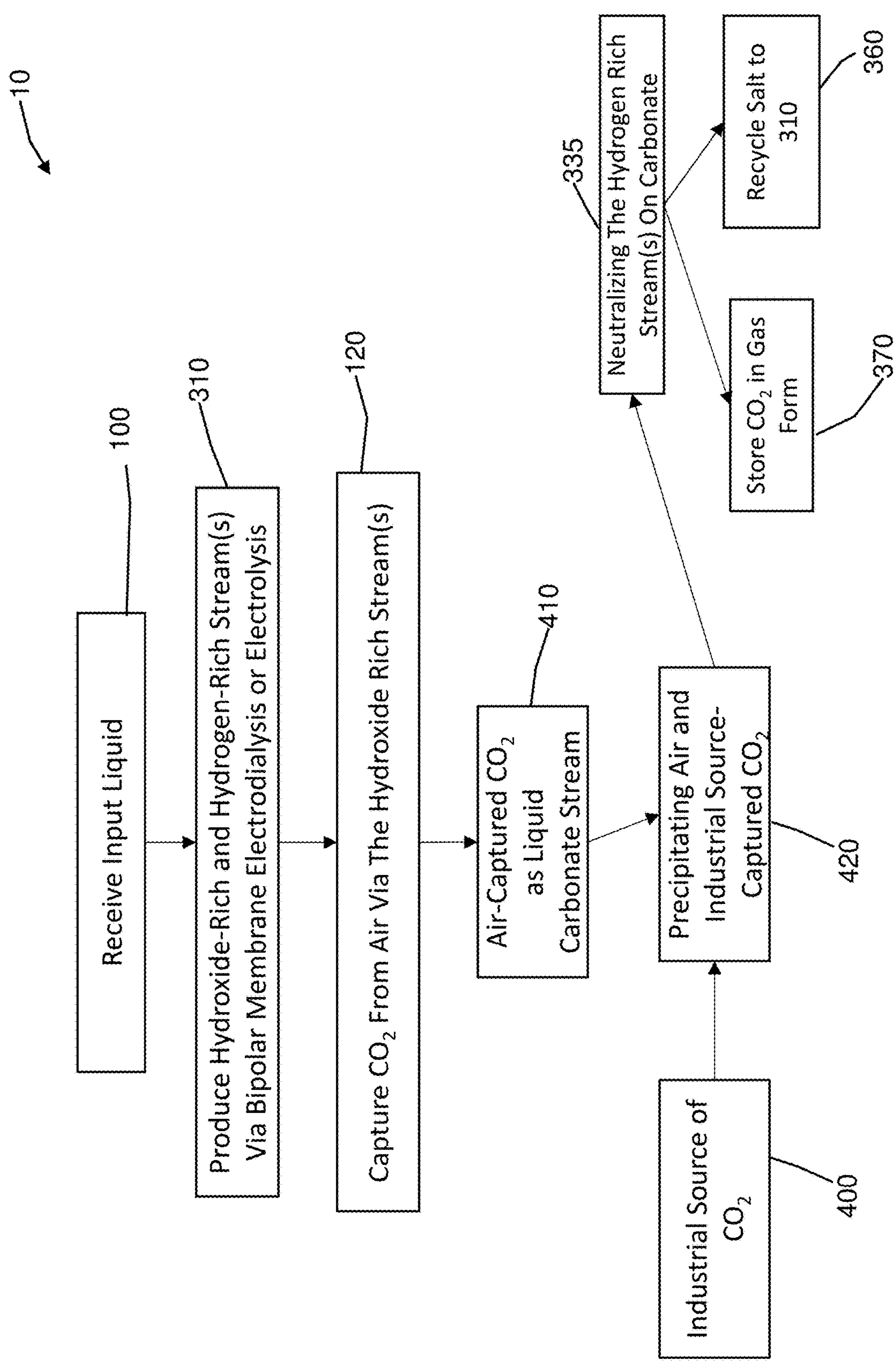
FIG. 34 depicts a flow chart depicting the capture process, according to an implementation featuring the recycling of the salt solution by neutralization of carbonates formed from absorbing $CO_2$ from the air and industrial sources with the hydrogen-rich stream.

FIGS. 33 and 34 depict various implementations of the capture system 10 and associated operational flows. In these implementations, a variety of optional post-processing steps are performed after the capture of carbon dioxide from the air via hydroxide-rich streams. For example, in various implementations, the liquid carbonate solution (box 410) from the air contactor is exposed to additional carbon dioxide gas from an industrial source (box 400) to form and precipitate bicarbonates (box 420) before storing it on land or in a large water body (box 340).

FIG. 34 depicts an implementation of the capture system 10 in which the hydrogen-rich stream is neutralized on carbonate (box 335) releasing $CO_2$ gas. The resulting salt solution is recycled back (box 360) to the electrochemical process step 310. In various implementations the $CO_2$ is stored in gas form (box 370).

Figure 35:
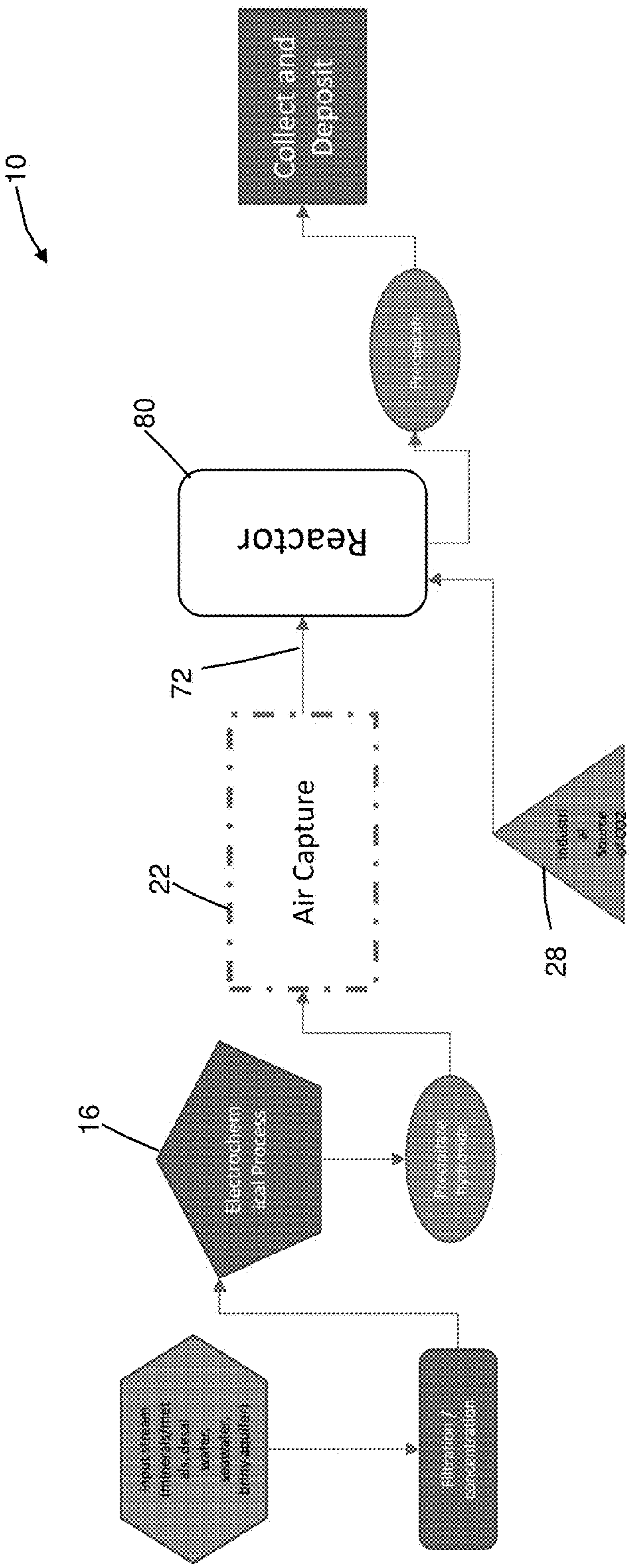
FIG. 35 shows a summary flow chart of one implementation of the disclosed system featuring the disposal of sodium carbonates and sodium bicarbonates on land or in the ocean.
Figure 36:
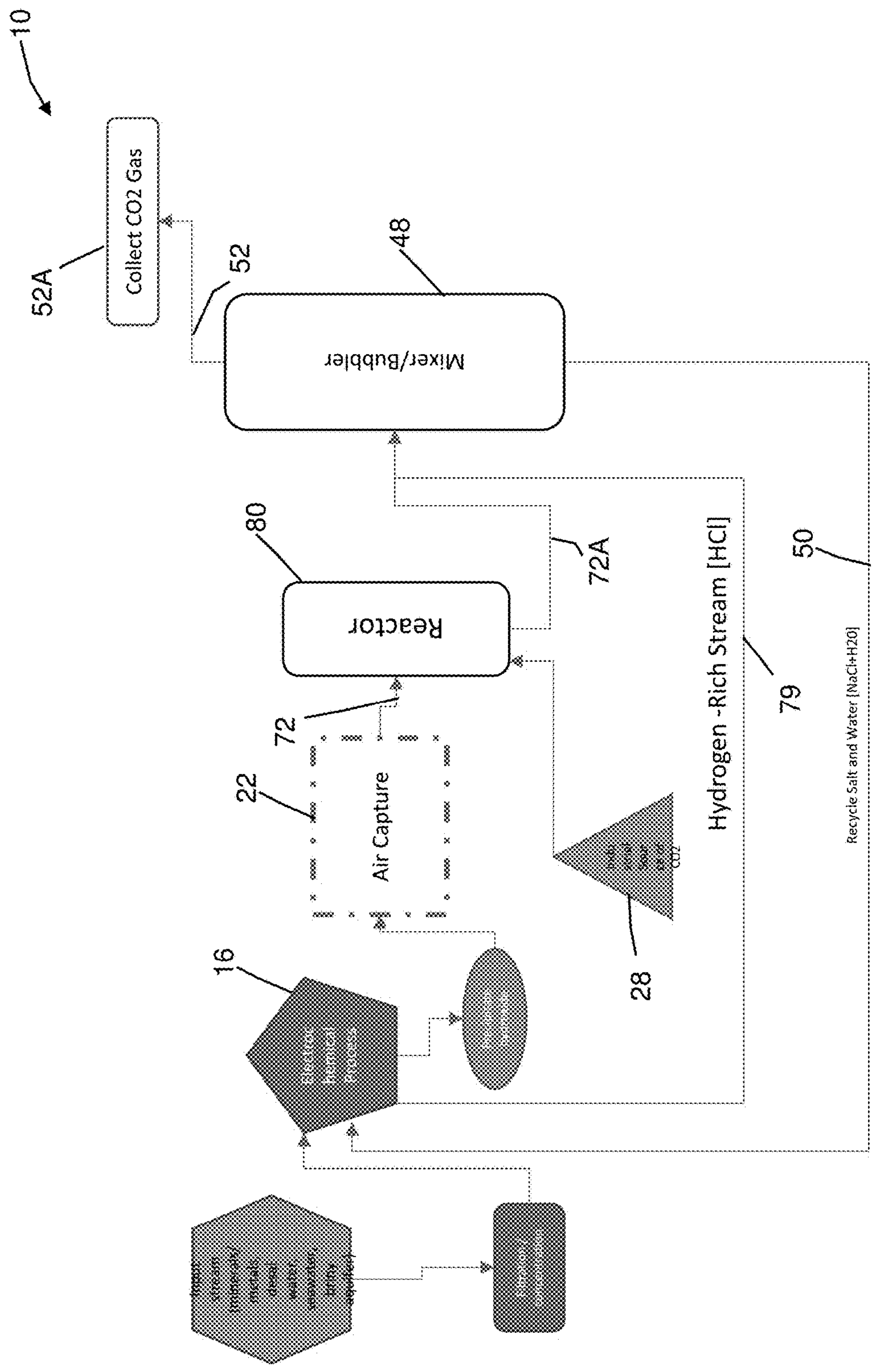
FIG. 36 depicts a further implementation of the system configured to capture carbon dioxide in gas form and recycling of the salt solution back to the electrochemical process step.

Various implementations of the capture system 10 are depicted in FIGS. 35-36 according to the disclosed technology. As shown in FIG. 35, in various post-processing implementations of the air-captured $CO_2$, the carbonate solution 72 leaving the air contactor 22 is exposed to additional carbon dioxide gas 28 from an industrial source in a reactor 80 to form bicarbonate precipitate that is ultimately stored on land or in a large water body.

In another implementation, as shown in FIG. 36, the liquid carbonate solution 72 from the air-capture unit 22 and the resulting bicarbonate solution 72A from the reactor 80 with industrial carbon dioxide gas is directly or indirectly neutralized with a hydrogen-rich stream such as hydrochloric acid 79 in a mixer/bubbler 48. The direct neutralization reaction releases carbon dioxide gas 52 which is then captured for storage in pressurized vessels 52A. The resulting sodium chloride solution 50 is recycled back to the electrochemical process step 16.

Six

Figure 37:
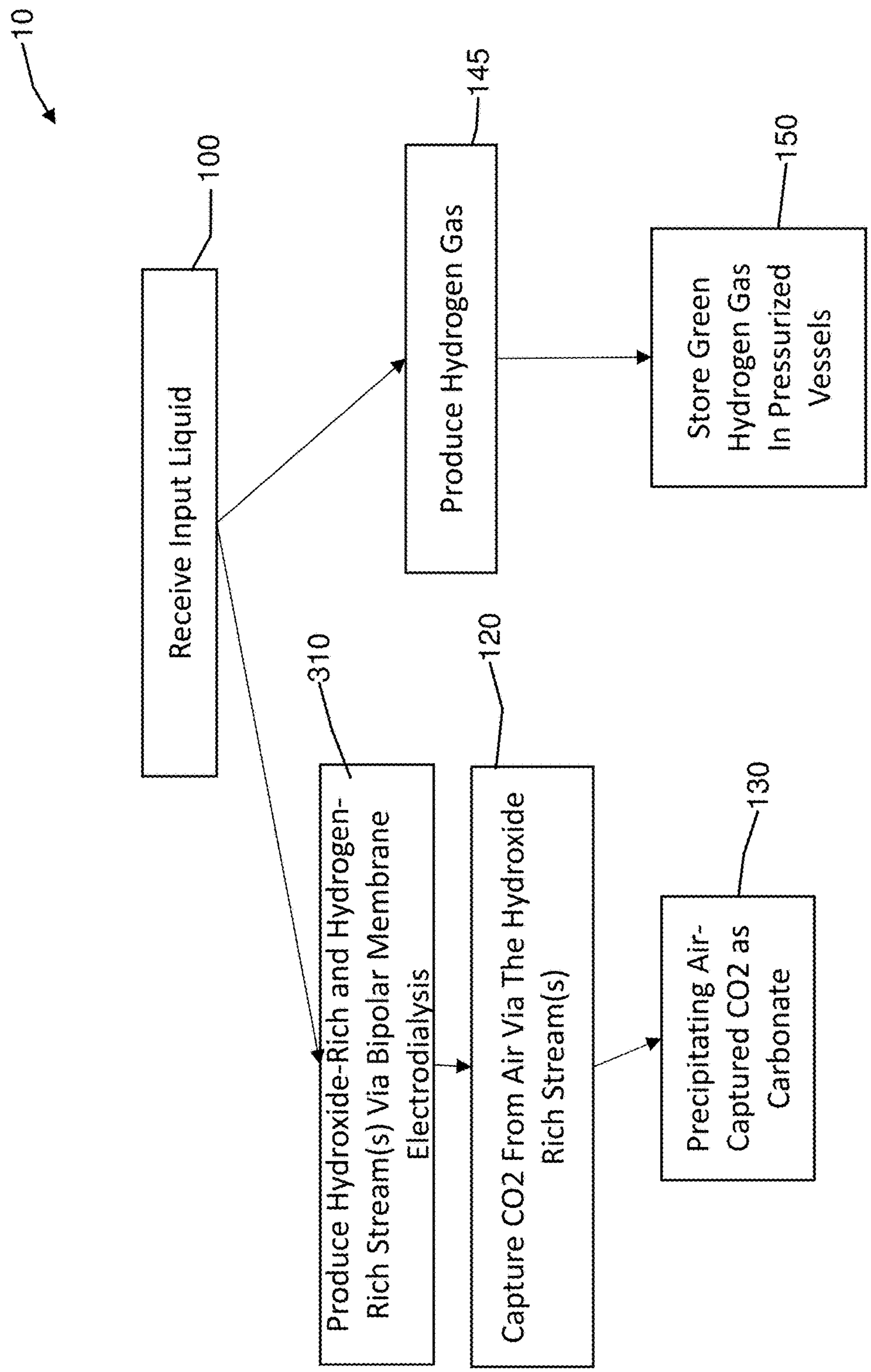
FIG. 37 depicts a flow chart depicting the carbon capture process, according to an implementation featuring the bipolar electrodialysis unit producing multiple output streams including one hydroxide-rich stream, one hydrogen-rich stream, and one hydrogen gas stream.
Figure 38:
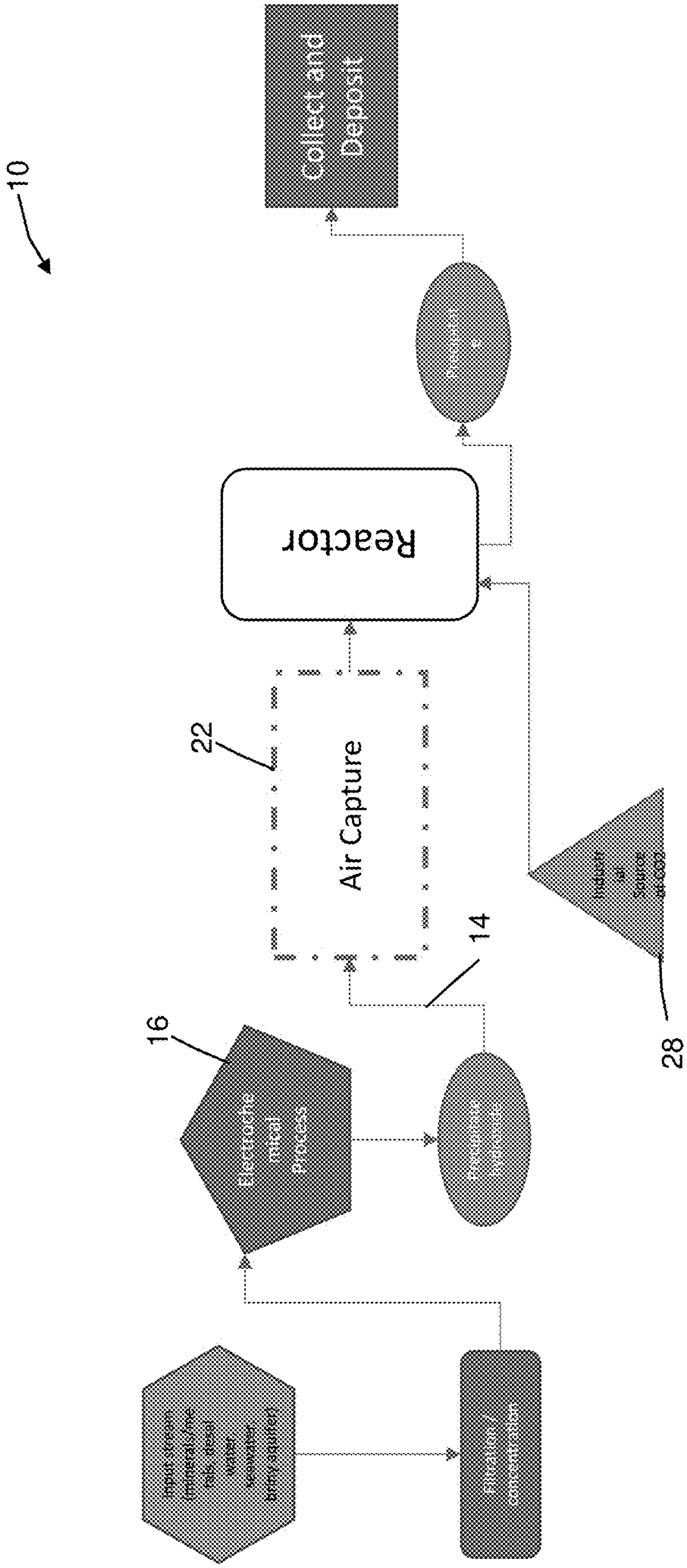
FIG. 38 shows a summary flow chart of one implementation of the disclosed system featuring the use of bipolar electrodialysis for products used for the mineralization of carbon dioxide.
Figure 39:
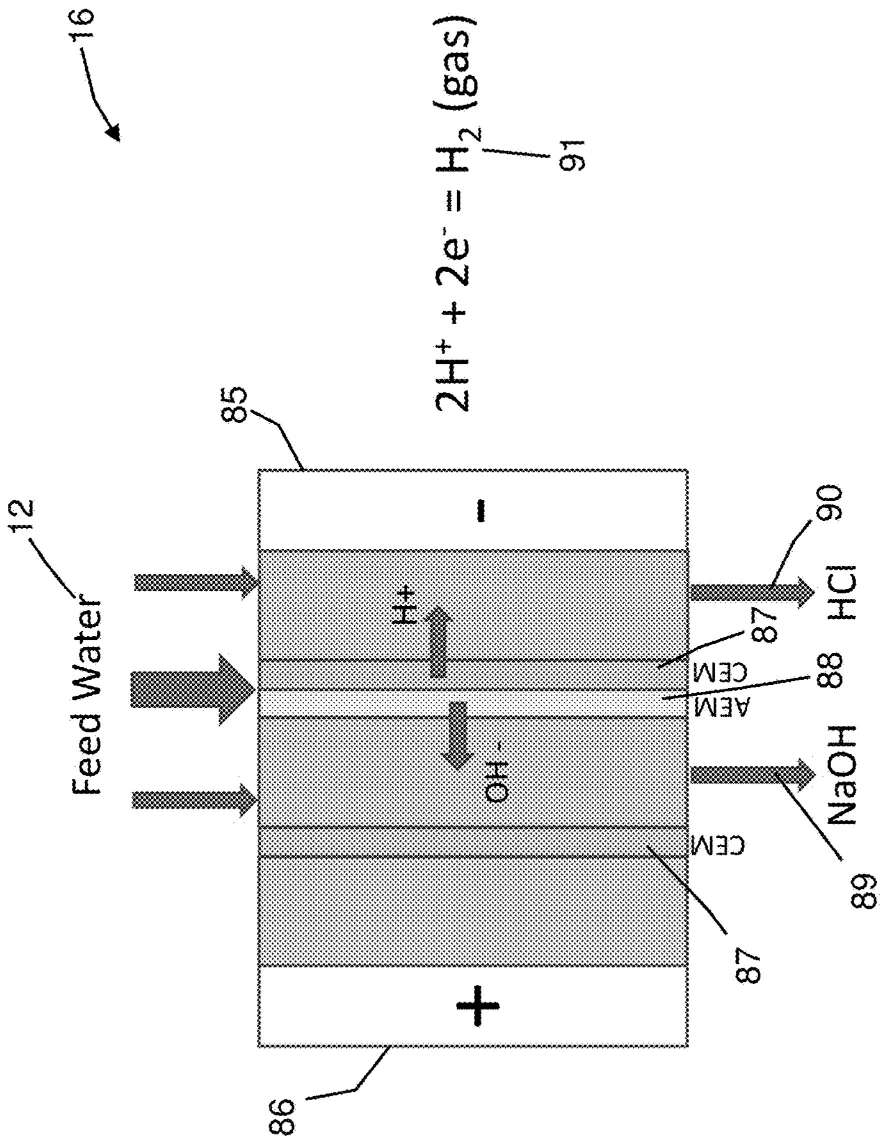
FIG. 39 shows details of the section of a BPED unit, including the arrangement of the ion exchange membranes, and the electrodes to produce multiple streams including hydrogen gas, dilute hydrochloric acid, and concentrated sodium hydroxide according to an implementation.

Turning to FIGS. 37-39, some implementations are related to another aspect of the disclosed technology relating to methods, systems, and devices for the production of multiple products streams such as green hydrogen gas, hydrochloric acid, and sodium hydroxide as part of capture and sequestration of $CO_2$ using containing water and salt inputs, electrochemical production of hydroxides, and air-flow over packing structures.

As previously discussed, and also described herein with respect to FIGS. 37-39, the disclosed technologies are referred to broadly as a capture system 10 with various operational processes or flows. It should be understood that this is for brevity and in no way intended to be limiting to any specific modality.

Certain implementations of the disclosed capture system 10 relate to the sequestration of $CO_2$ using only an input liquid 12 (e.g., saline water, such as seawater) and electricity. In these implementations, electricity is applied to saline water via an electrochemical processor. In various cases the electrochemical processor is a bipolar membrane electrodialysis (BPED) unit configured to create hydroxide-rich streams which can be used to directly capture $CO_2$ from the air. The resulting precipitated solid carbonates are then deposited into the ocean, and additional saline water is used to continue the process, so as to make it continuous. In various implementations, additional products, such as hydrogen gas and a hydrogen-rich solvent, are created in the BPED unit during the production of hydroxide-rich solvents.

FIG. 37 depicts various implementations of the capture system 10 and operational flow described herein. In these implementations, a variety of optional steps are performed. For example, in various implementations the system 10 comprises a process having steps such as receiving an input liquid (box 100) and performing an electrochemical process on the input liquid. In the illustrated example, the electrochemical process includes electrodialysis, which produces at least one hydroxide-rich stream and one hydrogen-rich stream (box 310). The system and process 10 also includes capturing $CO_2$ from air using the hydroxide-rich stream and a passive air capture system (box 120) and precipitating air-captured $CO_2$ (box 130). In various implementations, electrodialysis is performed using renewable energy to produce hydrogen gas in addition to the hydroxide-rich and hydrogen-rich solvent streams (box 145). In certain implementations, the system 10 further allows for the storage of byproduct gases, such as hydrogen, in pressurized vessels (box 150).

As shown in FIG. 38, in various cases a capture system 10 has an electrochemical process 16 that is used to split salts in the input liquid 12 to form a hydroxide-rich stream 14 (e.g., with NaOH) and a hydrogen-rich stream containing acids such as HCl (not shown). The NaOH stream 14, when exposed to ambient air or industrial gases in an air-capture unit 22, captures $CO_2$ to form carbonates that are stored on land or in water. In certain implementations, the electrochemical process includes a bipolar membrane electrodialysis (BPED) unit, which produces hydrogen gas in addition to the hydroxide- and hydrogen-rich (e.g., NaOH and HCl) streams.

FIG. 39 provides a detailed picture of a section of an electrochemical processor 16 according to various implementations. In various cases the electrochemical processor 16 is configured as a bipolar electrodialysis (BPED) unit that produces multiple product streams according to various implementations. As is shown, feed water 12 enters into the BPED unit, which has a cathode 85 and an anode 86. The unit includes multiple membranes stacked in a predetermined manner to produce the streams needed. These membranes include a cation exchange membrane (CEM) 87 and an anion exchange membrane (AEM) 88.

In various implementations the CEM 87 allows hydrogen ions generated from the splitting of the water molecule to pass through while the AEM 88 allows the hydroxyl ion to pass through. The hydrogen ions are consumed at the cathode to form hydrogen gas 91. Other electrochemical reactions on the electrode surface are also possible, though a proper selection of electrode materials and the use of electrocatalysts may increase selectivity for hydrogen evolution reactions. The remaining hydrogen ions compose a dilute hydrochloric acid 90.

The anion exchange layer 88 allows the hydroxyl ions to pass through, which are then protected by an adjacent CEM 87 to form a relatively concentrated sodium hydroxide 89 (compared to the dilute HCl generated). To further increase sodium hydroxide concentration, partial recycle may be implemented in various cases.

Seven

Various implementations disclosed or contemplated herein relate to methods, systems, and devices allowing for the simultaneous capture and sequestration of $CO_2$, desalination of water, and value-add mineral extraction. In various cases carbon dioxide is captured and sequestered from ambient air (e.g., in an air contactor) and also from industrial sources (e.g., in a bubble column or sparger reactor). Desalinated water can be provided for industrial and residential uses in some cases. The combined processes are closely integrated, with several interdependencies and synergies, leading to an efficient system wherein products are used interchangeably between the processes, resulting in advantages such as low carbon emissions and reduced waste stream.

Additional implementations disclosed or contemplated herein relate to methods, systems, and devices for the extraction of value-add minerals such as, among others, chromium, bromine, and lithium, the recovery of low total dissolved solids (TDS) water for use in residential or industrial purposes, and the capture of carbon dioxide. In various implementations, carbon dioxide is absorbed from fossil fuel energy generated for, among others, reverse osmosis and desalination of salty water and/or captured from ambient air using processes such as, among others, nanofiltration, ion exchange, and electrolysis or electrodialysis to manufacture the solvent from high-salinity brine.

Figure 40:
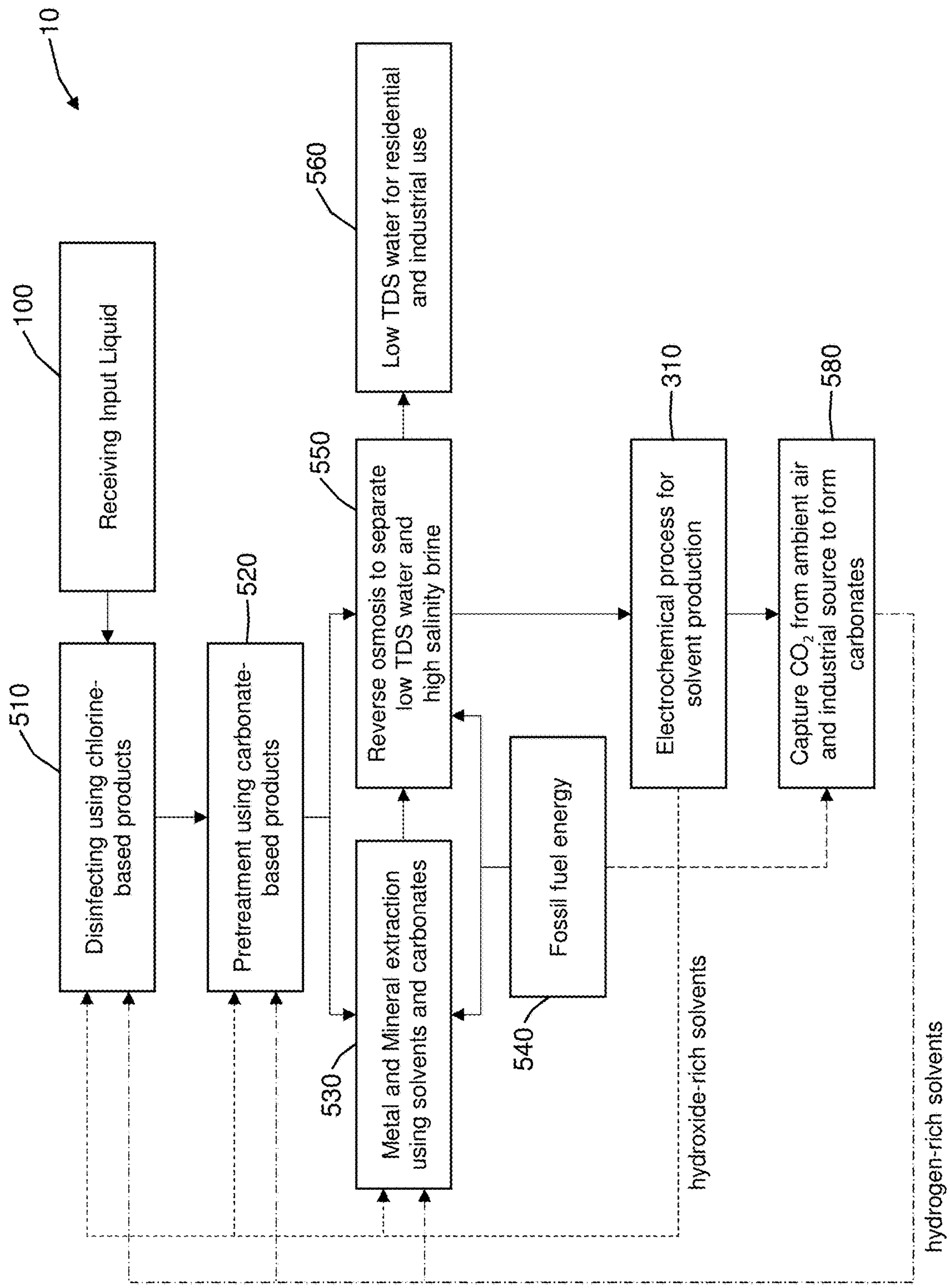
FIG. 40 shows a flow chart of the combined carbon capture, desalination, and mineral extraction process, according to one implementation.
Figure 41:
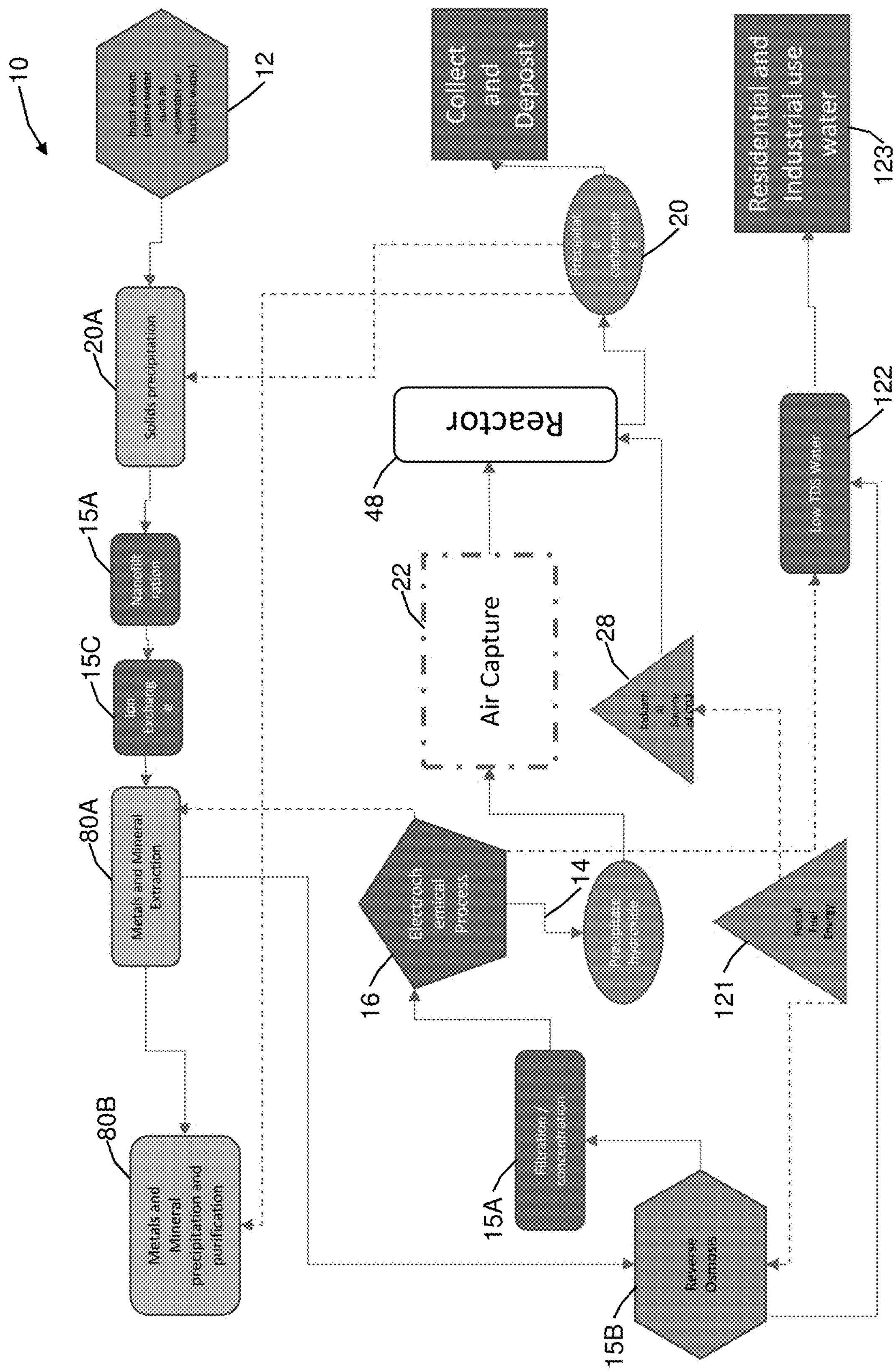
FIG. 41 shows a summary block diagram of one implementation of the disclosed system using including the synergies and interdependencies between carbon dioxide capture and sequestration, desalination, and mineral extraction.

As previously discussed, and also described herein with respect to FIGS. 40-41, the disclosed technologies are referred to broadly as a capture system 10 with various operational processes or flows, though it is understood that this is for brevity and in no way intended to be limiting to any specific modality.

Certain implementations of the capture system 10 shown in FIGS. 40-41 relate to the sequestration of $CO_2$ and simultaneous extraction of value-add minerals along with recovery of low TDS water for residential and industrial purposes using only saline water, such as seawater or brackish groundwater, and electricity. In these implementations, electricity is applied to the input saline water via an electrochemical process. In various implementations the electrochemical process includes electrolysis, which creates hydroxide-rich solvents which can be used to directly capture $CO_2$ from the air. In various implementations the electrochemical process (e.g., electrodialysis or electrolysis) also creates a hydrogen-rich and chlorine-rich solvent stream that can be used for mineral extraction and for disinfecting the low TDS water for its use.

FIGS. 40-41 depict various synergistic and interdependencies among carbon capture, mineral extraction, and desalination processes according to various implementations of the capture system and process 10. In the depicted implementation, a variety of optional steps are performed. For example, in various implementations the system 10 comprises a process having steps such as receiving input liquid (box 100) and disinfecting the input liquid with chlorine-based products (box 510) obtained from the electrochemical reaction used to produce solvent for the carbon capture process (box 310).

The disinfected product is then passed through a pretreatment stage that variously includes nanofiltration and ion exchange. The product is further pretreated with carbonates such as sodium carbonate and sodium bicarbonate (box 520) which are obtained from the carbon capture process (box 580). The pretreated solution is then processed through hydrogen-rich solvents from the electrochemical process, such as hydrochloric acid, to dissolve metals and minerals and the dissolved materials are precipitated as carbonates for extraction (box 530).

The resulting water stream is passed through reverse osmosis and other processes involved in the desalination of the water (box 550) to obtain a low TDS stream for residential and industrial use (box 560). The concentrated, high-salinity brine is then passed through an electrochemical process such as electrolysis or electrodialysis for producing solvents (box 310) including, for example, hydrogen-rich and/or hydroxide-rich solvents. A solvent, such as sodium hydroxide, is used to capture $CO_2$ (box 580) from ambient air as well as from an industrial source, such as a fossil fuel energy generator (box 540) used to power the metal extraction and desalination processes.

As shown in FIG. 41, in various implementations of the system 10, an input liquid 12 such as seawater 12 or other saline liquid 12 is fed into the capture system 10. The input liquid 12 is pretreated and filtered to remove coarse particles 15A and divalent ions such as calcium and magnesium 15C. The input liquid 12 is then passed through a metal and mineral extraction process, such as in an absorber 80A, before precipitating the metal and minerals for further purification 80B. The input liquid 12 coming out of the metal and mineral extraction process 80A is also passed through a reverse osmosis unit 120 which uses energy from a fossil fuel generator 121. The reverse osmosis unit 120 separates the water into a low TDS water stream 122 that can be further disinfected with hydrogen and chlorine-rich disinfectant before sending it for residential and industrial use 123. In addition, the concentrate from the reverse osmosis stage 120 is filtered 15A, if needed, before being passed into a bipolar membrane electrodialysis stack 16 to produce a hydroxide-rich stream 14 containing salts such as NaOH and/or other hydroxides and/or a hydrogen-rich stream containing acids such as HCl.

As described herein, it is understood that the capture system 10 shown in FIG. 41 comprises one or more fluidic and/or electrical connections (shown generally at the lines) between a variety of optional components that can be arranged in a wide variety of arrangements, such that the various fluids/gasses and electricity described herein are able to flow as described.

Some or all of the hydroxide solution 14 is then sent to a direct air $CO_2$ capture mechanism 22 for capturing carbon dioxide and an industrial gas $CO_2$ capture mechanism 48 for capturing an industrial source of carbon dioxide 28 as carbonates. This mechanism can be one of many existing approaches. Once this stream 14 has progressed through the $CO_2$ capture systems and becomes saturated with carbon, it is again preferably sent to a precipitation system 20 to extract carbonates.

Figure 42:
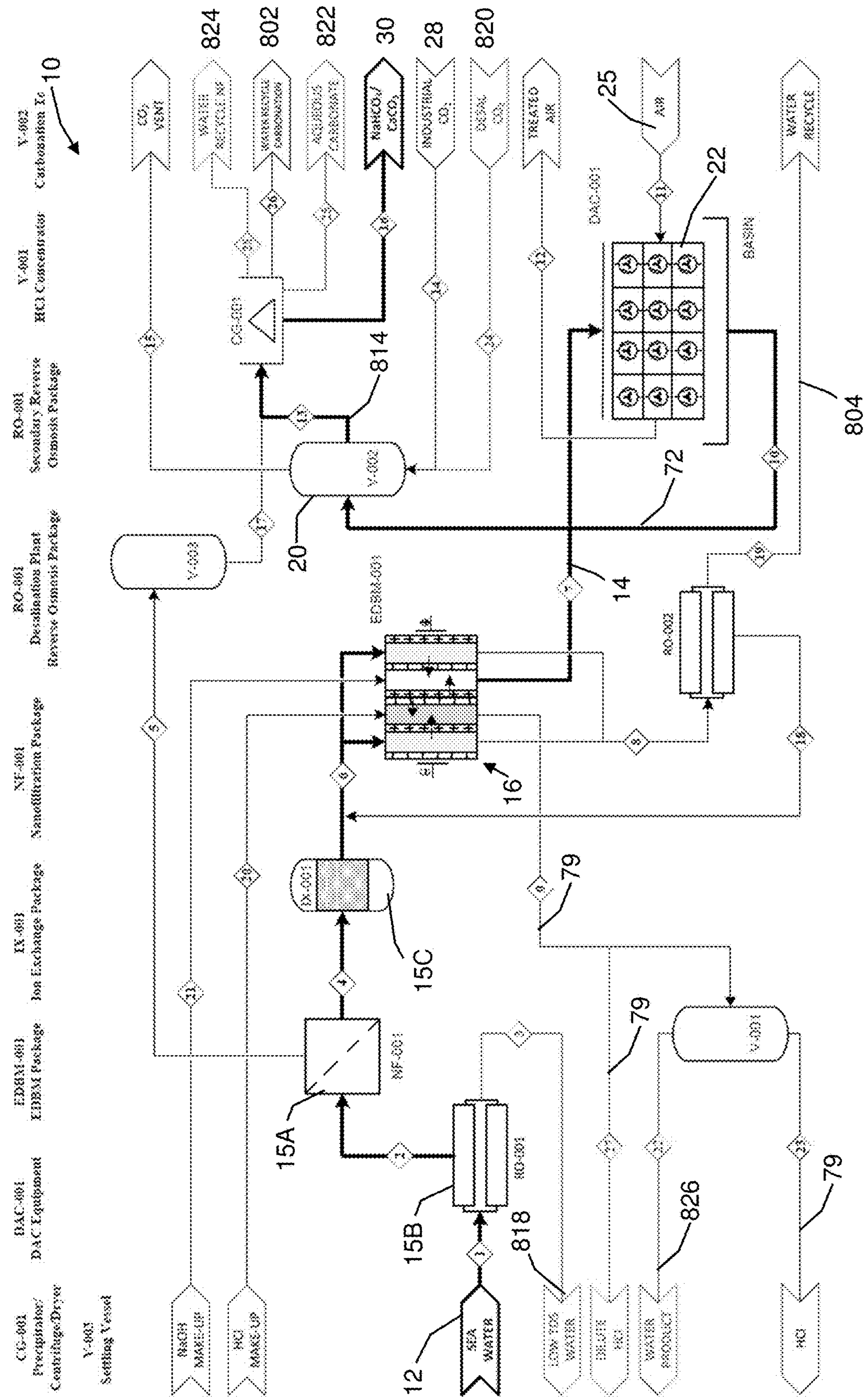
FIG. 42 is a flow chart depicting a carbon capture process, according to one implementation.

FIG. 42 is a flow chart providing a detailed depiction of a carbon capture process, according to one possible implementation. The detailed diagram depicts a number of vessels and other components of the system, in addition to fluid connections between relevant components. It will be appreciated that the system may include fewer and/or additional components and aspects that are not shown in various cases.

Continuing with FIG. 42, in various implementations, a capture system and method 10 receives an input liquid 12, such as, for example, sea water, which is then sent through a pretreatment stage. In the illustrated example, the pretreatment stage includes a reverse osmosis unit (15B) in which the input liquid 12 is concentrated. Following the concentration, the resulting permeate (818) which contains reduced dissolved salts (low TDS) is returned back for residential and industrial use. The concentrated input liquid 12 from the reverse osmosis unit (15B) is then fed to a nano-filtration unit (15A) and an ion exchange unit (15C) to remove divalent ions such as calcium and magnesium. The output of the pretreatment stage (e.g., filtrate) is then sent to an electrochemical processor 16.

In various implementations, the electrochemical processor 16 includes an electrodialysis bipolar membrane (EDBM-001). The EDBM unit is configured to split the input liquid salt stream into a hydroxide-rich stream (14) and a hydrogen-rich stream (79). The hydroxide-rich stream is then passed through an air contactor (22) wherein it absorbs carbon dioxide from an air stream (25) to form carbonates. These carbonates (72) are then pumped to a reactor (V-002) which absorbs $CO_2$ from industrial gases (28) and from a desalination facility (820) to form bicarbonates (stream 814). In various implementations the solid bicarbonate slurry (814) is separated in a centrifuge dryer (CG-001) into a solid carbonate/bicarbonate precipitant stream 30, an aqueous carbonate 822 stream, and water, which in some cases is recycled back into the system (802), sent to desalination facility (824), or both.

As will be appreciated, in various implementations the process/system 10 uses one or more additional inputs and may generate one or more additional outputs. In various implementations one or more ancillary inputs and/or outputs are largely recycled within the system. For example, in some cases an output from the electrochemical process 16 is processed (e.g., by reverse-osmosis) and provides low total dissolved solids (TDS) water (804), which can be used as a makeup liquid for the EDBM unit. In some cases an HCl make-up stream and/or NaOH make-up stream are also used to facilitate the EDBM unit.

As will be appreciated, additional inputs and/or outputs may be present in various implementations of the system 10, especially when the capture system 10 is integrated with another industrial process such as, for example, desalination. In various implementations the capture system/process 10 is configured to provide the following a number of outputs to a desalination facility. As shown in FIG. 42, examples include Low TDS water 818 collected upstream from the electrochemical process as a RO permeate (e.g., up to 50%) and sent to the desalination facility; dilute HCl 79 sent to the desalination facility for disinfectant and pH control; water 826 recovered from concentrating HCl; and an aqueous carbonate solution 822 separated in the centrifuge dryer and sent to the desalination facility for removing hardness and pH control.

In addition, in various implementations the system/process 10 is configured to receive and process $CO_2$ emissions from the desalination facility, thus providing an efficient way of handling emissions.

The various implementations disclosed or contemplated herein relate to methods, systems, and devices allowing for the simultaneous capture and sequestration of $CO_2$ from ambient air in an air contactor and that from industrial sources in a bubble column or sparger reactor, and mineral extraction from mined rock materials or from waste rock materials. In various implementations the combined process is closely integrated, with several interdependencies and synergies, leading to an efficient system wherein products are used interchangeably between them resulting in low carbon emissions, and reduced waste stream.

As described herein, the disclosed technologies will be referred to broadly as a system 10, though it is understood that this is for brevity and in no way intended to be limiting to any specific modality.

Certain implementations of the capture system 10 relate to the sequestration of $CO_2$ and simultaneous extraction of metal and minerals from mined rock or waste rock materials using only saline water and electricity. In these implementations, electricity is applied to saline water via electrodialysis to create hydroxide-rich solvents which can be used to directly capture $CO_2$ from the air. The electrodialysis process also creates a hydrogen-rich acid stream that can be used for dissolving mined or waste rocks and the subsequent metal or mineral extraction.

Figure 43:
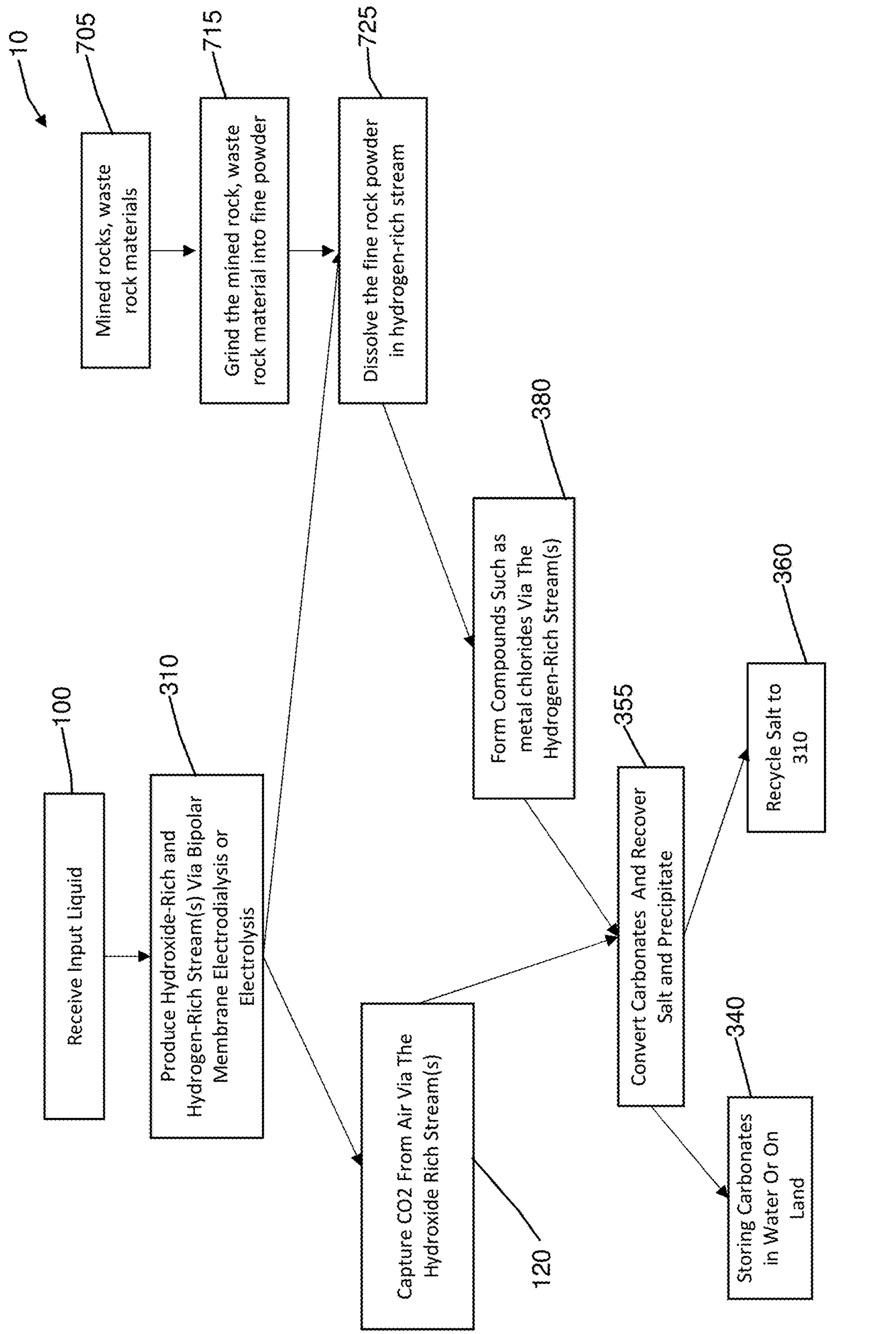
FIG. 43 shows a flow chart of the combined carbon capture, desalination, and mineral extraction process, according to one implementation.

FIG. 43 depicts various synergies and interdependencies according to various implementations of a carbon capture and mineral extraction system 10. In the depicted implementation, a variety of optional steps are performed. For example, in various implementations the system includes a process having steps such as receiving an input liquid (box 100), performing an electrochemical reaction (box 310) to produce a hydroxide-rich solvent for the carbon capture process and a hydrogen-rich solvent for mineral extractions.

In various cases the hydroxide-rich solvent is passed through an air contactor or other similar medium to convert carbon dioxide from ambient air and industrial sources into carbonates (box 120). In some cases the hydrogen-rich solvent is mixed with fine rock powder (box 725) to dissolve the metals and minerals of interest. The fine rock powder is obtained from mined rock or rock waste (box 705) which is ground in a dry or a wet medium (box 715).

The dissolved metal and mineral compounds (box 380), such as metal chlorides obtained by mixing fine rock powder with hydrochloric acid, are mixed with carbonates to form metal and mineral carbonates (box 355) that are then precipitated out for storage on land or in water (box 340). In some cases the salt solution that is obtained from the reaction is recycled back to the front of the process (box 360).

Figure 44:
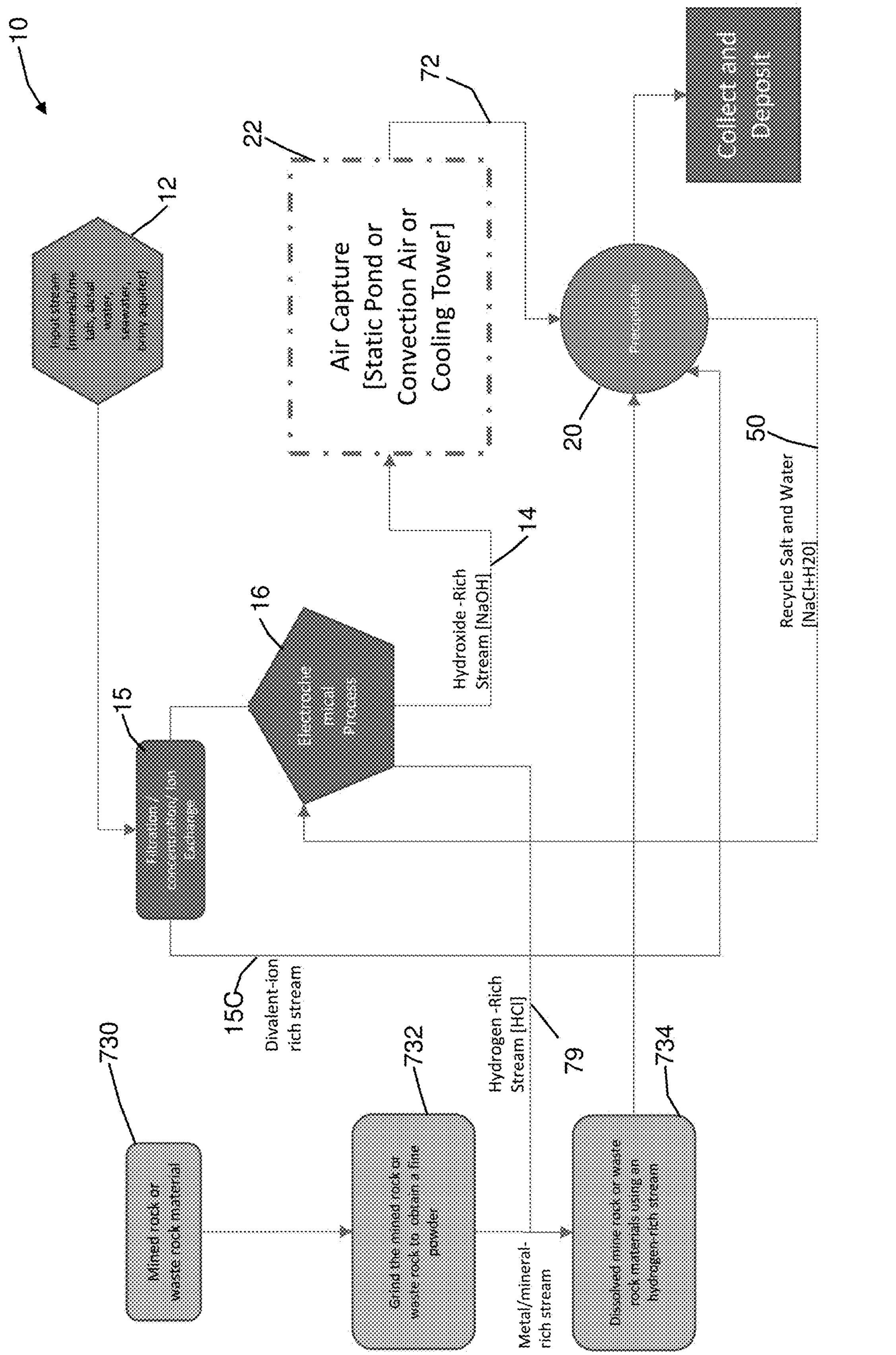
FIG. 44 shows a summary block diagram of one implementation of the disclosed system using including the synergies and interdependencies between carbon dioxide capture and sequestration, desalination, and mineral extraction.

As shown in FIGS. 44, in various implementations of a carbon capture system 70, coarse rock, obtained from a mine or from waste feed stream 730 is first ground to fine particles in a wet or a dry grinder 732 and then dissolved using a hydrogen-rich stream, such as hydrochloric acid 79, from the direct air capture system. The direct air capture system uses saline liquid as an input liquid 12 into the electrochemical process to form a hydroxide-rich stream 14 and a hydrogen-rich stream 79. The input liquid 12 is first pretreated 15 through nanofiltration and ion exchange to remove divalent ions such as calcium and magnesium.

The hydroxide-rich stream is used to remove carbon dioxide from ambient air and from industrial gases to form carbonates such as sodium carbonate and bicarbonates 72. The dissolved metal/mineral rock particles 734 are then mixed with the carbonates in a precipitator 20 to form mineral carbonates that are stored on land or in water and the salt solution 50 that remains in the precipitator is recycled back to the electrochemical step.

As described herein, it is understood that the capture system 10 comprises one or more fluidic connections (shown generally at the lines) between a variety of optional components that can be arranged in a wide variety of arrangements, such that the various fluids/gasses and electricity described herein are able to flow as described.

Figure 45:
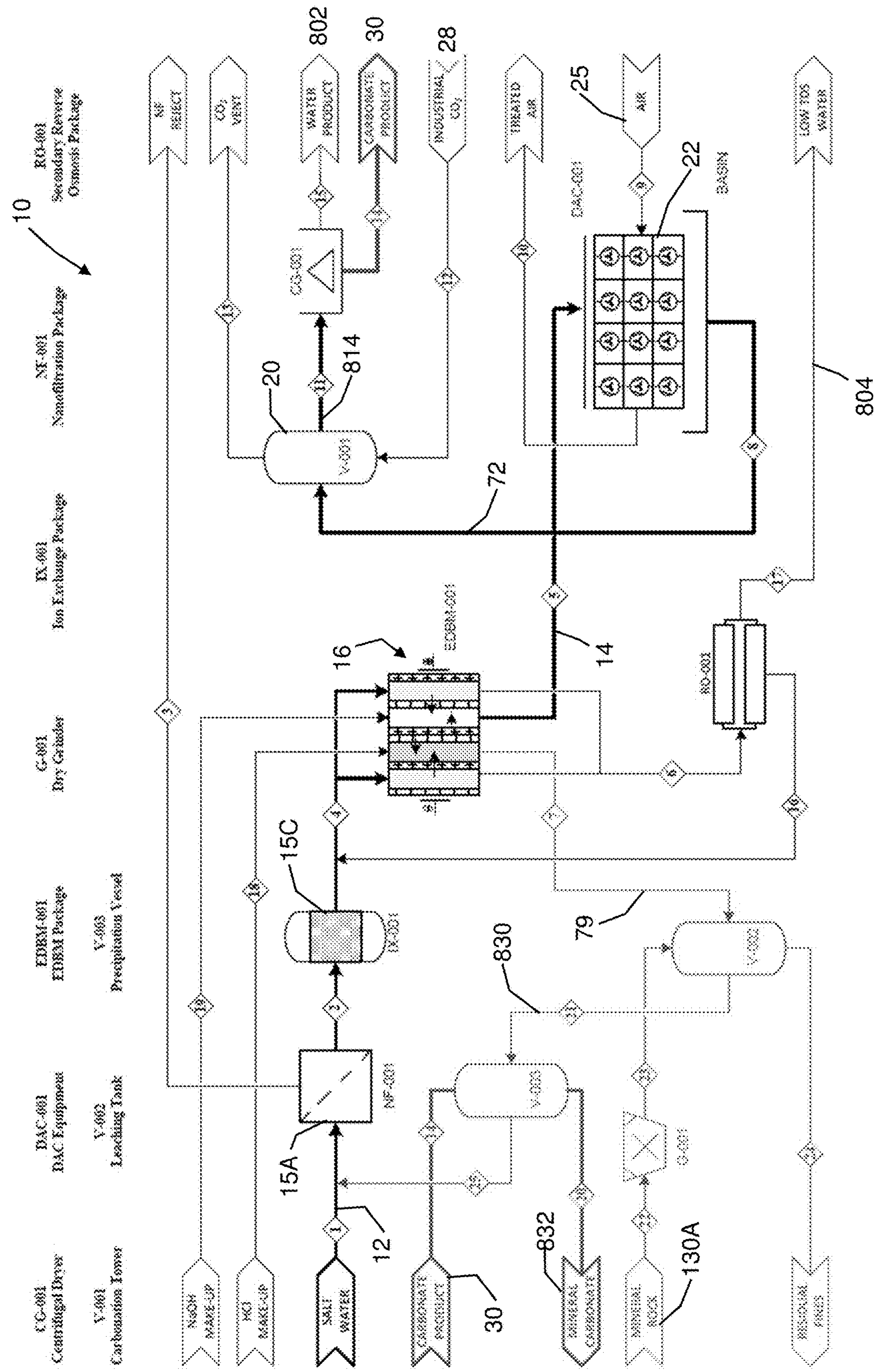
FIG. 45 shows is a flow chart depicting a carbon capture process, according to one implementation.

FIG. 45 is a flow chart providing a detailed depiction of a carbon capture process 10, according to one possible implementation. The detailed diagram depicts a number of vessels and other components of the system, in addition to fluid connections between relevant components. It will be appreciated that the system may include fewer and/or additional components and aspects that are not shown in various cases.

Continuing with FIG. 45, in various implementations, a capture system and method 10 receives an input liquid 12, such as, for example, sea water, which is then sent through a pretreatment stage. In the illustrated example, the pretreatment stage includes a nano-filtration unit (15A) and an ion exchange unit (15C) to remove divalent ions such as calcium and magnesium. The output of the pretreatment stage (e.g., filtrate) is then sent to an electrochemical processor 16.

In various implementations, the electrochemical processor 16 includes an electrodialysis bipolar membrane (EDBM-001). The EDBM unit is configured to split the input liquid salt stream into a hydroxide-rich stream (14) and a hydrogen-rich stream (79). The hydroxide-rich stream is then passed through an air contactor (22) wherein it absorbs carbon dioxide from an air stream (25) to form carbonates. These carbonates (72) are then pumped to a reactor (V-001) which absorbs $CO_2$ from industrial gases (28) to form bicarbonates (stream 814). In various implementations the solid bicarbonate slurry (814) is separated in a centrifuge dryer (CG-001) into a solid carbonate/bicarbonate precipitant stream 30 and water, which in some cases is recycled back into the system (802).

In various implementations, the integration with mineral extraction makes use of the hydrogen-rich stream 79 (e.g., HCl) produced by the electrochemical processor 16. As shown in FIG. 45, the system/process 10 receives mineral rock 130A, which is crushed in a dry grinder (G-001) and then dissolved into the hydrogen-rich stream 79 in a leaching tank (V-003). The resulting mixture 830 is then sent to a precipitation vessel (V-003) and mixed with the carbonates and bicarbonates 30. The resulting mixture forms metal and mineral carbonates 832, which are then precipitated out for storage on land or in water.

As will be appreciated, additional inputs and/or outputs may be present in various implementations of the system 10.

Eight

As previously discussed, and also described herein with respect to FIGS. 46-50, the disclosed technologies are referred to broadly as a system 10, though it is understood that this is for brevity and in no way intended to be limiting to any specific modality.

Certain implementations of the capture system 10 relate to the sequestration of $CO_2$ in the form of mineral carbonates, re-releasing the captured $CO_2$ using hydrochloric acid from an electrochemical unit (e.g., electrolysis or electrodialysis unit), and combining the released $CO_2$ with hydrogen produced from the electrochemical process to form methanol. In these implementations, electricity is applied to saline water via the electrochemical process to create hydroxide-rich solvents which can be used to directly capture $CO_2$ from the air. The electrodialysis or electrolysis process also creates a hydrogen-rich and chlorine-rich solvent stream that can be used for re-releasing captured $CO_2$ and its synthesis to methanol.

In certain other implementations of the capture system 10, hydrogenation is performed on the carbonates in the presence of a catalyst to form methanol. The energy used in the process is renewable energy resulting in green hydrogen which in turn results in green methanol production. Green methanol can be used for storing carbon dioxide in its form or further processed into other derivative green products.

Figure 46:
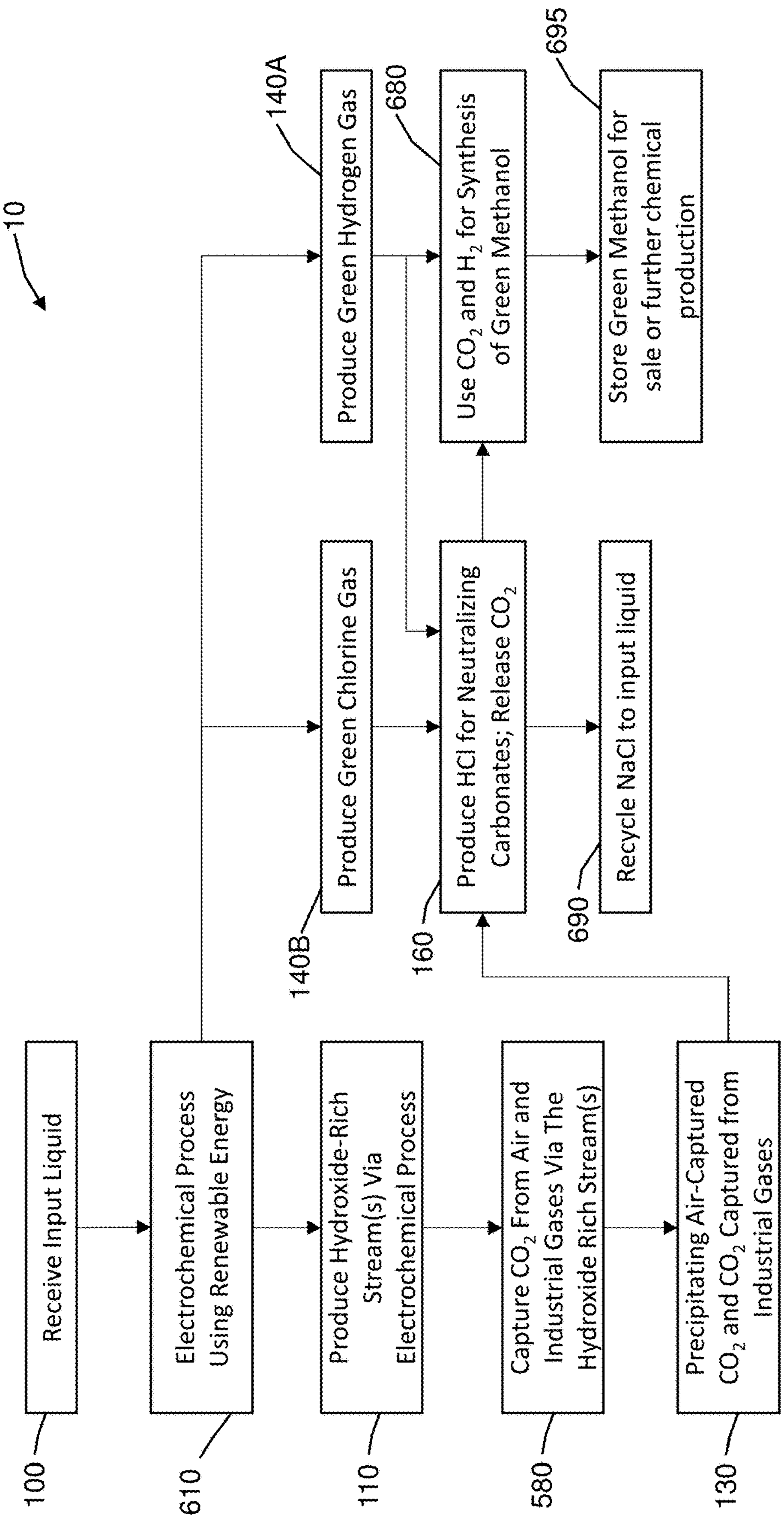
FIG. 46 shows a flow chart of the combined carbon capture and hydrogenation process to form methanol, according to one implementation.

FIG. 46 depicts various steps in the process of carbon capture and hydrogenation to methanol in various implementations of the capture system 10. In this implementation, the system comprises a process having steps such as receiving an input saline liquid (box 100) and passing the liquid through an electrochemical process (box 610) such as, for example, electrolysis or electrodialysis, to produce a hydroxide-rich solvent stream (box 110), such as sodium hydroxide. The process also includes using the solvent to capture $CO_2$ (box 580) from ambient air as well as from an industrial source and precipitating the captured $CO_2$ in the form of carbonates (box 130).

In various implementations the process 10 further includes using the electrochemical process at least in part to produce chlorine gas (box 140B) and hydrogen gas (box 140A). The process also includes neutralizing the carbonates with the hydrogen-rich stream, such as hydrochloric acid (box 160). The hydrochloric acid can be formed by combustion of the chlorine gas (box 140B) with the hydrogen gas (box 140A). If needed, $CO_2$ re-released from the combustion can be hydrogenated with hydrogen from the electrochemical process in the presence of a catalyst for methanol synthesis (box 680). The process also includes storing methanol for sale and further production of derivative products (box 695). The neutralization of carbonates produces salt, such as sodium chloride, which is recycled back (box 690) to include with the input liquid 100.

Figure 47:
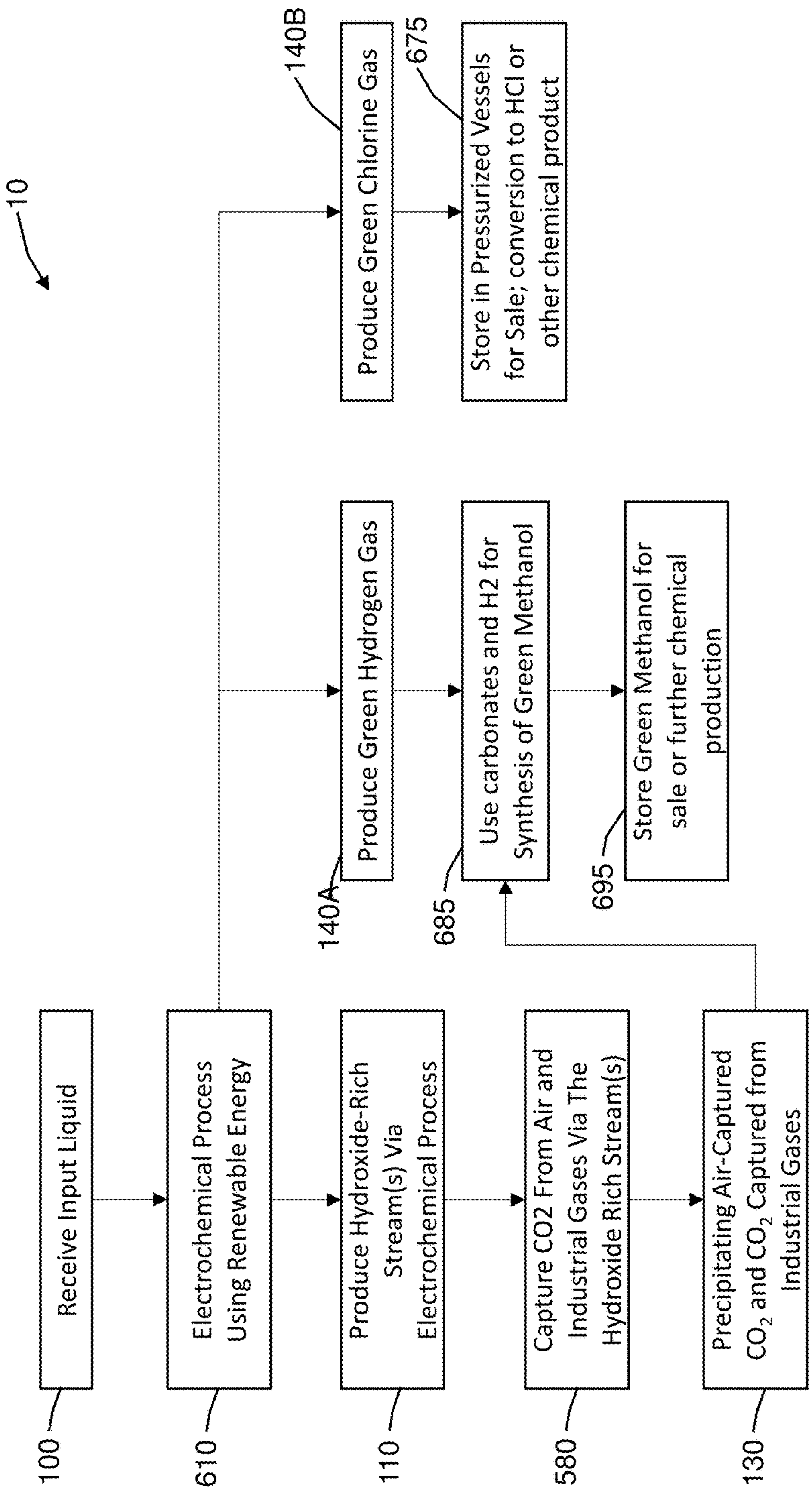
FIG. 47 shows a flow chart of the combined carbon capture and hydrogenation process to form methanol, according to one implementation.

FIG. 47 depicts various steps in the system's process of producing methanol using the carbon capture and hydrogenation steps forming part of the system 10. In this example mineral carbonates are hydrogenated directly to form methanol (box 685). The process also includes storing methanol for sale and further production of derivative products (box 695). Further, the system 10 produces chlorine-based byproducts such as, for example, chlorine gas and/or hydrochloric acid, which can be stored for subsequent sale (box 675).

Figure 48:
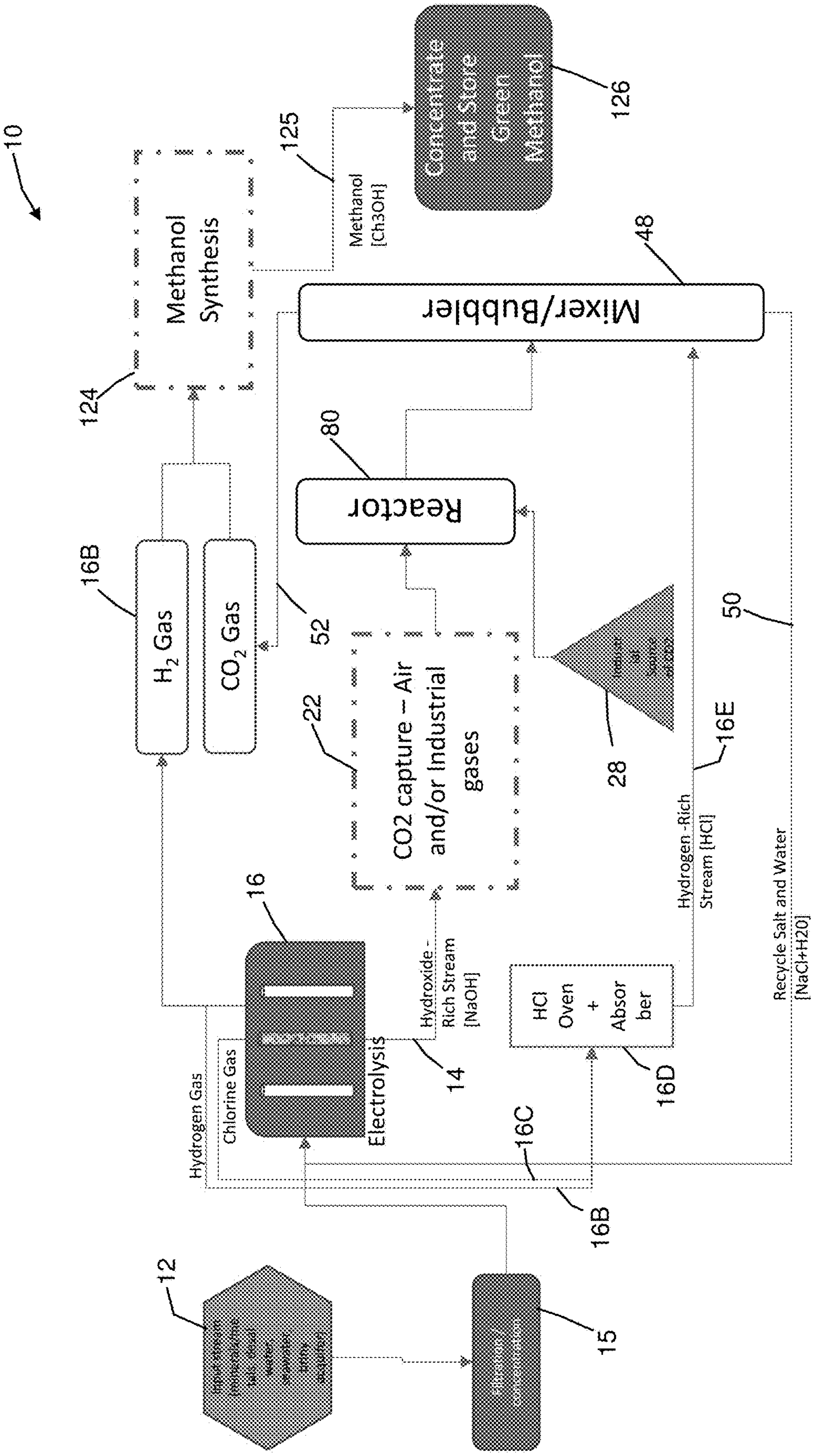
FIG. 48 shows a summary block diagram of the system using carbon dioxide capture and hydrogenation of the re-released $CO_2$ gas to form methanol, according to an implementation.

As shown in FIG. 48, in one implementation of the system 10, an input liquid 12 such as seawater is pretreated and filtered to remove coarse particles 15 and passed into an electrochemical processor 16 (e.g., an electrolysis unit in the illustrated example) to produce a hydroxide-rich stream 14 containing salts such as NaOH and/or other hydroxides and byproduct gases such as hydrogen 16B and chlorine 16C. The byproduct gases can be combined in a combustion chamber 16D to produce a hydrogen-rich acid stream such as hydrochloric acid 16E. The hydroxide-rich stream is used to capture $CO_2$ from ambient air in an air contactor 22 and from industrial gases 28 in a reactor 80 to form mineral carbonates. The mineral carbonates are then neutralized with hydrochloric acid in a mixer/bubbler 48 to re-release pure $CO_2$ gas 52 and recycle the salt 50. In a methanol processing unit 124 the re-released $CO_2$ 52 is combined with the hydrogen gas 16B from the electrolysis unit to form methanol 125 at high temperatures and pressures in the presence of a catalyst in a chamber and is stored for sale or further processing 126.

Figure 49:
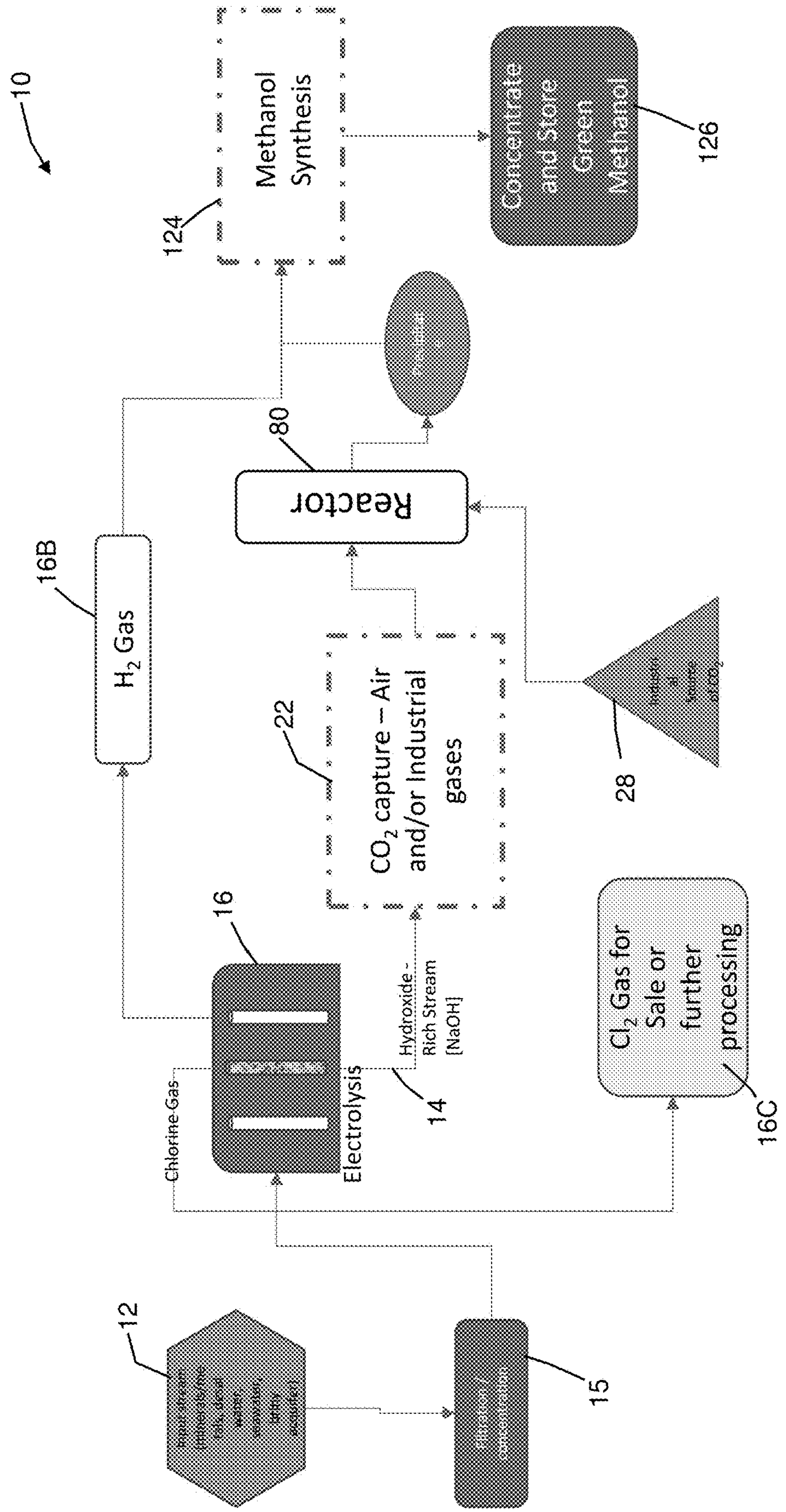
FIG. 49 shows a summary block diagram of the system using carbon dioxide capture and hydrogenation of the mineral carbonates to form methanol, according to an implementations.

In another implementation, as shown in FIG. 49, the carbonates are directly hydrogenated using hydrogen gas 16B for the synthesis 124 of methanol. The direct hydrogenation of carbonates is performed in presence of catalysts such as a ruthenium (Ru) catalyst and other chemicals including alcohols such as ethylene glycols to form methanol. The direct air capture of $CO_2$ and methanol synthesis 124 can be performed in a single reactor. The byproduct, in this implementation, chlorine gas 16C, is stored in pressurized vessel for sale or further processing.

As described herein, it is understood that the capture system 10 comprises one or more fluidic and/or electrical connections (shown generally at the lines) between a variety of optional components that can be arranged in a wide variety of arrangements, such that the various fluids/gasses and electricity described herein are able to flow as described.

Figure 50:
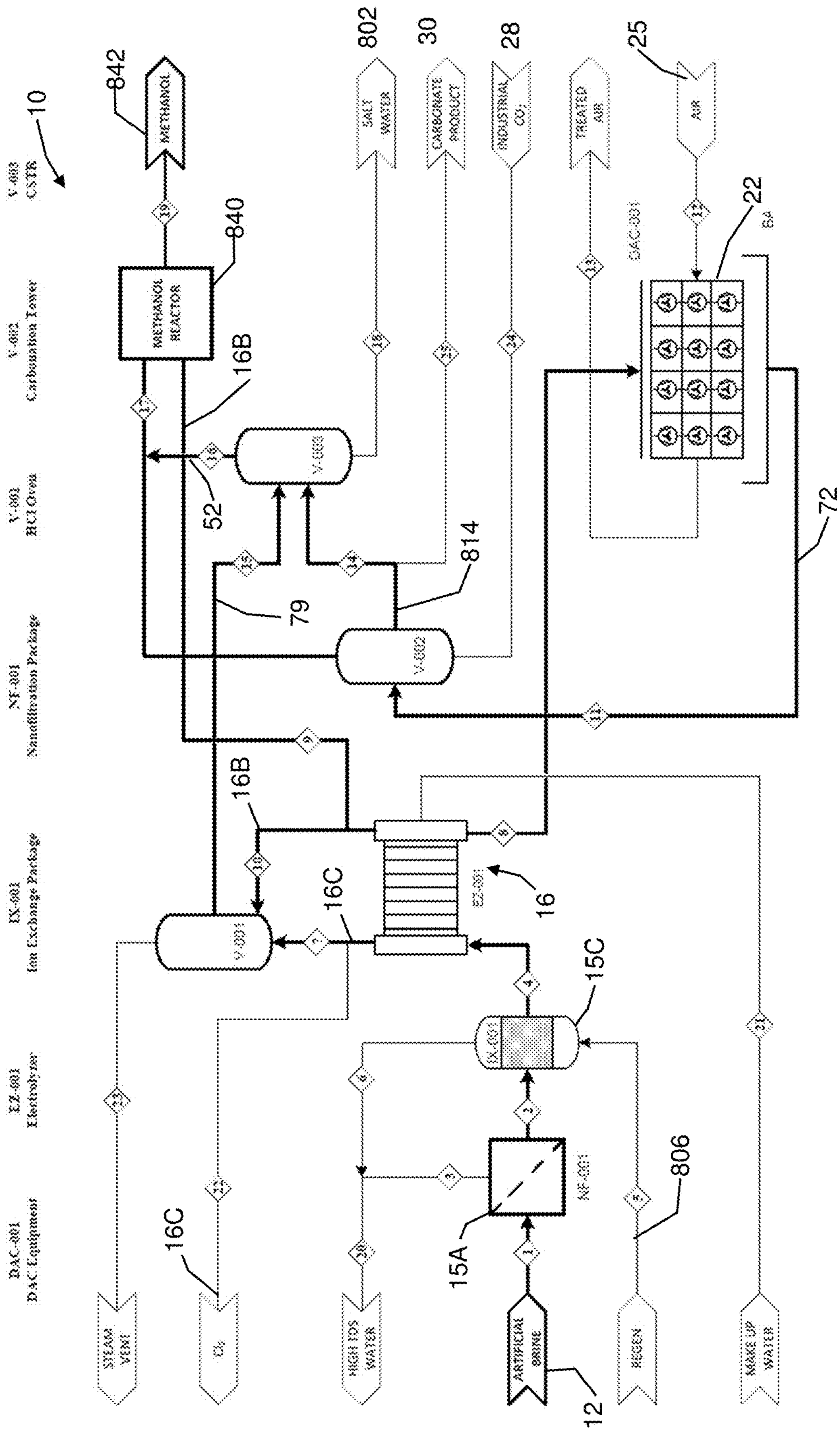
FIG. 50 is a flow chart depicting a carbon capture process, according to an implementation.

FIG. 50 is a flow chart providing a detailed depiction of a carbon capture process, according to one possible implementation. The detailed diagram depicts a number of vessels and other components of the system, in addition to fluid connections between relevant components. It will be appreciated that the system may include fewer and/or additional components and aspects that are not shown in various cases.

According to various implementations, the system 10 receives an input liquid 12, which in some cases is an artificial brine that is formed by mixing salt with water. The input liquid is fed to pretreatment system that in this case includes nano-filtration unit (15A) and an ion exchange unit (15C) to remove divalent ions such as calcium and magnesium. The filtrate output by the pretreatment stage is then sent to an electrochemical processor 16.

In various implementations the electrochemical processor is an electrolysis unit (EZ-001) wherein the salt and water solution is split into a hydroxide-rich stream (14), hydrogen gas stream (16B), and a chlorine gas stream (16C). A portion of the hydrogen gas (16B) and chlorine gas (16C) are combusted in an HCl oven (V-001) to form HCl (79). The hydroxide stream (14) is passed through air contactor 22 wherein the hydroxide combines with ambient $CO_2$ to form a carbonate solution (72). The carbonate solution 72 is exposed to industrial $CO_2$ (28) to form bicarbonates in a reactor (V-002). The bicarbonate solution (814) is mixed with the HCl (79) in a mixer/bubbler reactor (V-003) to release gaseous $CO_2$ (52). The $CO_2$ (52) and the H2 (16B) gases are then sent to a methanol reactor 840 for the synthesis of methanol 842.

In various implementations, the main inputs for the capture process and system 10 in FIG. 50 are the liquid input 12 (e.g., artificial brine in this example), air 25, and $CO_2$ from industrial emissions. In various implementations, the main outputs are methanol 842, $Cl_2$ gas 16C, and carbonate products 30.

In various implementations the process/system 10 in FIG. 50 uses one or more additional inputs and may generate one or more additional outputs. As just one possible example, in various implementations a regen stream 806 including, for example, some amount of HCl, is used to regenerate the ion exchange pretreatment stage 15C. As will be appreciated, additional inputs and/or outputs may be present in various implementations of the system 10.

Although the disclosure has been described with reference to preferred embodiments, persons skilled in the art will recognize that changes may be made in form and detail without departing from the spirit and scope of the disclosed apparatus, systems, and methods.

What is claimed is:

1. A method for capturing and sequestering carbon dioxide ($CO_2$), comprising:

receiving an input liquid comprising at least one of seawater, brackish water, and brine effluent;

performing an electrochemical process on the input liquid to produce at least one hydroxide-rich stream;

capturing $CO_2$ from air using the hydroxide-rich stream and a passive direct air capture system, thereby producing a liquid carbonate solution;

precipitating a solid carbonate and/or a slurry of carbonate from the liquid carbonate solution;

producing a hydrogen-rich stream at least in part with the electrochemical process;

dissolving a metal and/or a mineral into the hydrogen-rich stream to produce a metal and/or a mineral solution;

mixing the solid carbonate and/or the slurry of carbonate from the liquid carbonate solution with the metal and/or the mineral solution to produce a metal and/or a mineral carbonate mixture;

precipitating a metal and/or a mineral carbonate from the metal and/or the mineral carbonate mixture; and recycling a salt solution from the metal and/or the mineral carbonate mixture by mixing the salt solution with the input liquid upstream from the electrochemical process.

2. The method of claim 1, further comprising pretreating the input liquid with the solid carbonate and/or the slurry of carbonate from the liquid carbonate solution.

3. The method of claim 1, further comprising processing the input liquid with a pretreatment stage before performing the electrochemical process, the pretreatment stage comprising one or more of a filtration system, a reverse osmosis concentration system, and an ion exchange system.

4. The method of claim 1, wherein performing the electrochemical process comprises performing electrodialysis with a bipolar membrane electrodialysis unit constructed and arranged to produce the at least one hydroxide-rich stream, the hydrogen-rich stream, and hydrogen gas.

5. The method of claim 1, wherein performing the electrochemical process comprises performing electrolysis to produce the at least one hydroxide-rich stream, hydrogen gas, and chlorine gas.

6. The method of claim 5, wherein producing the hydrogen-rich stream comprises combining the hydrogen gas and the chlorine gas to produce hydrochloric acid.

7. The method of claim 1, wherein the brine effluent comprises a desalination waste brine from a desalination facility.

* * * * *